United States Patent
Kim

(10) Patent No.: US 10,232,713 B2
(45) Date of Patent: Mar. 19, 2019

(54) LAMP FOR A VEHICLE

(71) Applicant: LG Electronics Inc., Seoul (KR)

(72) Inventor: Ana Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/855,602

(22) Filed: Dec. 27, 2017

(65) Prior Publication Data

US 2018/0297470 A1 Oct. 18, 2018

(30) Foreign Application Priority Data

Apr. 12, 2017 (KR) ........................ 10-2017-0047456

(51) Int. Cl.
*B60Q 1/00* (2006.01)
*B60K 35/00* (2006.01)
(Continued)

(52) U.S. Cl.
CPC ................ *B60K 35/00* (2013.01); *B60Q 1/00* (2013.01); *B60Q 1/085* (2013.01); *G08G 1/166* (2013.01);
(Continued)

(58) Field of Classification Search
CPC .. B60K 35/00; B60K 2350/2052; B60Q 1/00; B60Q 2400/50; B60Q 1/26; B60Q 1/08; B60Q 1/14; B60Q 2300/112; B60Q 1/503; B60Q 1/525; B60Q 1/50; G08G 1/166; G03B 21/2066; G03B 21/208;
(Continued)

(56) References Cited

U.S. PATENT DOCUMENTS 7,791,458 B2 * 9/2010 Shimaoka .............. B60Q 1/085
340/435
2014/0028980 A1 * 1/2014 Othmer .................... B60Q 1/50
353/14
(Continued)

FOREIGN PATENT DOCUMENTS

DE 102013019021 5/2015
DE 102014000935 7/2015
(Continued)

OTHER PUBLICATIONS

Extended European Search Report in European Application No. 18166430.1, dated Oct. 16, 2018, 9 pages.

*Primary Examiner* — Anh V La
(74) *Attorney, Agent, or Firm* — Fish & Richardson P.C.

(57) ABSTRACT

A lamp for a vehicle includes a lamp module configured to project an image to a road surface, at least one controller, and a computer-readable medium coupled to the at least one controller having stored thereon instructions which, when executed by the at least one controller, cause the at least one controller to perform operations. The operations include receiving vehicle driving information, and controlling the lamp module to project at least one of a state indicator or an operation indicator based on the vehicle driving information. The state indicator includes a projection image corresponding to first information that conveys a state related to the vehicle to an occupant of the vehicle, and the operation indicator includes a projection image corresponding to a user action to be performed by the occupant of the vehicle.

20 Claims, 32 Drawing Sheets

(51) Int. Cl.
*G08G 1/16* (2006.01)
*B60Q 1/08* (2006.01)

(52) U.S. Cl.
CPC .. *B60K 2350/2052* (2013.01); *B60Q 2400/50* (2013.01)

(58) Field of Classification Search
CPC ............. G03B 21/2033; H04N 9/3194; H04N 9/3185; G06T 7/70; G06T 2207/30252
USPC ....... 340/435, 436, 463, 464, 465, 468, 471, 340/475; 701/36, 48
See application file for complete search history.

(56) References Cited

U.S. PATENT DOCUMENTS

| | | | | |
|---|---|---|---|---|
| 2015/0224926 | A1* | 8/2015 | Mochizuki | B60R 1/00 701/36 |
| 2017/0240096 | A1* | 8/2017 | Ross | B60Q 1/50 |
| 2017/0253177 | A1* | 9/2017 | Kawamata | B60Q 1/24 |

FOREIGN PATENT DOCUMENTS

| | | |
|---|---|---|
| EP | 3093193 | 11/2016 |
| JP | 2008143505 | 6/2008 |
| JP | 2016090318 A | 5/2016 |
| KR | 20120067450 A | 6/2012 |
| KR | 20130006067 A | 1/2013 |
| KR | 20140111733 A | 9/2014 |
| WO | WO 2016072483 | 5/2016 |
| WO | WO 2016114048 | 7/2016 |

* cited by examiner (a)          (b)

(a)  (b)

(a)　　　　　　　　　(b)

(a)  (b)

(a)        (b)

(a)             (b)

LAMP FOR A VEHICLE

CROSS-REFERENCE TO RELATED APPLICATION

This application claims the priority benefit of Korean Patent Application No. 10-2017-0047456, filed on Apr. 12, 2017, in the Korean Intellectual Property Office, the disclosure of which is incorporated herein by reference.

FIELD

The present disclosure relates to a lamp for a vehicle, and more specifically to a lamp for a vehicle which can project a state indicator and an operation indicator on a road surface.

BACKGROUND

A vehicle is an apparatus that can move in a direction desired by a user riding therein. A representative example of a vehicle may be an automobile.

In some examples, a variety of sensors and electronic devices have been mounted in vehicles for convenience of a user who uses the vehicle. For example, for a user driving convenience, an Advanced Driver Assistance System (ADAS) has been actively studied. Recently, efforts have been being made to develop autonomous vehicles.

A lamp for a vehicle may include a head lamp, a rear combination lamp, a turn signal lamp, a room lamp, etc. The lamp for a vehicle may include functions such as securing visibility or transmitting a simple signal to a nearby vehicle.

In some cases, a lamp for a vehicle may project an image including a letter, a word, a text, or a mark on a road surface so as to provide information to a driver of a vehicle, a driver of a nearby vehicle, and a pedestrian. The image projected by the lamp on a road surface may be referred to as a road surface projection image.

Recently, there are ongoing efforts to study a lamp for a vehicle, which can provide a driver of the vehicle with appropriate information in each using a road surface projection image.

However, if too much information is provided to a driver with a road surface projection image, it may cause confusion for the driver.

Accordingly, this application discloses a lamp for a vehicle that can selectively project appropriate information depending on a situation and that can guide an operation needed to be performed by an occupant in the situation.

SUMMARY

The present disclosure has been made in view of the above problems. It is one object of the present disclosure to provide a lamp for a vehicle, which can project an image to a road surface to provide guidance with information needed to be recognized by an occupant or with an operation needed to be performed by the occupant.

It is another object of the present disclosure to a lamp for a vehicle, which can change a form, a location, and a projection time of the road surface projection image appropriately based on a situation.

Objects of the present disclosure should not be limited to the aforementioned objects and other unmentioned objects will be clearly understood by those skilled in the art from the following description.

According to one aspect of the subject matter described in this application, a lamp for a vehicle includes a lamp module configured to project an image to a road surface, at least one controller, and a computer-readable medium coupled to the at least one controller having stored thereon instructions which, when executed by the at least one controller, cause the at least one controller to perform operations. The operations include receiving vehicle driving information, and based on the vehicle driving information, controlling the lamp module to project at least one of a state indicator or an operation indicator. The state indicator includes a projection image corresponding to first information that conveys a state related to the vehicle to an occupant of the vehicle, and the operation indicator includes a projection image corresponding to a user action to be performed by the occupant of the vehicle.

Implementations according to this aspect may include one or more of the following features. For example, the operations may further include based on the vehicle driving information, determining the availability of the first information that conveys the state related to the vehicle, and based on a determination of the availability of the first information, controlling the lamp to project the state indicator corresponding to the first information. The first information may include at least one of driving situation information, vehicle state information, or occupant-related information.

In some examples, the operations may further include determining a caution level of the first information, based on the determined caution level of the first information, determining at least one of a form of the state indicator or a projection time of the state indicator. The operations may further include changing the form of the state indicator based on a change of the caution level in a state in which the state indicator is projected. The operations may further include determining that a dangerous situation is expected to occur unless the occupant performs a first operation, and based on a determination of the dangerous situation, controlling the lamp to project the operation indicator indicating the first operation to be performed by the occupant.

In some implementations, the operations may further include determining a caution level of the dangerous situation, and, based on the determined caution level of the dangerous situation, determining at least one of a form of the operation indicator or a projection time of the operation indicator. The operation indicator may include at least one of a first operation indicator indicating a first user action related to a driving manipulation apparatus, or a second operation indicator indicating a second user action that is not related to the driving manipulation apparatus. The first operation indicator may include a target operation indicator indicating a target user action that the occupant should perform to avoid the dangerous situation, and a current operation indicator indicating a current user action that the occupant currently performs. The operations may further include controlling the lamp to project the target operation indicator and the current operation indicator as dynamic images that are configured to be updated according to a user manipulation of the driving manipulation apparatus.

In some examples, the operations may further include determining that the dangerous situation has been resolved in a state in which the operation indicator is projected, and, based on a determination that the dangerous situation has been resolved, controlling the lamp to stop projecting the operation indicator. The operations may further include determining that the specific operation has been performed according to the operation indicator, and, based on a determination that the specific operation has been performed, controlling the lamp to stop projecting the operation indicator.

In some implementations, the operations may further include based on the vehicle driving information, determining whether the first information is available, based on a determination of the availability of the first information, controlling the lamp to project the state indicator, and based on a determination that the dangerous situation is expected to occur, controlling the lamp to stop projecting the state indicator and to project the operation indicator.

In some implementations, the operations may further include, based on the vehicle driving information, determining a projection location of the state indicator or a projection location of the operation indicator. In some examples, determining the projection location of the operation indicator includes determining the projection location of the operation indicator at a region on the road surface toward which the occupant is looking, or determining the projection location of the state indicator includes determining the projection location of the state indicator at a region on the road surface corresponding to a location of an object related to the first information.

In some implementations, determining the projection location of the state indicator or the projection location of the operation indicator may include determining, based on a speed of the vehicle, the projection location of the state indicator or the projection location of the operation indicator. In some cases, a distance between the vehicle and the projection location of the state indicator or a distance between the vehicle and the projection location of the operation indicator may be proportional to the speed of the vehicle.

In some implementations, the operations may further include determining a form of the state indicator or a form of the operation indicator based on the vehicle driving information. In some examples, the operations may further include determining a caution level based on the vehicle driving information, and, based on the determined caution level, determining the form of the state indicator or the operation indicator, or a content of the state indicator or the operation indicator. A higher caution level may correspond to a simpler form or simpler content of the state indicator or the operation indicator.

In some implementations, the operations may further include determining a projection time of the state indicator or a projection time of the operation indicator based on the vehicle driving information. The operations may further include determining a caution level based on the vehicle driving information, and based on the determined caution level, changing the projection time. The operations may further include controlling the lamp to flash the state indicator or the operation indicator at a flashing frequency, determining a caution level based on the vehicle driving information, and based on the determined caution level, increasing or decreasing the flashing frequency.

The details of example implementations are included in the following description and the accompanying drawings.

The implementations of the present disclosure have one or more effects as follows.

First, by separately projecting a state indicator indicating information needed to be recognized by an occupant and an operation indicator indicating an operation needed to be performed by the occupant, it may be possible to allow the occupant to quickly and accurately recognize important information and an operation required to respond to a dangerous situation.

Second, by changing the form, location, and projection time of a state indicator or an operation indicator appropriately for each situation, it may be possible to allow an occupant to recognize the state indicator and the operation indicator more efficiently.

Effects of the present disclosure should not be limited to the aforementioned effects and other unmentioned effects will be clearly understood by those skilled in the art from the claims.

BRIEF DESCRIPTION OF THE DRAWINGS

The implementations will be described in detail with reference to the following drawings.

DETAILED DESCRIPTION

A vehicle as described in this specification may include an automobile and a motorcycle. Hereinafter, a description will be given based on an automobile.

For example, a vehicle described in this specification may include an internal combustion engine vehicle including an engine as a power source, a hybrid vehicle including both an engine and an electric motor as a power source, and an electric vehicle including an electric motor as a power source.

In the following description, "the left side of the vehicle" refers to the left side of the forward travel direction of the vehicle, and "the right side of the vehicle" refers to the right side of the forward travel direction of the vehicle.

FIGS. 1 to 7 illustrate, respectively, an example vehicle.

Figure 1:
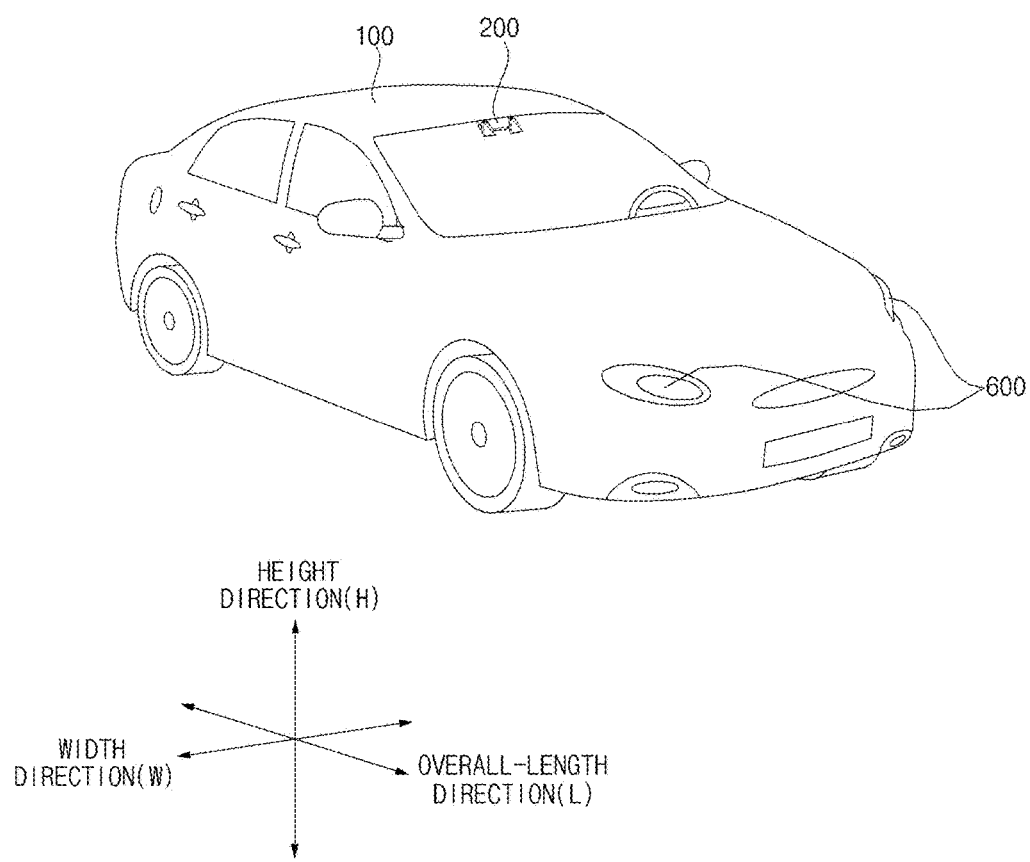
FIG. 1 is a diagram of an example external appearance of an example vehicle.

FIG. 1 is a diagram of an example external appearance of an example vehicle.

Figure 2:
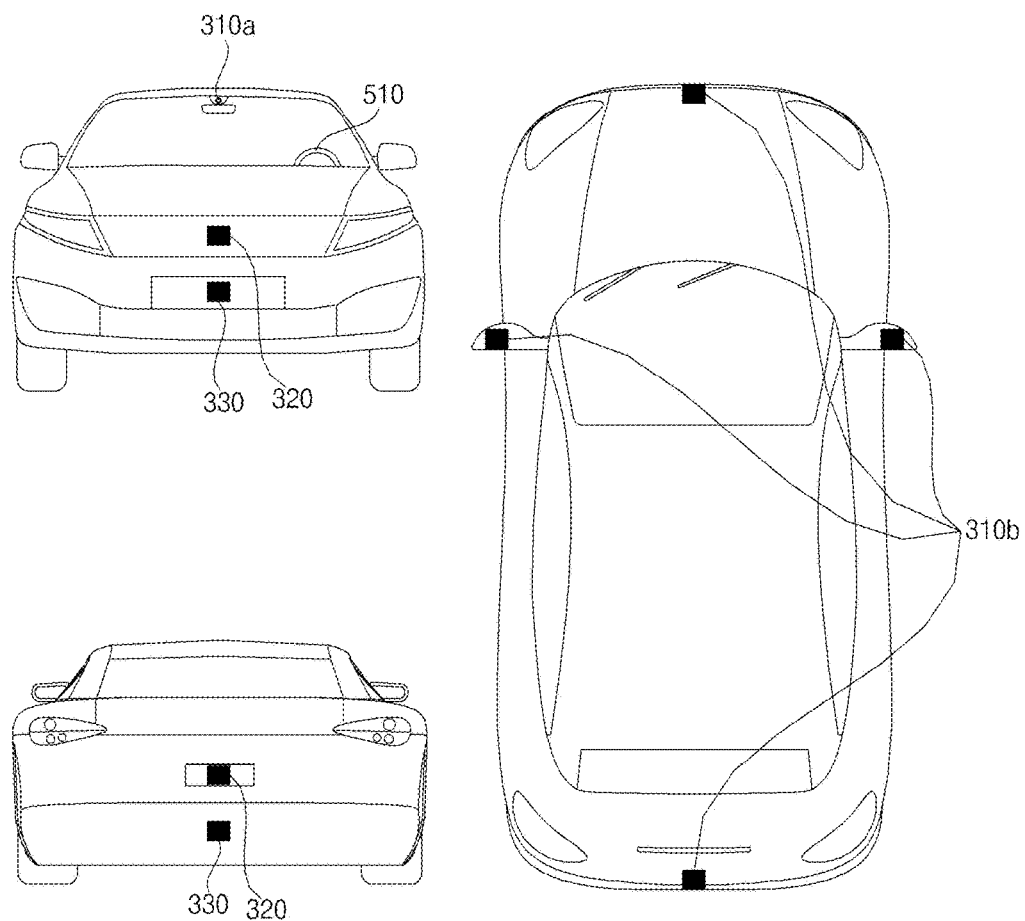
FIG. 2 shows different angled views of an example vehicle.

FIG. 2 illustrates an example vehicle in different angled views.

Figure 3:
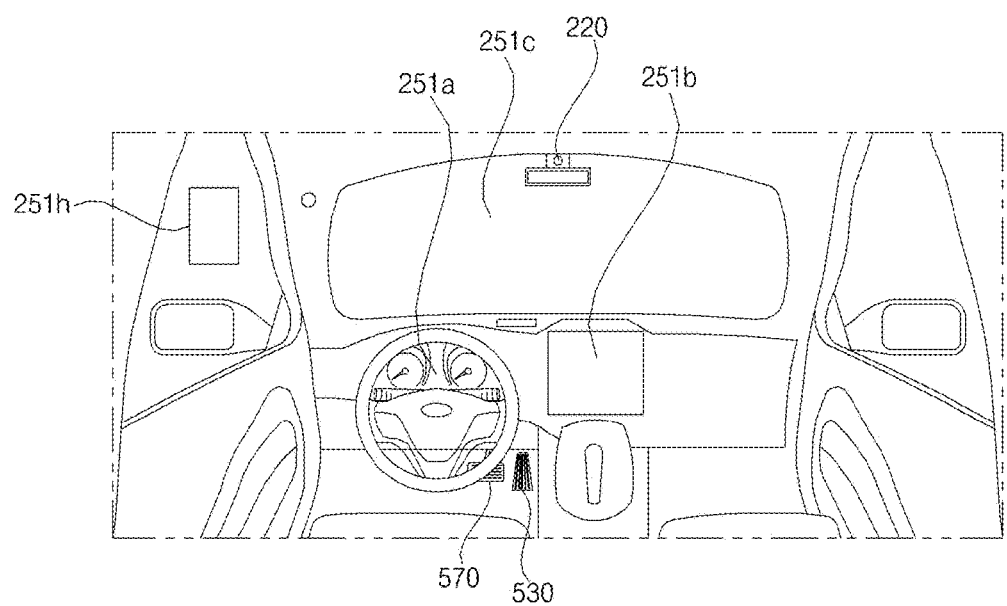
FIGS. 3 and 4 are diagrams of example internal configuration of an example vehicle.
Figure 4:
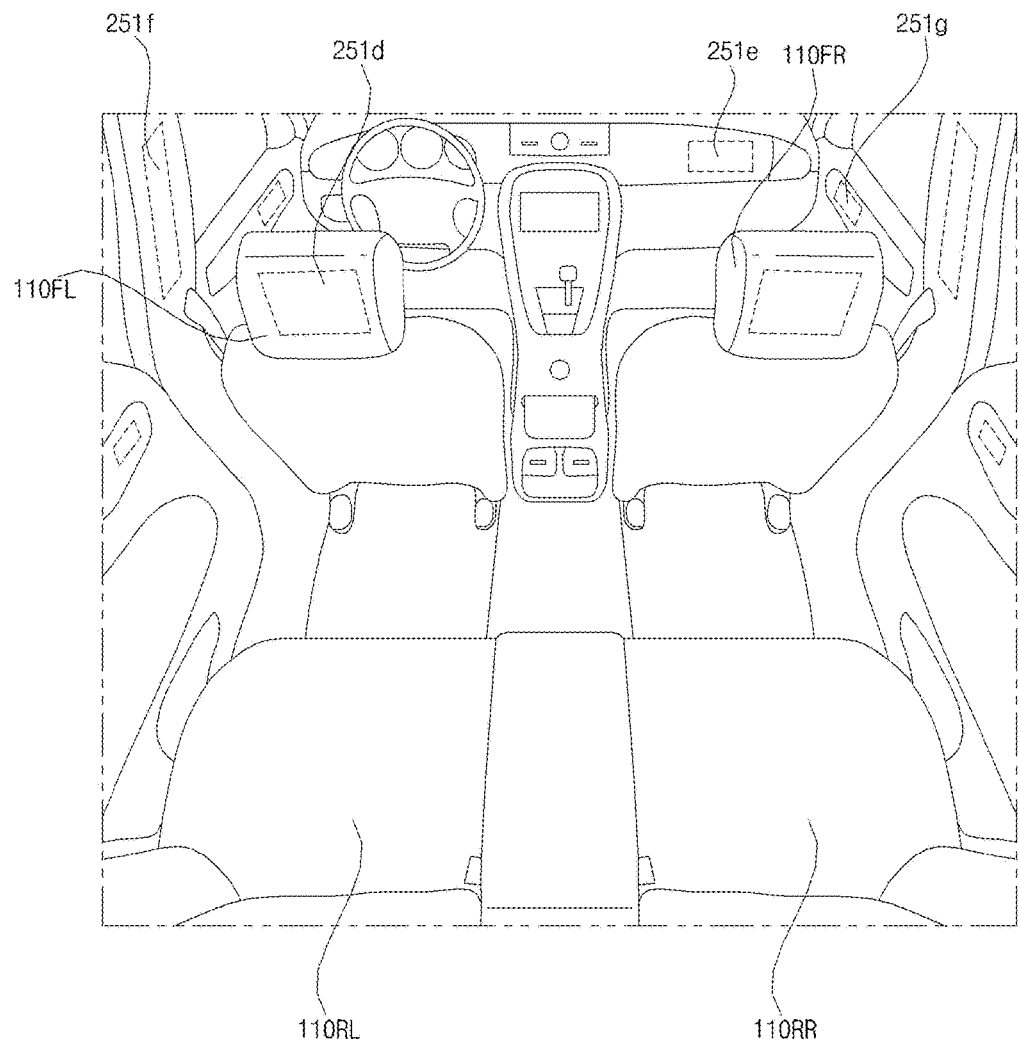

FIGS. 3 and 4 are diagrams of an example internal configuration of an example vehicle.

Figure 5:
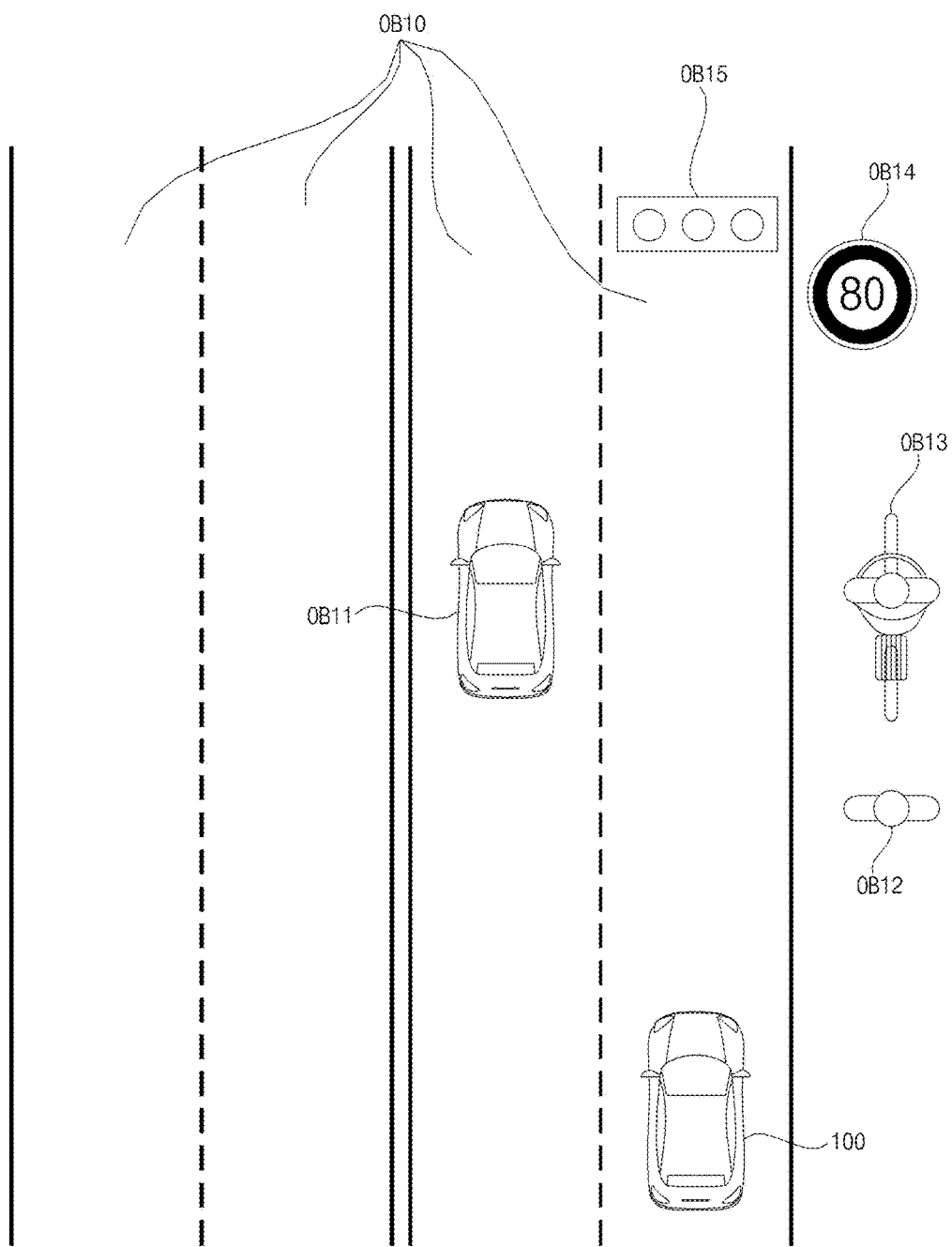
FIGS. 5 and 6 are diagrams showing example objects.
Figure 6:
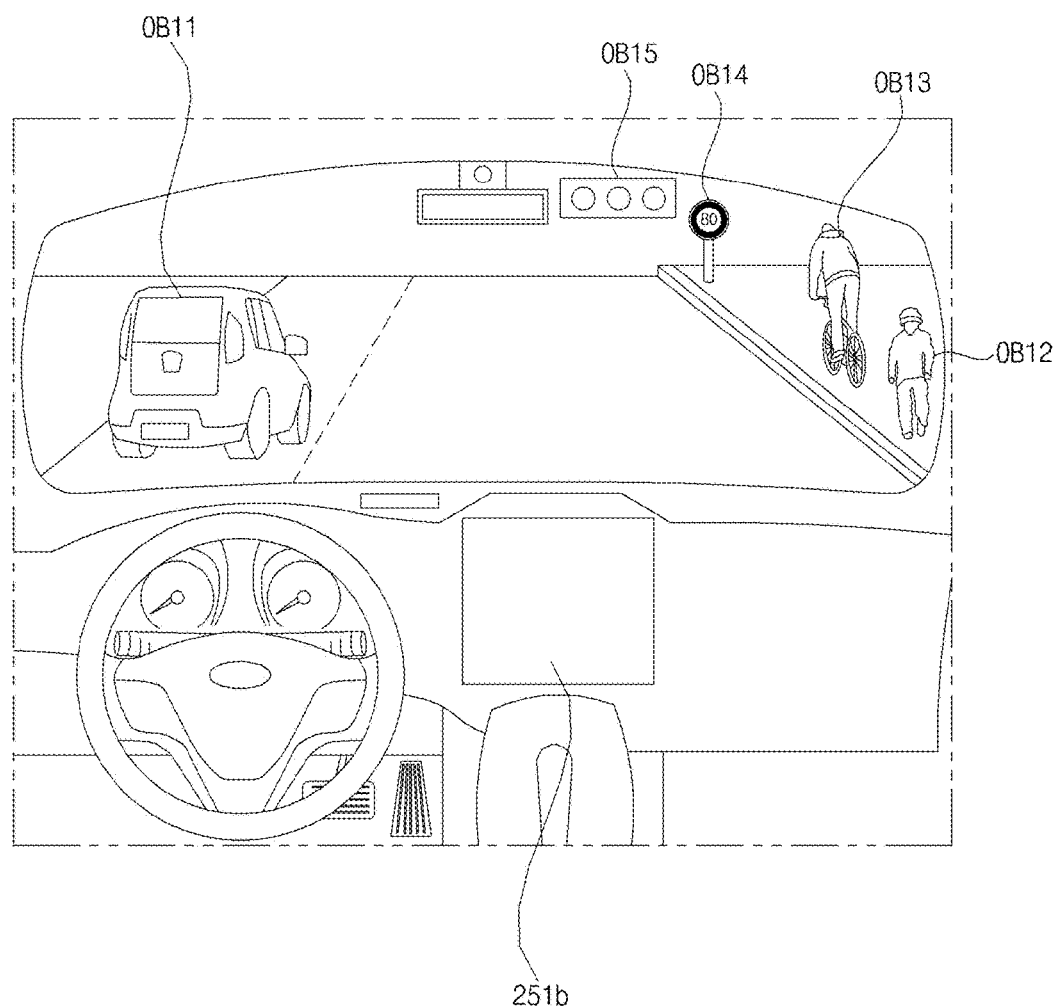

FIGS. 5 and 6 are diagrams of example objects around an example vehicle.

Figure 7:
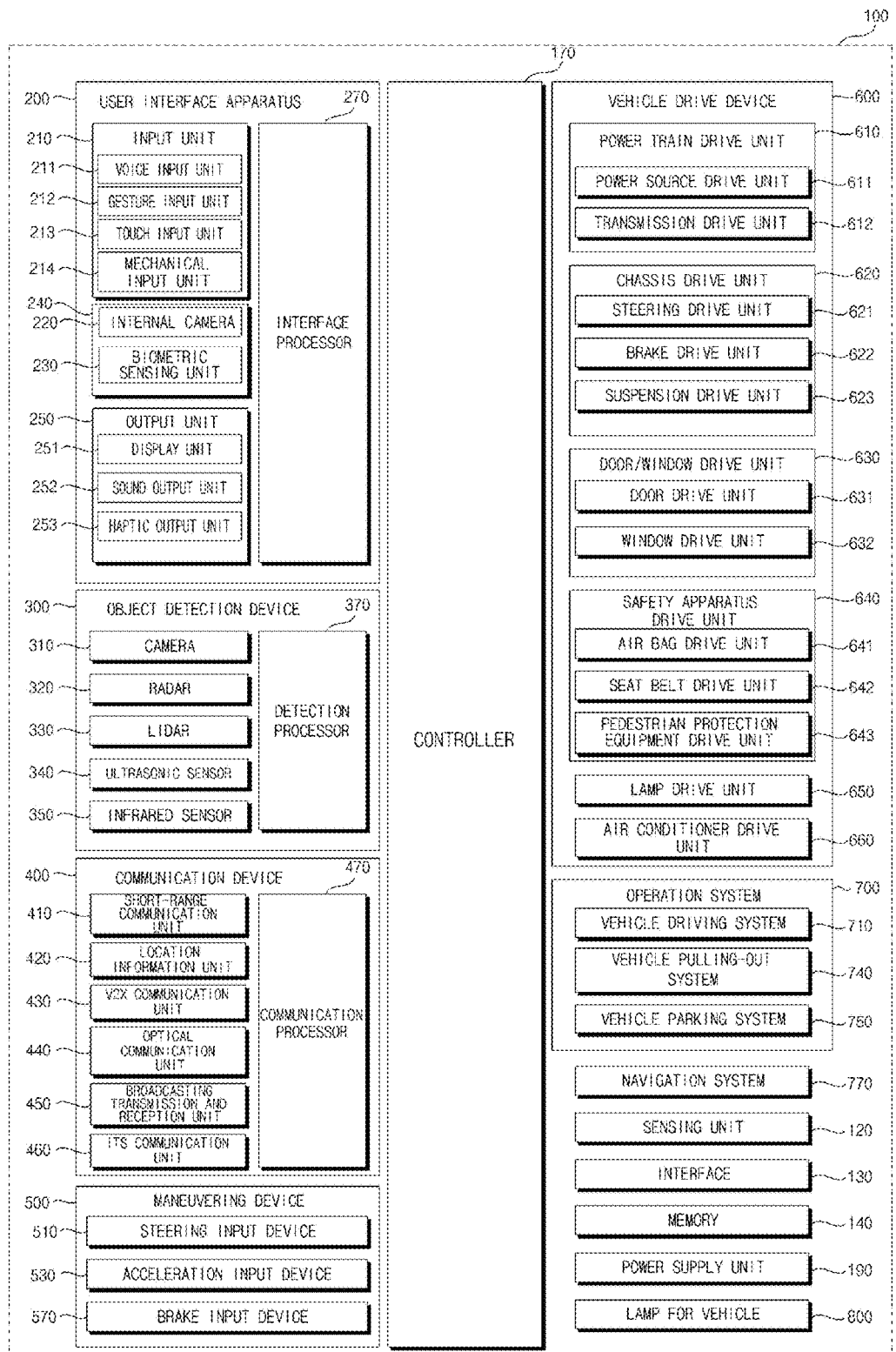
FIG. 7 is a block diagram illustrating example components of an example vehicle.

FIG. 7 is a block diagram illustrating example components of an example vehicle.

Referring to FIGS. 1 to 7, a vehicle 100 may include a plurality of wheels, which are rotated by a power source, and a steering input device 510 configured to control a direction of travel of the vehicle 100.

The vehicle 100 may include various driver assistant apparatuses. For examples, a driver assistant apparatus includes a device that assists a driver based on information acquired from various sensors. The driver assistant apparatus may include an Advanced Driver Assistance System (ADAS).

The vehicle 100 may include various lighting devices for a vehicle. For example, a lighting device for a vehicle may include a head lamp, a brake lamp, a tail lamp, a turn signal lamp, a room lamp, etc. In the following, the lighting device for a vehicle will be described mainly about a head lamp. However, aspects of the present disclosure are not limited thereto, and the lighting device for a vehicle may be a rear combination lamp. The rear combination lamp includes a brake lamp and a trail lamp.

In some examples, the vehicle 100 may include a sensing device inside the vehicle 100, and a sensing device outside the vehicle 100.

The term "overall length" is the length from the front end to the rear end of the vehicle 100, the term "overall width" is the width of the vehicle 100, and the term "overall height" is the height from the bottom of the wheel to the roof. In the following description, the term "overall length direction L" may be the reference direction for the measurement of the overall length of the vehicle 100, the term "overall width direction W" may be the reference direction for the measurement of the overall width of the vehicle 100, and the term "overall height direction H" may be the reference direction for the measurement of the overall height of the vehicle 100.

The vehicle 100 may be an autonomous vehicle. The vehicle 100 may travel autonomously under the control of the controller 170. The vehicle 100 may travel autonomously based on vehicle driving information.

The vehicle driving information may be information that is acquired by various units in the vehicle 100 during travelling of the vehicle 100. The vehicle driving information may be information used for controlling by the controller 170 or an operation system 700 to control the vehicle 100.

For example, the vehicle driving information may include at least one of object information acquired by an object detection apparatus 300, information received by a communication apparatus 400, or a user input received by a user interface apparatus 200 or a driving manipulation apparatus 500.

The object information may be information about a form, shape, location, size, and color of an object sensed by the object detection apparatus 300. For example, the object information may be information about a lane, an obstacle, a nearby vehicle, a pedestrian, a traffic light, a road structure, content of a traffic sign plate, etc.

The information received by the communication apparatus 400 may be information transmitted and received by a device capable of performing communication. For example, the information received by the communication apparatus 400 may include at least one of information transmitted by a nearby vehicle, information transmitted by a mobile terminal, information transmitted by a traffic infrastructure, or information existing in a specific network. The traffic infrastructure may include a traffic light, and the traffic light may transmit information about a traffic signal.

The vehicle driving information may include at least one of navigation information, information on a control state of the vehicle 100, or location information of the vehicle 100. For example, the vehicle driving information may include information on a nearby vehicle, which is transmitted by the nearby vehicle, information on a travel route, and map information.

In some implementations, a lamp for a vehicle or the vehicle includes at least one controller, and a computer-readable medium that is coupled to the at least one controller having stored thereon instructions which, when executed by the at least one controller, cause the at least one controller to perform operations. In this application, the controller may include one or more controllers.

In some implementations, based on vehicle driving information, the controller 170 may determine: a type, location, and movement of an object in the vicinity of the vehicle 100; whether a line exists in the vicinity of the vehicle 100; whether a stopping area exists in the vicinity of the vehicle 100; a probability of collision between the vehicle 100 and an object; a distribution of pedestrians or bicycles in the vicinity of the vehicle 100; a type of a road in which the vehicle 100 is travelling; a state of a traffic light in the vicinity of the vehicle 100; and movement of the vehicle 100.

Vehicle driving information may be acquired by at least one of the user interface apparatus 200, the object detection apparatus 300, the communication apparatus 400, the driving manipulation apparatus 500, the navigation system 770, a sensing unit 120, an interface unit 130, or a memory 140. The vehicle driving information may provide the acquired information to the controller 170. Based on the vehicle driving information, the controller 170 may control the vehicle 100 to travel autonomously.

A control mode of the vehicle 100 may indicate a subject which controls the vehicle 100. For example, a control mode of the vehicle 100 may include: an autonomous mode in which the controller 170 or the operation system 700 included in the vehicle 100 controls the vehicle 100; a manual mode in which a driver in the vehicle 100 controls the vehicle 100; and a remote control mode in which a device other than the vehicle 100 controls the vehicle 100.

When the vehicle 100 is in the autonomous vehicle, the controller 170 or the operation system 700 may control the vehicle 100 based on vehicle driving information. In some examples, the vehicle 100 may travel without a user command received via the driving manipulation apparatus 500. For example, when the vehicle 100 is in the autonomous vehicle, the vehicle 100 may travel based on information, data, or a signal generated by a driving system 710, a parking-out system 740, and a parking system 750.

When the vehicle 100 is in the manual mode, the vehicle 100 may be controlled based on a user command such as steering, acceleration, or deceleration, which is received via the driving manipulation apparatus 500. In this case, the driving manipulation apparatus 500 may generate an input signal corresponding to a user command, and provide the input signal to the controller 170. The controller 170 may control the vehicle 100 based on the input signal provided from the driving manipulation apparatus 500.

When the vehicle 100 is in the remote control mode, a device other than the vehicle 100 may control the vehicle 100. For example, when the vehicle 100 is in the remote control mode, the vehicle 100 may receive a remote control signal transmitted by another device via the communication apparatus 400. The vehicle 100 may be controlled based on a remote control signal.

The vehicle 100 may enter one of the autonomous mode, the manual mode, or the remote control mode based on a user input received via the user interface apparatus 200. A control mode of the vehicle 100 may be switched to one of the autonomous mode, the manual mode, or the remote control mode based on occupant information, vehicle driving information, or vehicle state information.

In some examples, a control mode of the vehicle 100 may be switched from the manual mode to the autonomous mode, or vice versa, based on object information generated by the object detection apparatus 300. In other examples, a control mode of the vehicle 100 may be switched from the manual mode to the autonomous mode, or vice versa, based on information received via the communication apparatus 400.

Occupant information may include an image of a user acquired using an internal camera 220 or biometric information sensed using a biometric sensor 230. For example, occupant information may be an image of an occupant acquired using the internal camera 220. For example, biometric information may be information on a temperature, a pulse, and brainwaves acquired using the biometric sensing unit 230. For example, based on occupant information, the controller 170 may determine the location, shape, gaze, face, behavior, facial expression, dozing, health condition, and emotional state of an occupant. The occupant information may be acquired using the occupant sensing unit 240, and provide the occupant information to the controller 170.

Vehicle state information may include information about states of various units provided in the vehicle 100. For example, the vehicle state information may include information on an operational state of the user interface apparatus 200, the object detection apparatus 300, the communication apparatus 400, the driving manipulation apparatus 500, a vehicle drive apparatus 600, or an operation system 700, and may include information on whether there is an error in each unit. For example, the controller 170 may determine, based on vehicle state information, whether a GPS signal of the vehicle 100 is normally received, whether there is an error in any sensor provided in the vehicle 100, or whether each device provided in the vehicle 100 operates properly.

As illustrated in FIG. 7, the vehicle 100 may include the user interface apparatus 200, the objection detection apparatus 300, the communication apparatus 400, the driving manipulation apparatus 500, a vehicle drive apparatus 600, the operation system 700, a navigation system 770, a sensing unit 120, an interface 130, a memory 140, a controller 170, and a power supply unit 190. In some implementations, the vehicle 100 may further include another component in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and an interface processor 270.

In some implementations, the user interface apparatus 200 may further include other components in addition to the aforementioned components, or may not include some of the aforementioned components.

The input unit 210 is configured to receive a user command from a user, and data collected by the input unit 210 may be analyzed by the interface processor 270 and then recognized as a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the interface processor 270 or the controller 170.

The voice input unit 211 may include one or more microphones.

The gesture input unit 212 may convert a gesture input of a user into an electrical signal. The converted electrical signal may be provided to the interface processor 270 or the controller 170.

The gesture input unit 212 may include, for example, an infrared sensor or an image sensor for sensing a gesture input of a user.

In some implementations, the gesture input unit 212 may sense a three-dimensional (3D) gesture input of a user. To this end, the gesture input unit 212 may include a plurality of light emitting units for emitting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the interface processor 270 or the controller 170.

The touch input unit 213 may include a touch sensor for sensing a touch input of a user.

In some implementations, the touch input unit 213 may be formed integral with a display unit 251 to implement a touch screen. The touch screen may provide an input interface and an output interface between the vehicle 100 and the user.

The mechanical input unit 214 may include, for example, a button, a dome switch, a jog wheel, or a jog switch. An electrical signal generated by the mechanical input unit 214 may be provided to the interface processor 270 or the controller 170.

The mechanical input unit 214 may be located on a steering wheel, a center fascia, a center console, a cockpit module, a door, etc.

The occupant sensing unit 240 may sense an occupant inside the vehicle 100. The occupant sensing unit 240 may include an internal camera 220 and a biometric sensing unit 230.

The internal camera 220 may acquire images of the inside of the vehicle 100. The interface processor 270 may sense a state of a user based on the images of the inside of the vehicle 100. For example, a sensed state of a user may be about a user's eye gaze, face, behavior, facial expression, and location.

Based on the image of the inside of the vehicle 100 acquired by the internal camera 220, the interface processor 270 may determine the user's eye gaze, face, behavior, facial expression, and location. The interface processor 270 may determine the user's gesture based on an image of the inside of the vehicle 100. The determination made by the interface processor 270 based on the image of the inside of the vehicle 100 may be referred to as occupant information. In this case, the occupant information is information indicating a user's eye gaze direction, behavior, facial expression, and gesture. The interface processor 270 may provide the occupant information to the controller 170.

The biometric sensing unit 230 may acquire biometric information of the user. The biometric sensing unit 230 may include a sensor for acquire biometric information of the user, and may utilize the sensor to acquire the user's finger print information, heart rate information, brain wave information, etc. The biometric information may be used to authorize the user or to determine the user's state.

The interface processor 270 may determine a user's state based on a user's biometric information acquired by the biometric sensing unit 230. The user's state determined by the interface processor 270 may be referred to as occupant information. In this case, the occupant information is information indicating whether the user is in faint, dozing off, excited, or in an emergency situation. The interface processor 270 may provide the occupant information to the controller 170.

The output unit 250 is configured to generate a visual, audio, or tactile output.

The output unit 250 may include, for example, a display unit 251, a sound output unit 252, or a haptic output unit 253.

The display unit 251 may display graphic objects corresponding to various types of information.

The display unit 251 may include, for example, a Liquid Crystal Display (LCD), a Thin Film Transistor-Liquid Crystal Display (TFT LCD), an Organic Light-Emitting Diode (OLED), a flexible display, a 3D display, or an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include, for example, a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some examples, the user interface apparatus 200 may include a plurality of display units 251a to 251g.

For example, the display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the interface processor 270 or the controller 170 into an audio signal, and outputs the audio signal. To this end, the sound output unit 252 may include one or more speakers.

The haptic output unit 253 generates a tactile output. For example, the tactile output is vibration. The haptic output unit 253 vibrates a steering wheel, a safety belt, and seats 110FL, 110FR, 110RL, and 110RR so as to allow a user to recognize the output.

The interface processor 270 may control the overall operation of each unit of the user interface apparatus 200.

In some implementations, the user interface apparatus 200 may include a plurality of interface processors 270 or may not include the interface processor 270.

In some examples where the user interface apparatus 200 does not include the interface processor 270, the user interface apparatus 200 may operate under control of the controller 170 or a processor of a different device inside the vehicle 100.

In some examples, the user interface apparatus 200 may be referred to as a multimedia device for a vehicle.

The user interface apparatus 200 may operate under control of the controller 170.

The objection detection apparatus 300 is configured to detect an object outside the vehicle 100.

The object may include various objects related to travelling of the vehicle 100.

Referring to FIGS. 5 and 6, an object may include a lane OB10, a line distinguishing the lane OB10, a nearby vehicle OB11, a pedestrian OB12, a two-wheeled vehicle OB13, a traffic signal OB14 and OB15, a curb for distinguishing a sidewalk a light, a road, a structure, a bump, a geographical feature, an animal, etc.

The lane OB10 may be a driving lane in which the vehicle 100 is traveling, a lane next to the driving lane, and a lane in which an opposing vehicle is travelling. The lane OB10 may include left and right lines that define the lane.

The nearby vehicle OB11 may include a vehicle that is travelling in the vicinity of the vehicle 100. The nearby vehicle OB11 may be a vehicle located within a predetermined distance from the vehicle 100. For example, the nearby vehicle OB11 may be a vehicle that is preceding or following the vehicle 100. For another example, the nearby vehicle OB11 may be a vehicle travelling on a lane next to a lane in which the vehicle 100 is travelling.

The pedestrian OB12 may include a person in the vicinity of the vehicle 100. The pedestrian OB12 may be a person located within a predetermined distance from the vehicle 100. For example, the pedestrian OB12 may be a person on a sidewalk or on the roadway.

The two-wheeled vehicle OB13 is a vehicle that is in the vicinity of the vehicle 100 and moves using two wheels. The two-wheeled vehicle OB13 may be a vehicle that has two wheels located within a predetermined distance from the vehicle 100. For example, the two-wheeled vehicle OB13 may be a motorcycle or a bike on a sidewalk or the roadway.

The traffic signal OB14 and OB15 may include a traffic light OB15, a traffic sign plate OB14, and a pattern or text painted on a road surface.

The light may be light generated by a lamp provided in the nearby vehicle OB11. The light may be light generated by a street light. The light may be solar light.

The road may include a road surface, a curve, and slopes, such as an upward slope and a downward slope. The geographical feature may include a mountain, a hill, etc.

The structure may be a body located around the road in the state of being fixed onto the ground. For example, the structure may include a streetlight, a roadside tree, a building, a traffic light, a bridge, a curb, a guardrail, etc.

The object may be classified as a movable object or a stationary object. The movable object includes an object which is capable of moving. For example, the movable object may include a nearby vehicle and a pedestrian. The stationary object is an object which is incapable of moving. For example, the stationary object may include a traffic signal, a road, a structure, and a line.

The object detection apparatus 300 may detect an obstacle located outside the vehicle 100. The obstacle may be an object, a puddle on the road, an uphill start point, a downhill start point, an inspection pit, a bump, and a curb. The object may be an object having a volume and a mass.

The objection detection apparatus 300 may include a camera 310, a Radio Detection and Ranging (RADAR) 320, a Light Detection and Ranging (LIDAR) 330, an ultrasonic sensor 340, an infrared sensor 350, and a detection processor 370.

In some implementations, the objection detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may provide an acquired image to the detection processor 370. The camera 310 may be a mono camera, a stereo camera 310a, an Around View Monitoring (AVM) camera 310b, or a 360-degree camera.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In some examples, the camera 310 may be disposed near at least one of the side windows in the vehicle 100 in order to acquire images of the side of the vehicle 100. Alternatively, the camera 310 may be disposed around a side mirror, a fender, or a door.

The RADAR 320 may include an electromagnetic wave transmission unit and an electromagnetic wave reception unit. The RADAR 320 may be realized as a pulse RADAR or a continuous wave RADAR depending on the principle of emission of an electronic wave. In addition, the RADAR 320 may be realized as a Frequency Modulated Continuous Wave (FMCW) type RADAR or a Frequency Shift Keying (FSK) type RADAR depending on the waveform of a signal.

The RADAR 320 may detect an object through the medium of an electromagnetic wave by employing a time of flight (TOF) scheme or a phase-shift scheme, and may detect a location of the detected object, the distance to the detected object, and the speed relative to the detected object.

The RADAR 320 may be located at an appropriate position outside the vehicle 100 in order to sense an object located in front of the vehicle 100, an object located to the rear of the vehicle 100, or an object located to the side of the vehicle 100.

The LIDAR 330 may include a laser transmission unit and a laser reception unit. The LIDAR 330 may be implemented by the TOF scheme or the phase-shift scheme. The LIDAR 330 may be implemented as a drive type LIDAR or a non-drive type LIDAR.

When implemented as the drive type LIDAR, the LIDAR 330 may rotate by a motor and detect an object in the vicinity of the vehicle 100.

When implemented as the non-drive type LIDAR, the LIDAR 330 may utilize a light steering technique to detect an object located within a predetermined distance from the vehicle 100.

The LIDAR 330 may detect an object through the medium of laser light by employing the TOF scheme or the phase-shift scheme, and may detect a location of the detected object, the distance to the detected object, and the speed relative to the detected object.

The LIDAR 330 may be located at an appropriate position outside the vehicle 100 to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 to sense an object located in front of the vehicle 100, an object located to the rear of the vehicle 100, or an object located to the side of the vehicle 100.

The detection processor 370 may control the overall operation of each unit included in the objection detection apparatus 300.

The detection processor 370 may detect and track an object based on acquired images. Using an image processing algorithm, the detection processor 370 may: calculate the distance to the object and the speed relative to the object; determine an object's type, location, shape, color, and expected route; and determine content of a detected text.

The detection processor 370 may detect and track an object based RADAR, Radio Detection and Ranging which is formed as the result of reflection a transmission electromagnetic wave by the object. Based on the electromagnetic wave, the detection processor 370 may, for example, calculate the distance to the object and the speed relative to the object.

The detection processor 370 may detect and track an object based on a reflection laser light which is formed as the result of reflection of transmission laser by the object. Based on the laser light, the detection processor 370 may, for example, calculate the distance to the object and the speed relative to the object.

The detection processor 370 may detect and track an object based on a reflection ultrasonic wave which is formed as the result of reflection of a transmission ultrasonic wave by the object. Based on the ultrasonic wave, the detection processor 370 may, for example, calculate the distance to the object and the speed relative to the object.

The detection processor 370 may detect and track an object based on reflection infrared light which is formed as the result of reflection of transmission infrared light by the object. Based on the infrared light, the detection processor 370 may, for example, calculate the distance to the object and the speed relative to the object.

The detection processor 370 may generate object information based on at least one of the following examples: an image acquired using the camera 310, a reflected electromagnetic wave received using the RADAR 320, a reflected laser beam received using the LIDAR 330, a reflected ultrasonic wave received using the ultrasonic sensor 340, or a reflected infrared light received using the infrared sensor 350.

Object information may include information on a type, a location, a size, a shape, a color, a route, and a speed of an object in the vicinity of the vehicle 100, and content of a detected text.

For example, the object information may indicate one or more of the following examples: whether there is a lane in the vicinity of the vehicle 100; whether nearby vehicles are travelling at a time when the vehicle 100 is in a stop; whether there is a space available to park in the vicinity of the vehicle 100; a probability that the vehicle 100 collides with an object; a location of any pedestrian or bicycle in the vicinity of the vehicle 100; a type of the roadway on which the vehicle 100 is travelling; the current traffic signal indicated by a traffic light in the vicinity of the vehicle 100; and movement of the vehicle. The object information may be included in vehicle driving information.

The detection processor 370 may provide generated object information to the controller 170.

In some implementations, the objection detection apparatus 300 may include a plurality of detection processors 370 or may not include a separate detection processor. For example, each of the camera 310, the RADAR 320, the LIDAR 330, the ultrasonic sensor 340, and the infrared sensor 350 may include an individual processor.

The objection detection apparatus 300 may operate under control of the controller 170 or a processor inside the vehicle 100.

The communication apparatus 400 is configured to perform communication with an external device. Here, the external device may be one of a nearby vehicle, a mobile terminal, and a server.

To perform communication, the communication apparatus 400 may include, for example, a transmission antenna, a reception antenna, a Radio Frequency (RF) circuit capable of implementing various communication protocols, or an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and a communication processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using, for example, Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include at least one of a Global Positioning System (GPS) module, a Differential Global Positioning System (DGPS) module, or a Carrier phase Differential GPS (CDGPS) module.

For example, the location information unit 420 may acquire GPS information using a GPS module. The location information unit 420 may transfer the acquired GPS information to the controller 170 or the communication processor 470. The GPS information acquired by the location information unit 420 may be used for autonomous travelling of the vehicle 100. Based on GPS information and navigation information acquired using the navigation system 770, the controller 170 may control the vehicle 100 to travel autonomously.

The V2X communication unit 430 may be configured to perform wireless communication between a vehicle and a server (vehicle to infra (V2I) communication), wireless communication between a vehicle and a nearby vehicle (vehicle to vehicle (V2V) communication), or wireless communication between a vehicle and a pedestrian (vehicle to pedestrian(V2P) communication). The V2X communication unit 430 may include a radio frequency (RF) circuit that is capable of implementing protocols for the V2I communication, the V2V communication, and V2P communication.

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may perform communication with a server that provides an intelligent traffic system. The ITS communication unit 460 may receive information on various traffic situations from the server of the intelligence traffic system. Information on a traffic situation may include a level of traffic congestion, a traffic situation on each road, and an amount of traffics in each area.

The communication processor 470 may control the overall operation of each unit of the communication apparatus 400.

Vehicle driving information may include information received using, for example, the short-range communication unit 410, the location information unit 420, the V2X communication unit 430, the optical communication unit 440, or the broadcast transmission and reception unit 450.

For example, vehicle driving information may include information received from a nearby vehicle, the information which is about a location, a model, route, speed, various sensed values, etc. of a nearby vehicle. When information on various sensed values of the nearby vehicle is received, the controller 170 may acquire information on various objects in the vicinity of the vehicle 100, even though the vehicle 100 does not include an additional sensor.

For example, the vehicle driving information may indicate one or more of the following examples: a type, location, and movement of an object in the vicinity of the vehicle 100; whether nearby vehicles are travelling at a time when the vehicle 100 is in a stop; whether there is a space available to park in the vicinity of the vehicle 100; a probability that the vehicle 100 collides with an object; a location of any pedestrian or bicycle in the vicinity of the vehicle 100; a type of the roadway on which the vehicle 100 is travelling; the current traffic signal indicated by a traffic light in the vicinity of the vehicle 100; and movement of the vehicle.

In some implementations, the communication apparatus 400 may include a plurality of communication processors 470, or may not include a communication processor 470.

In a case where the communication apparatus 400 does not include the communication processor 470, the communication apparatus 400 may operate under control of the controller 170 or a processor of a device inside of the vehicle 100.

In some examples, the communication apparatus 400 may implement a vehicle multimedia device, together with the user interface apparatus 200. In this case, the vehicle multimedia device may be referred to as a telematics device or an Audio Video Navigation (AVN) device.

The communication apparatus 400 may operate under control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user command for steering the vehicle 100. The user command for steering may be a command corresponding to a specific steering angle. For example, a user command for steering may correspond to 45 degrees to right.

The steering input device 510 may take the form of a wheel to enable a steering input through the rotation thereof. In this case, the steering input device 510 may be referred to as a steering wheel or a handle.

In some implementations, the steering input device may be provided as a touchscreen, a touch pad, or a button.

The acceleration input device 530 may receive a user input for acceleration of the vehicle 100.

The brake input device 570 may receive a user input for deceleration of the vehicle 100. Each of the acceleration input device 530 and the brake input device 570 may take the form of a pedal.

In some implementations, the acceleration input device or the break input device may be configured as a touch screen, a touch pad, or a button.

The driving manipulation apparatus 500 may operate under control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some examples, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state, for instance.

In some examples, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some examples, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some examples, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may be controlled for passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner to supply cool air to the inside of the vehicle 100.

The vehicle drive apparatus 600 may include a processor. In some examples, each unit of the vehicle drive apparatus 600 may include its own processor.

The vehicle drive apparatus 600 may operate under control of the controller 170.

The operation system 700 is a system for controlling the overall driving operation of the vehicle 100. The operation system 700 may operate in the autonomous driving mode. The operation system 700 may perform autonomous driving of the vehicle 100 based on location information of the vehicle 100 and navigation information. The operation system 700 may include the driving system 710, the parking-out system 740, and the parking system 750.

In some implementations, the operation system 700 may further include other components in addition to the aforementioned components, or may not include some of the aforementioned component.

In some examples, the operation system 700 may include a processor. In some cases, each unit of the operation system 700 may include its own processor.

In a case where the operation system 700 is implemented as software, the operation system 700 may be a subordinate concept of the controller 170.

In some examples, the operation system 700 may include, for example, the user interface apparatus 200, the objection detection apparatus 300, the communication apparatus 400, the vehicle drive apparatus 600, or the controller 170.

The driving system 710 may perform driving of the vehicle 100.

The driving system 710 may perform autonomous driving of the vehicle 100 by providing a control signal to the vehicle drive apparatus 600 based on location information of the vehicle 100 and navigation information received from the navigation system 770.

The driving system 710 may perform driving of the vehicle 100 by providing a control signal to the vehicle drive apparatus 600 based on object information received from the objection detection apparatus 300.

The driving system 710 may perform driving of the vehicle 100 by providing a control signal to the vehicle drive apparatus 600 based on a signal received from an external device through the communication apparatus 400.

The parking-out system 740 may perform an operation of pulling the vehicle 100 out of a parking space.

The parking-out system 740 may perform an operation of pulling the vehicle 100 out of a parking space, by providing a control signal to the vehicle drive apparatus 600 based on location information of the vehicle 100 and navigation information received from the navigation system 770.

The parking-out system 740 may perform an operation of pulling the vehicle 100 out of a parking space, by providing a control signal to the vehicle drive apparatus 600 based on object information received from the objection detection apparatus 300.

The parking-out system 740 may perform an operation of pulling the vehicle 100 out of a parking space, by providing a control signal to the vehicle drive apparatus 600 based on a signal received from an external device.

The parking system 750 may perform an operation of parking the vehicle 100 in a parking space.

The parking system 750 may perform an operation of parking the vehicle 100 in a parking space, by providing a control signal to the vehicle drive apparatus 600 based on location information of the vehicle sd100 and navigation information received from the navigation system 770.

The parking system 750 may perform an operation of parking the vehicle 100 in a parking space, by providing a control signal to the vehicle drive apparatus 600 based on object information received from the objection detection apparatus 300.

The parking system 750 may perform an operation of parking the vehicle 100 in a parking space, by providing a control signal to the vehicle drive apparatus 600 based on a signal received from an external device.

The navigation system 770 may provide navigation information. The navigation information may include, for example, map information, information on a set destination, information on a route to the set destination, information on various objects along the route, lane information, or information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, ambient illumination information, information about the pressure applied to an accelerator pedal, and information about the pressure applied to a brake pedal. Information acquired by the sensing unit 120 may be included in vehicle driving information.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some examples, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The power supply unit 190 may supply power required to operate each component under control of the controller 170. For example, the power supply unit 190 may receive power from, for example, a battery inside the vehicle 100.

The controller 170 may control overall operation of each unit of the vehicle 100.

The controller 170 may be referred to as an Electronic Control Unit (ECU).

When the vehicle 100 is in an autonomous mode, the controller 170 may perform autonomous driving of the vehicle 100 based on information acquired using a device provided in the vehicle 100. For example, the controller 170 may control the vehicle 100 based on navigation information provided from the navigation system 770 or information provided from the object detection apparatus 300 or the communication apparatus 400. When the vehicle 100 is in a manual mode, the controller 170 may control the vehicle 100 based on an input signal corresponding to a user input that is received by the driving manipulation apparatus 500. When the vehicle 100 is in a remote control mode, the controller 170 may control the vehicle 100 based on a remote control signal received by the communication apparatus 400.

Various processors and the controller 170 included in the vehicle 100 may be implemented using, for example, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, or electric units for the implementation of other functions.

The vehicle 100 may include a lamp 800 for a vehicle. The lamp 800 may include various lighting devices provided in the vehicle 100. The lamp 800 may include a headlamp, a break lamp, a tail lamp, a turn signal lamp, a room lamp, etc. The following descriptions, the lamp 800 will be described mainly about a head lamp.

Figure 8:
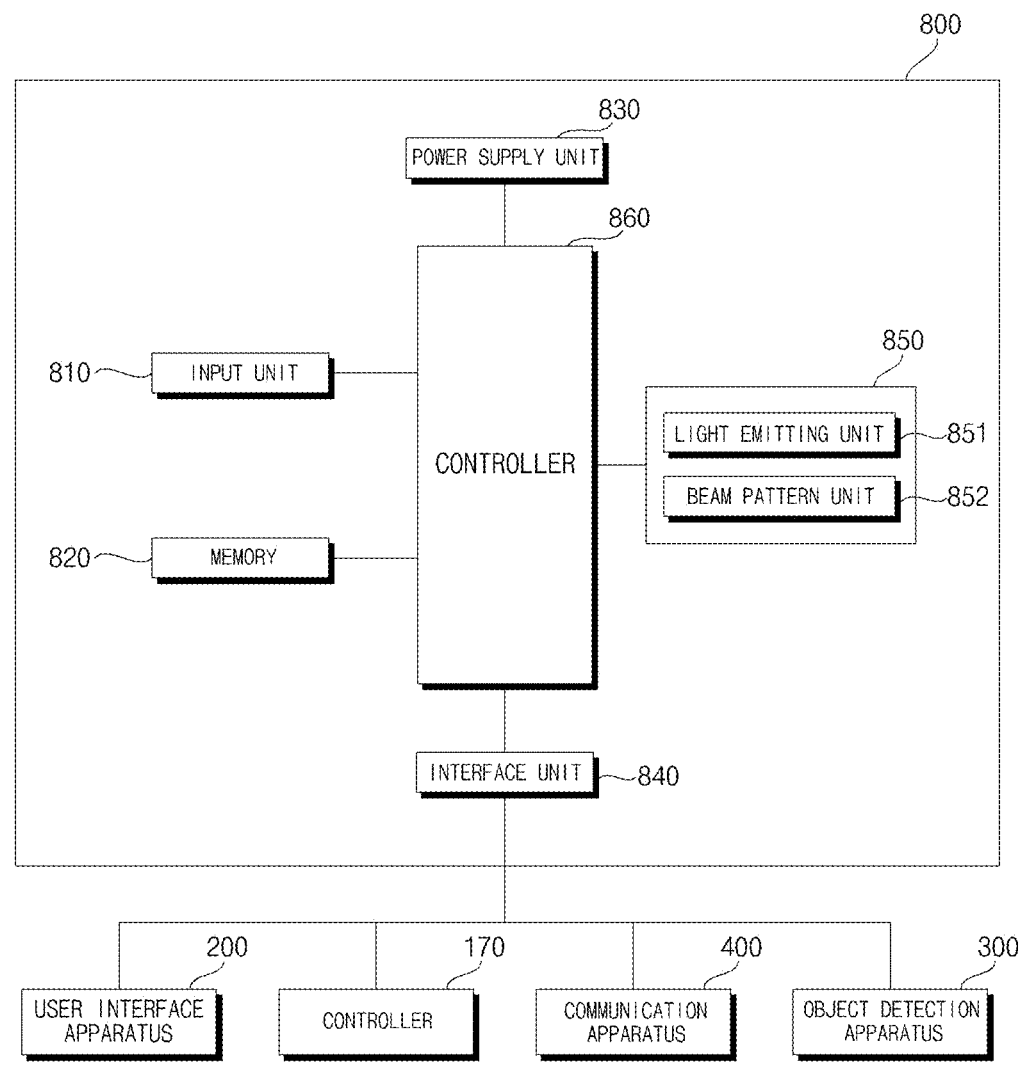
FIG. 8 is a block diagram illustrating an example structure of an example lamp for an example vehicle.

FIG. 8 is a block diagram of a structure of a lamp for a vehicle.

Referring to FIG. 8, the lamp 800 may include an input unit 810, a memory 820, an interface unit 840, a lamp module 850, and a controller 860. The lamp module 850 may include a light emitting unit 851 and a beam pattern unit 852. In some implementations, however, some of the elements shown in FIG. 8 may be omitted or a new element may be further included.

The input unit 810 may receive various user inputs. The input unit 810 may be electrically connected to the controller 860 to provide an electrical signal, corresponding a received user input, to the controller. Based on the electrical signal provided from the input unit 810, the controller 860 may generate a control signal corresponding to a user input, and provide the control signal to each unit of the lamp 800.

The input unit 810 may be disposed inside the vehicle. For example, the input unit 810 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 810 may include, for example, a voice input unit, a gesture input unit, a touch input unit, or a mechanical input unit.

The memory 820 is electrically connected to the controller 860. The memory 140 may store basic data for each unit, control data for the operational control of each unit, and input/output data. The memory 820 may be any of various hardware storage devices, such as a ROM, a RAM, an EPROM, a flash drive, and a hard drive. The memory 820 may store various data for the overall operation of the lamp 800, such as programs for the processing or control of the controller In some implementations, the memory 820 may be integrally formed with the controller 860 or may be implemented as a subordinate element of the controller 860.

The power supply unit 830 may supply power required for operations of the controller 860 and each element.

The interface unit 840 may act as a channel to various kinds of external devices connected to the lamp 800.

For example, the interface unit 840 may receive various kinds of information from the user interface apparatus 200, the object detection apparatus 300, the communication apparatus 400, and the controller 170. For example, the interface unit 840 may receive vehicle driving information and provide the received vehicle driving information to the controller 860.

The interface unit 840 may provide information, provided by the controller 860 of the lamp 800, to the controller 170 of the vehicle 100.

The interface unit 84 may have an external port via which connection to an external device is possible, and the interface unit 840 may exchange data with a mobile terminal via the external port.

The light emitting unit 851 may generate light and output the light. The light emitting unit 851 may include a light source unit 651 and a light source drive unit 652.

The light source unit 651 may be a device that generates light by converting electrical energy into light energy.

The light source unit 651 may include a light emitting element. For example, the light emitting element may include a Light Emitting Diode (LED), or a laser diode.

In some implementations, the light source unit 651 may include a plurality of light emitting elements. For example, the light source unit 651 may include a blue laser diode, a green laser diode, and a red laser diode.

In some implementations, the light source device may include a plurality of micro LEDs. The plurality of micro LEDs may be controlled individually by the light source drive unit 652.

The light source unit 651 may be driven based on an electrical signal provided from the light source drive unit 652.

The light source drive unit 652 may provide the light source unit 651 with an electrical signal for driving the light source unit 651. The electrical signal provided from the light source drive unit 652 may be generated under the control of the controller 860.

In some implementations, the light emitting unit 851 may further include a light conversion unit and an optical unit.

Using light output from the light emitting unit 851, the beam pattern unit 852 may form a specific image on a road surface onto which light from the lamp module 850 is projected. Hereinafter, a specific image formed on a road surface due to projection of light from the lamp module 850 onto the road surface may be referred to as a road surface projection image. The road surface projection image may be an image including a text or a mark, for instance.

By changing a pattern of light output from the light emitting unit 851 based on control of the controller 860, the beam pattern unit 852 may enable displaying a road surface projection image on a road surface outside the vehicle 100.

The beam pattern unit 852 may change the road surface projection image based on control of the controller 860. For example, the beam pattern unit 852 may change a form of the road surface projection image. The form of the road surface projection image may include a location, a shape, a color, a size, content, and brightness of the road surface projection image. Accordingly, the beam pattern unit 852 may change at least one of the location, the shape, the color, the size, the content, or the brightness of the road surface projection image.

The beam pattern unit 852 may include, for example, a Digital Micro-Mirror Device (DMD) module, a Micro Electro Mechanical System (MEMS) scanner module, and a transparent display module. The beam pattern unit 852 may form a road surface projection image using at least one of the DMD module, the MEMS scanner module, or the transparent display module.

The DMD module may change postures of multiple fine mirrors included in the DMD in accordance with a control of the controller 860, so that a specific image is displayed on a road surface. The DMD module will be described in more detail with reference to FIG. 9.

The MEMS scanner module may change a scanning path generated using a scanning mirror and a pattern of light output on the scanning path in accordance with a control of the controller 860, so that a specific image is displayed on a road surface. The MEMS scanner module will be described in more detail with reference to FIG. 8.

The display module may further include a transparent display panel. The controller 860 may control a specific image to be displayed on a transparent display module, and may control a light, output from the light emitting unit 851, to penetrate the transparent display module on which the specific image is displayed. Since the transparent display module has a predetermined transmittivity rate, the light output from the light emitting unit 851 may penetrate the transparent display module. Accordingly, the specific image displayed on the transparent display module may be displayed or projected on a road surface.

The controller 860 may be electrically connected to each unit of the lamp 800 to control overall operation of each unit.

The controller 860 may control the lamp module 850 to output a road surface projection image that visualize various kinds of information. For example, the controller 860 may control the lamp module 850 to output a road surface projection image corresponding to information which is, for example, about the current time, weather, traffic congestion in an area in which the vehicle 100 is travelling, an expected travel route of the vehicle 100, a set radio frequency, audio volume, set temperature of an air conditioner, a fuel state, a lane keeping state. Accordingly, at least one of a state indicator or an operation indicator may be displayed on a road surface in surroundings of the vehicle 100.

Based on vehicle driving information acquired during travelling of the vehicle, the controller 860 may control the lamp module 850 to output at least one of a state indicator or an operation indicator. The state indicator is a road surface projection image indicating important information needed to be recognized by an occupant, and the operation indicator is a road surface projection image indicating an operation that the occupant needs to perform.

The state indicator is a road surface projection image indicating important information needed to be recognized by an occupant. For example, the state indicator may include a road surface projection image composed of a text, a mark, a visualization, and any combination thereof, which indicate the following: the current speed of the vehicle, a legal speed limit set in an area where the vehicle 100 is travelling, a set driving route, the current time, weather, a schedule set by a user, error information of the vehicle 100, alarming about an object with which the vehicle 100 possibly collides, and notable features on an area in which the vehicle 100 is travelling.

The operation indicator may be a road surface projection image indicating an operation that the occupant needs to perform. For example, the operation indicator may be a road surface projection image composed of a text or mark that requires the occupant to brake, change steering, accelerate, or decelerate. For example, the operation indicator may be a road surface projection image which indicates that an occupant in the vehicle 100 is required to turn on a left/right-turn signal, change a battery, operate an air conditioner, change a tire, or fasten a seat belt.

If important information exists, the controller 860 projects a state indicator. Based on vehicle driving information, the controller 860 may determine whether important information exists. The presence of the important information may indicate occurrence of an event corresponding to the important information. For example, the situation where the vehicle 100 is travelling in an area having a speed limit may be important information, and the presence of the important information may indicate occurrence of an event indicating that the vehicle 100 is travelling in the area having the speed limit.

The controller 860 may control the lamp module 850 to output a state indicator that corresponds to important information determined to exist. The state indicator is displayed on a road surface. An occupant in the vehicle 100 may see the state indicator on the road surface and recognize the important information.

The important information may be information needed to be recognized by an occupant among driving situation information, vehicle state information, and occupant-related information.

The important information may be driving situation information needed to be recognized by an occupant. The driving situation information needed to be recognized by an occupant may be information about safety or violation of a traffic law by the vehicle 100 among information related to circumstances surrounding the vehicle 100. For example, the driving situation information needed to be recognized by an occupant may be information indicating an object which possibly collides with the vehicle 100, a traffic law possibly violated by the vehicle 100, a traffic light located along a travel route, deviation from an expected travel route, lane departure, and entrance into an area to pay attention.

In some examples, if it is determined or predicted, based on vehicle driving information, that an object which possibly collides with the vehicle 100 exists in the vicinity of the object, the controller 860 may determine that important information exists. In this case, the important information may be visualized as a text or a mark, which indicates information such as a location, a type, a probability of collision, a risk of collision, or a measure to avoid collision. The controller 860 may output a text or a mark, which indicates at least one of a location, a type, a probability of collision, a risk of collision, or a measure to avoid collision, as a state indicator.

In some examples, if it is determined, based on vehicle driving information, that a traffic law possibly violated by the vehicle 100 exists, the controller 860 may determine that important information exists. For example, the vehicle 100 might violate a traffic law where a speed limit is set in an area in which the vehicle 100 is travelling, where a lane in which the vehicle 100 is travelling or into which the vehicle 100 moves is a lane legally not allowed for the vehicle 100, or where an area into which the vehicle 100 is about to enter is a restricted area. In this case, if it is determined that a traffic law possibly violated by the vehicle 100 exists in the vicinity of the vehicle 100, the controller 860 may determine that important information exists. The important information may include information about, for example, a speed limit, a restricted lane, and a restricted area. The controller 860 may output at least one of a text or a mark, which indicates the speed limit, the restricted lane, and the restricted area as a state indicator.

In some examples, if it is determined, based on vehicle driving information, that a traffic light located along a travel route is changed, the controller 860 may determine that important information exists. For example, if it is determined to stop in response to the change in the traffic light during travelling of the vehicle 100, the controller 860 may determine that important information exists. In this case, the important information may be information about at least one of a location of the traffic light, a state of the traffic light, an expected signal, and an expected time to change. If the traffic light on the travel route is changed, the controller 860 may determine that important information exists. As a state indicator, the controller 860 may output a text or a mark, which indicates at least one of the location of the signal light, a signal state, an expected signal, or an expected time to change, for instance.

In some examples, if it is determined, based on vehicle driving information, that there is a probability of lane departure of the vehicle 100, the controller 860 may determine that important information exists. For example, if the current location of the vehicle 100 is out of a set route or if the vehicle 100 deviates from a set route unless it changes a lane within a predetermined period of time, the controller 860 may determine that there is a probability of route deviation of the vehicle 100. In this case, important information may be information on an expected travel route. The controller 860 may output a text or a mark indicating the expected travel route as a state indicator.

In some examples, if it is determined, based on vehicle driving information, that there is a probability of lane departure of the vehicle 100, the controller 860 may determine that important information exists. For example, if an angle of a direction of travel of the vehicle 100 relative to a traffic line is equal to or greater than a predetermined angle, if the center of the vehicle 100 is a predetermined distance or more off the center of a roadway, if the vehicle 100 enters a curve having a curvature equal to or greater than a predetermined value, or if a lane would be seen unclear due to a weather condition, the controller 860 may determine that there is a probability of lane departure of the vehicle 100. In this case, the important information may include information indicating a form, a direction of travel, and a location of the vehicle 100. The controller 860 may output a state indicator indicating a text or a mark which indicates, for example, the form of a lane, the direction of travel of the vehicle 100, and the location of the vehicle 100.

In some examples, if it is determined, based on vehicle driving information, that the vehicle 100 is entering into an area to pay attention, the controller 860 may determine that important information exists. For example, the area to pay attention may be an accident-prone zone, an icy road, a snowy road, a rainy road, a road filled with many obstacles, and a wildlife crossing zone. If the vehicle 100 is determined to enter into the area to pay attention, the controller 860 may output, as a state indicator, a text or a mark which indicates the area to pay attention.

The important information may be vehicle state information needed to be recognized by an occupant. The vehicle state information needed to be recognized by the occupant may include information about an error in various devices of the vehicle 100, speed information of the vehicle 100, and information which is determined needed to be recognized by an occupant from among On-Board-diagnostics (OBD) information.

In some examples, the OBD information may include parking brake state information, high beam ON/OFF state information, washer liquid state information, motor oil state information, power source overheat information, battery state information, fuel state information, tire pressure state information, brake oil state information, side mirror state information, information relating to an opened state of a trunk, information relating to a safety belt fastening state information, and door-opened-state information.

In some examples, if it is determined, based on vehicle driving information, that there is an error in a device provided in the vehicle 100, the controller 860 may determine that important information exists. In this case, the important information may be information about a device in which an error occurs. The controller 860 may output a text or a mark which indicates the device where an error occurred, as a state indicator.

In some examples, if it is determined, based on vehicle driving information, that a speed of the vehicle 100 is close to a speed limit or equal to/greater than the speed limit, the controller 860 may determine that important information exists. In this case, the important information may be information about the current speed of the vehicle 100 and the speed limit. As a state indicator, the controller 860 may output a text or a mark, which indicates the current speed of the vehicle 100 and the speed limit.

In some examples, if it is determined, based vehicle driving information, that information needed to be recognized by an occupant exists in OBD information of the vehicle 100, the controller 860 may determine that important information exists. For example, if the On state of a high beam is detected when an opposing vehicle is coming close, if the Off state of the high beam detected when illumination is equal to or less than a preset value, if a lack of washer liquid is detected, if a low level of motor oil is detected, if overheat of a power source is detected, if running out of a battery is detected, if an error in tire pressure is detected, if a lack of break oil is detected, if folding of a side mirror is detected during travelling of the vehicle 100, if opening of a trunk is detected, if unfastening of a seat belt is detected, or if opening of a door is detected, the controller 860 may determine detected information is important information. The controller 860 may output a text or a mark, which indicates the detected information, as a state indicator.

The important information may be occupant-related information needed to be recognized by an occupant. The occupant-related information may include at least one of the following examples: information about a mobile terminal of the occupant, Point of Interest (POI) information of the occupant, schedule information of the occupant, or occupant state information provided by the occupant sensing unit. The vehicle driving information may include the occupant-related information. Based on the vehicle driving information, the controller 860 may determine whether there is occupant-related information needed to be recognized by an occupant.

For example, if it is determined that an incoming call or a text message is received by a mobile terminal of an occupant during travelling of the vehicle 100, the controller 860 may determine that important information exists. In this case, important information may include information about the incoming call or text message. The controller 860 may output a text or a mark which indicates caller information and content of the incoming call or text message, as a state indicator.

For example, if a POI of an occupant exists within a preset distance from the vehicle 100, the controller 860 may determine that important information exists. In this case, the important information may be information about the POI of the occupant, which is located within the preset distance from the vehicle 100. The controller 860 may output a text or a mark which indicates the information about the POI of the occupant located within the preset distance from the vehicle 100.

For example, if the current time corresponds to the schedule of an occupant, the controller 860 may determine that important information exists. In this case, the important information may be information about the schedule of the occupant corresponding to the current time. As a state indicator, the controller 860 may output a text or a mark, which indicates the schedule of the occupant corresponding to the current time.

If a dangerous situation could happen unless an occupant performs a specific operation, the controller 860 may project an operation indicator.

The operation indicator may include a road surface projection image which indicates an operation that the occupant needs to perform. The operation indicator may include a first operation indicator indicating an operation related to the driving manipulation apparatus 500 (see FIG. 7), and a second operation indicator indicating an operation unrelated to the driving manipulation apparatus 500 (see FIG. 7).

The operation related to the driving manipulation apparatus 500 (see FIG. 7) may include changing a steering direction of the vehicle 100 by manipulating the steering input device 510 (see FIG. 7), changing a speed of the vehicle 100 by manipulating the acceleration input device 530 (see FIG. 7), or braking the vehicle 100 by manipulating the brake input device 570 (see FIG. 7).

The operation unrelated to the driving manipulation apparatus 500 (see FIG. 7) may be an operation of manipulating a device other than the driving manipulation apparatus 500 (see FIG. 7) among devices included in the vehicle 100. For example, an operation that an occupant needs to perform may be fastening a seat belt, or operating a device such as a wiper and an air conditioner.

An operation that an occupant needs to perform may be a specific operation that the occupant needs to perform in order to prevent the dangerous situation. For example, the operation that the occupant needs to perform may be an operation required to prevent the vehicle 100 from colliding with an object, violating a traffic law/signal, deviating from a lane, or deviating from a preset travel route.

Based on vehicle driving information, the controller 860 may determine the specific operation required to prevent the dangerous situation.

For example, the dangerous situation may include an event related to safety of the vehicle 100, collision with an object, violation of a traffic signal, violation of a traffic law, lane departure, or route deviation.

For example, the dangerous situation may be an event in which the vehicle 100 collides with an object. In this case, the object may be a nearby vehicle, a pedestrian, a structure, an animal, and any other obstacle. Based on vehicle driving information, the controller 860 may determine whether the vehicle 100 is expected to collide with an object if the vehicle 100 is maintained in the current driving state. The controller 860 may determine manipulation of the driving manipulation apparatus 500 (see FIG. 7), which is required for an occupant to perform in order to avoid the object. In this case, the controller 860 may output, as an operation indicator, a text or mark which indicates manipulation of the driving manipulation apparatus 500 (see FIG. 7) required for the occupant to perform.

In some examples, the dangerous situation may be an event in which the vehicle 100 violates a traffic law or signal. When it is determined, based on vehicle driving information, that the vehicle 100 is expected to violate a traffic law if maintained in the current driving state, the controller 860 may display an operation, which is required for an occupant to perform in order to avoid violation of the traffic law, as a road surface projection image.

In some examples, the dangerous situation may be an event in which the vehicle 100 deviates from a lane or an expected route. When it is determined, based on vehicle driving information, that the vehicle 100 is expected to deviate from a lane or an expected route if maintained in the current driving state, the controller 860 may display an operation, which is required for an occupant to perform in order to avoid the lane departure or the route deviation, as a road surface projection image.

The operation indicator may include a target operation indicator, which indicates a target operation required for the occupant to perform, and an ongoing operation indicator, which indicates an operation being performed by the occupant.

The controller 860 may display the target operation indicator and the ongoing operation indicator in the form of dynamic images that move in accordance with a manipulation state of the driving manipulation apparatus 500 (see FIG. 7). In this case, the target operation indicator and the ongoing operation indicator are displayed in the form of dynamic images that moves in accordance with a manipulation state of the driving manipulation apparatus 500 (see FIG. 7).

Based on vehicle driving information, the controller 860 may determine at least one of a location, form, or projection time of a state indicator or operation indicator.

Hereinafter, the following description is about how the controller 860 determines a form or projection time of the state indicator based on vehicle driving information.

The controller 860 may determine at least one of a form or a projection time of the state indicator based on a caution level of important information. The controller 860 may determine the caution level of important information based on vehicle driving information.

The caution level of important information is an indicator showing that an occupant needs to recognize the important information. For example, caution levels may range from Level 1 to Level 5. An increased caution level of important information may correspond to an increased need for recognition of important information by an occupant.

For example, a caution level of important information about collision between the vehicle 100 and an object may increase in proportion to a probability of collision. For example, a caution level of important information about violation of a traffic law by the vehicle 100 may increase in proportion to a probability of violation of a traffic law.

Based on vehicle driving information, the controller 860 may determine a probability of coalition, a probability of violation of a traffic law, a probability of lane departure, and a degree of danger in the current driving area. Based on the determination as to the probability of coalition, the probability of violation of a traffic law, the probability of lane departure, and the degree of danger in the current driving area, the controller 860 may determine a caution level of important information. For example, the controller 860 may determine that a caution level increases if the probability of coalition, the probability of violation of a traffic law, the probability of lane departure, or the degree of danger in the current driving area is high.

Based on a caution level of important information, the controller 860 may determine the form of a state indicator corresponding to the important information. The form of the state indicator may include at least one of a location, a shape, a size, content, or brightness of the state indicator to be projected on a road surface.

For example, the controller 860 may determine the form of a state indicator, so that a caution level of important information and a size of a state indicator becomes proportional to each other. In this case, the size of the state indicator may increase in proportion to the caution level.

For example, if a caution level of important information is equal to or higher than a set value, the controller 860 may change a color of a state indicator. For example, if a caution level is less than a set value, the controller 860 may determine yellow to be color of a state indicator. If a caution level is equal to or higher than a preset value, the controller 860 may determine red to be color of a state indicator.

For example, the controller 860 may determine the form of a state indicator such that the higher the caution level of important information, the simpler the form or content of the state indicator becomes. Some examples where the content of a state indicator becomes simple may include any one of the following: a state indicator including a text and a mark has changed to include either the text or the mark; a text or mark of a state indicator becomes simple; a state indicator including a mark has changed to include a text; or a state indicator including a text has changed to include a mark.

For example, the controller 860 may advance the projection time of a state indicator if a caution level of important information increases. The projection time is the time at which the state indicator or the operation indicator starts to be projected. A state indicator showing important information with a relatively high caution level may be displayed earlier than a state indicator showing important information with a relatively low caution level.

Hereinafter, the following description is about how the controller 860 determines a form or projection time of an operation indicator based on vehicle driving information.

Based on a caution level of a dangerous situation, the controller 860 may determine at least one of a form or a projection time of an operation indicator. The controller 860 may determine a caution level of the dangerous situation based on vehicle driving information.

A caution level of the dangerous situation is an indicator showing a degree of danger in a dangerous situation. For example, caution levels may range from Level 1 to Level 5. An increased caution level of a dangerous situation may be an increased degree of danger in the dangerous situation.

For example, a degree of danger in a dangerous situation may be proportional to a probability of collision of the vehicle 100, a probability of violation of a traffic signal or law, a probability of lane departure or route deviation, and a probability of entrance into a restricted area.

For example, a caution level of a dangerous situation related to collision of the vehicle 100 with an object may increase in proportion to a probability of the collision. For example, a caution level of a dangerous situation related to violation of a traffic law by the vehicle 100 may increase in proportion to a probability of violation of a traffic law by the vehicle 100.

Based on vehicle driving information, the controller 860 may determine a probability of collision, a probability of violation of a traffic law, a probability of lane departure, and a degree of danger in an area in which the vehicle 100 is travelling, wherein the probability of collision, the probability of violation of a traffic law, the probability of lane departure, and the degree of danger in an area in which the vehicle 100 is travelling correspond to a dangerous situation.

Based on the determination as to the probability of collision, the probability of violation of a traffic law, the probability of lane departure, and the degree of danger in the current driving area, the controller 860 may determine a caution level of the dangerous situation. For example, the controller 860 may determine that the higher the probability of collision, the probability of violation of a traffic law, the probability of lane departure, or the degree of danger in the current driving area, the higher the caution level becomes.

Based on a caution level of a dangerous situation, the controller 860 may determine the form of an operation indicator corresponding to the dangerous situation. The form of an operation indicator may include, for example, a location, a shape, a size, content, or brightness of the operation indicator to be projected on a road surface.

For example, the controller 860 may determine the form of an operation indicator, so that the size of the operation indicator becomes proportional to a caution level of a dangerous situation. In this case, the higher the caution level, the greater the size the operation indicator.

For example, if a caution level of a dangerous situation is equal to or higher than a set value, the controller 860 may change color of an operation indicator. For example, if a caution level of a dangerous situation is less than a set value, the controller 860 may determine yellow to be color of an operation indicator. For example, if a caution level of a dangerous situation is equal to or higher than a set value, the controller 860 may determine red to be color of an operation indicator.

For example, the controller 860 may determine the form of an operation indicator such that the higher the caution level of a dangerous situation, the simpler the form or content of the operation indicator becomes. Some examples where the content of an operation indicator becomes simple may include any one of the following examples: an operation indicator consisting of a text and a mark has changed to consist of either the text or the mark; a text or mark of an operation indicator becomes simple; that an operation indicator consisting of a mark has changed to consist of a text; or an operation indicator consisting of a text has changed to consist of a mark.

For example, the controller 860 may advance the projection time of an operation indicator if a caution level of a dangerous situation increases. An operation indicator showing a dangerous situation with a relatively high caution level may be displayed earlier than an operation indicator showing a dangerous situation with a relatively low caution level.

Based on vehicle driving information, the controller 860 may determine a projection location of a state or operation indicator.

In some implementations, the controller 860 may determine a projection location of an operation indicator to be a region on a road surface, at which an occupant is staring.

Based on occupant information provided by the occupant sensing unit, the controller 860 may determine an area region outside the vehicle 100 at a location where an occupant is staring.

When outputting an operation indicator, the controller 860 may determine a location of the operation indicator, so that the operation indicator is displayed in a region on a road surface, which is stared at by an occupant. For example, the operation indicator is projected to a location where the vehicle 100 is heading toward. As a result, a driver of the vehicle 100 is able to quickly recognize the operation indicator and thus rapidly perform an operation for avert a dangerous situation.

In some implementations, the controller 860 may determine a projection location of a state indicator to be a region on a road surface, which corresponds to an object related to important information.

Based on vehicle driving information, the controller 860 may determine a region on a road surface, which corresponds to the object related to the important information. For example, if important information is information about an object which possibly collides with the vehicle 100, a region on a road surface corresponding to an object related to the important information may be a region within a predetermined distance from the object which possibly collide with the vehicle 100. For example, if important information is information about a driving lane from which the vehicle 100 possibly deviates, a region on a road surface corresponding to an object related to the important information may be a region within a predetermined distance from the driving lane in which the vehicle 100 is travelling.

When outputting a state indicator, the controller 860 may determine a location of the state indicator, so that the state indicator is displayed in a region on a road surface, which corresponds to an object related to important information.

In some implementations, the controller 860 may determine a projection location of a state indicator or an operation indicator, so that an interval between the vehicle 100 and the state indicator or operation indicator becomes proportional to a speed of the vehicle 100.

The controller 860 may control the lamp module 850, so that the greater the speed of the vehicle 100, the farther the state indicator or the operation indicator displayed from the vehicle 100. If a speed of the vehicle 100 increases, a driver looks farther ahead. Accordingly, the lamp 800 may determine a location of a state indicator or an operation indicator in proportion of a speed of the vehicle 100, so that a driver can easily recognize the state indicator or the operation indicator.

The controller 860 may output at least one of a state indicator or an operation indicator, and then change the state indicator or the operation indicator based on vehicle driving image.

When a state indicator is projected and a caution level of important information is changed, the controller 860 may change the form of the projected state indicator.

The controller 860 may output a state indicator, and then determine a caution level of important information corresponding to the output state indicator. Based on the determined caution level, the controller 860 may change the form of the state indicator corresponding to the important information. The form of the state indicator may include, for example, at least one of a location, a shape, a color, a size, content, or brightness of the state indicator.

For example, if a caution level of important information is changed, the controller 860 may change the size of a state indicator. The controller 860 may change the form of the state indicator, so that the size of the state indicator becomes proportional to the caution level of the important information. In this case, the higher the caution level, the greater the size of the state indicator displayed on a road surface.

For example, if a caution level of important information is changed, the controller 860 may change a color of a state indicator. For example, the controller 860 may control the lamp module 850 such that the state indicator changes from yellow to red when a caution level of important information increases.

For example, if a caution level of important information increases, the controller 860 may change the form of a state indicator, so that the content or form of the state indicator becomes simple. Some examples where the content of a state indicator becomes simple may include any one of the following examples: a state indicator consisting of a text and a mark has changed to consist of either the text or the mark; a text or mark of a state indicator becomes simple; a state indicator consisting of a mark has changed to consist of a text; or a state indicator consisting of a text has changed to consist of a mark.

When an operation indicator is projected and a dangerous situation is addressed, the controller 860 may stop projecting of the operation indicator. Based on vehicle driving information, the controller 860 may determine whether a dangerous situation corresponding to the projected operation indicator is addressed. If it is determined that the dangerous situation corresponding to the operation indicator is addressed, the controller 860 may control the lamp module 850 to stop outputting the operation indicator.

When an operation indicator is projected and an operation corresponding to the operation indicator is performed, the controller 860 may stop projecting of the operation indicator. Based on vehicle driving information, the controller 860 may determine whether a driver performs an operation corresponding to the projected operation indicator. For example, in the case where an operation indicator is projected to indicate turning a steering wheel to the right at a specific angle, if it is determined, based on vehicle driving information, that the steering wheel of the vehicle 100 is turned to the specific angle in the right direction, the controller 860 may determine that an operation corresponding to the operation indicator is performed. If the operation corresponding to the operation indicator is performed, a dangerous situation corresponding to the projected operation indicator may be addressed. Thus, the controller 860 may control the lamp module 850 to make the projected operation indicator disappear.

If important information exists, the controller 860 may project a state indicator. Then, if a dangerous situation is expected to happen, the controller 860 may stop projecting the state indicator and instead project an operation indicator. If it is determined that a state indicator is being projected and a dangerous situation exists, the controller 860 may control the lamp module 850 to make the state indicator disappear and to output an operation indicator corresponding to the determined dangerous. In this case, only the operation indicator is displayed on a road surface, and therefore, a driver may quickly and accurately recognize the operation indicator.

The controller 860 may determine a warning level of important information or a dangerous situation based on vehicle driving situation. Then, the controller 860 may control the lamp module 850, so that the higher the determined caution level, the faster the state/operation indicator flashes. As a result, at a higher caution level, a driver may quickly recognize the state/operation indicator.

The controller 860 may be implemented using, for example, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, or electric units for the implementation of other functions.

Figure 9:
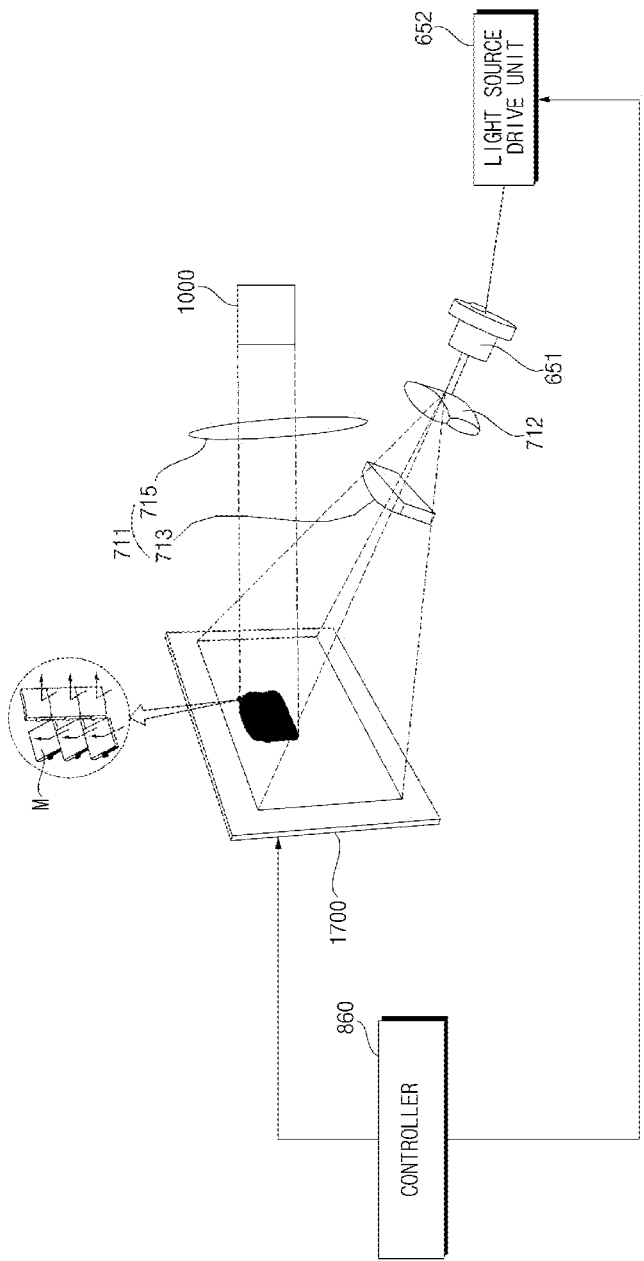
FIG. 9 is a diagram of an example of displaying a road surface projection image using a Digital Micro-Mirror Device (DMD).

FIG. 9 is a diagram for explanation of displaying a road surface projection image using a DMD module.

Referring to FIG. 9, the light emitting unit 851 may include a light source unit 651, a light source drive unit 652, a light conversion unit 712, and an optical unit 711. In addition, the beam pattern unit 852 may include a DMD module 1700.

A light emitting element included in the light source unit 651 may convert electrical energy into light. For example, a light emitting element in the light source unit 651 may include a Light Emitting Diode (LED) or a laser diode. When a laser diode is used as a light source, the laser diode may realize brightness much greater than an LED. The following description is provided in the assumption that a laser diode is used as the light source unit 651.

The light source drive unit 652 may provide the light source unit 651 with an electrical signal for driving the light source unit 651. The electrical signal provided by the light source drive unit 652 may be generated under the control of the controller 860.

The light conversion unit 712 may convert a laser beam, emitted from the light source unit 651, into a specific color. For example, a laser beam, emitted from the light source unit 651, may be converted into lights of multiple wavelengths when passing through the light conversion unit 712. Light including multiple wavelengths may be combined into a visible light of a specific color such as white.

The light conversion unit 712 may include at least one type of phosphor. For example, the light conversion unit 712 may include a phosphorous.

The optical unit 711 may include a first lens 713 and a second lens 715.

The first lens 713 may cause visible light, which is incident through the light conversion unit 712, to be refracted and provide the refracted light toward the DMD module 1700. The first lens 713 may cause a visible light, which is emitted from the light conversion unit 712, to be refracted, so that the visible light is transferred to the DMD module 1700. For example, the first lens 713 may be a collimator lens. The incident visible light may be collimated by the first lens 713.

The DMD module 1700 may change a pattern of incident visible light. The DMD module 1700 may determine a road surface projection image by changing the pattern of the visible light. The DMD module 1700 may change a displayed road surface projection image by changing the pattern of the visible light.

The DMD module 1700 may include a plurality of micro-mirrors M. For example, the DMD module 1700 may include tens of thousands of micro-mirrors M.

The DMD module 1700 may include: a mirror layer including a plurality of micro-mirrors; a drive layer including a plurality of yokes formed to respectively correspond to the plurality of micro-mirrors and plurality of hinges; a metal layer at which the plurality of yokes arrive and which supports the plurality of hinges; and a semiconductor memory 820 (e.g., a CMOS SRAM).

The plurality or yokes and hinges included in the drive layer may receive a signal from the semiconductor memory 820 to adjust a posture of each of the micro-mirrors. For example, the plurality of yokes and hinges may make the plurality of micro-mirrors tilted in accordance with a signal provided from the semiconductor memory 820.

Under the control of the controller 860, the semiconductor memory 820 may provide a signal for adjusting the posture of the plurality of micro-mirrors.

In some examples, by controlling a tilt angle for each of the micro-mirrors M individually, the controller 860 may adjust a projection angle and/or reflectance of a visible light on a pixel unit basis. For example, each micro-mirror M may change a tilt angle more than thousands of times per second due to a magnetic field. Due to the change of the tilt angle, a tilt angle of at least a portion of visible light emitted from the first lens 713 toward the DMD module 1700 may be changed. Accordingly, at least a portion of the visible light emitted from the first lens 713 may be blocked from being projected in front of the vehicle 100.

Due to the DMD module 1700, at least a portion of visible light emitted from the first lens 713 may pass through the second lens 715 and be then projected in front of the vehicle 100. In some implementations, the second lens 715 may be omitted.

Based on first information received, the controller 860 may control the posture of some micro-mirrors M included in the DMD module 1700 so as to realize visible lights in various patterns. By controlling the posture of the micro-mirrors M, the controller 860 may display a road surface projection image corresponding to the first information in the outside of the vehicle 100. By controlling the posture of the micro-mirrors M, the controller 860 may change the road surface projection image displayed to correspond to second information.

In some examples, the DMD module 1700 in FIG. 9 may output a visible light for displaying a road surface projection image, and a visible light for securing visibility.

Using the DMD module 1700, the controller 860 may output, at an interval, the visible light for displaying a road surface projection image and the visible light for securing visibility. As the controller 860 alternatively outputs the two types of visible light at an interval which cannot be recognized by a human's eyes, the DMD module 1700 may output both the two types of visible light.

In some implementations, the light emitting unit 851 may further include one or more reflectors which is disposed on an optical path along which light, generated by the light source unit 651, is output to the outside.

Figure 10:
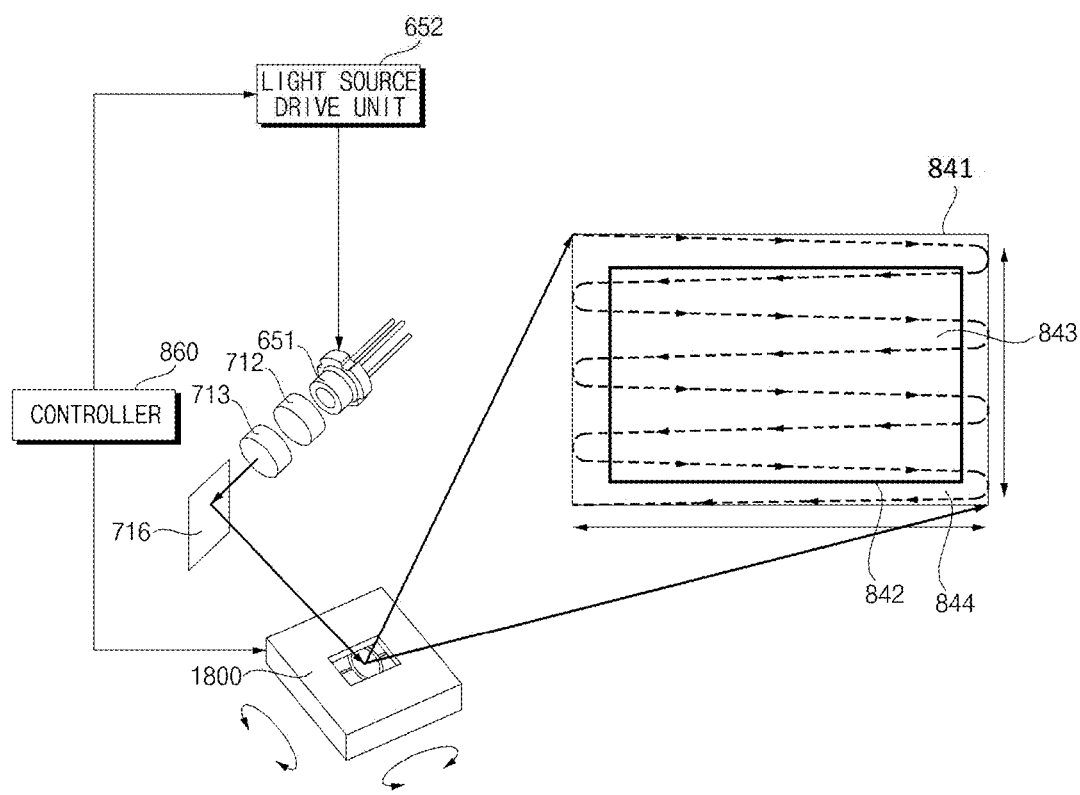
FIG. 10 is a diagram of an example of displaying a road surface projection image using a Micro Electro Mechanical System (MEMS) scanner module.

FIG. 10 is a diagram for explanation of displaying a road surface projection image using an MEMS scanner module.

Referring to FIG. 10, the light emitting unit 851 may include a light source unit 651, a light source drive unit 652, a light conversion unit 712, an optical unit 711, and a reflector 716. In addition, the beam pattern unit 852 may include an MEMS scanner module 1800.

A light emitting element included in the light source unit 651 may convert electrical energy into light. For example, a light emitting element of the light source unit 651 may include a Light Emitting Diode (LED) or a laser diode. When a laser diode is used as a light source, it may realize brightness greater than LED. The following description is provided in the assumption that a laser diode is used as the light source unit 651.

The light source drive unit 652 may provide the light source unit 651 with an electrical signal for driving the light source unit 651. The electrical signal provided by the light source drive unit 652 may be generated under the control of the controller 860.

The light conversion unit 712 may convert a color of a laser beam emitted toward the light source unit 651 into a specific color. For example, a laser beam emitted from the light source unit 651 may be converted into lights of multiple wavelengths when passing through the light conversion unit 712. The lights of multiple wavelengths may be combined into a visible light of a specific color (e.g., white).

The light conversion unit 712 may include at least one type of phosphor. For example, the light conversion unit 712 may include a phosphorus.

The optical unit 711 may include a first lens 713.

The first lens 713 may cause visible light, which is incident through the light conversion unit 712, to be refracted and provide the refracted light to the MEMS scanner module 1800. The first lens 713 may cause visible light, emitted from the light conversion unit 712, to be refracted, so that the visible light is transferred to the MEMS scanner module 1800. For example, the first lens 713 may be a collimator lens. The incident visible light may be collimated by the first lens 713.

The reflector 716 may change an optical path. The reflector 716 may reflect light passing through the first lens 713, so that the light is transferred to the MEMS scanner module 1800. In some implementations, the reflector 716 may be omitted.

The MEMS scanner module 1800 may include: a scanner mirror, a structure which supports a scanner mirror; and a drive unit for driving the scanner mirror. For example, the drive unit may include a magnet. The drive unit may rotate the scanner mirror based on an electromagnetic wave that is generated by an applied current.

The drive unit may drive the scanner mirror under the control of the controller 860.

The scanner mirror may be rotated upon operation of the drive unit. As the scanner mirror is rotated, an optical path for a visible light incident on the scanner mirror may be changed continuously.

The MEMS scanner module 1800 may generate a scanning path based on rotation of the scanner mirror. The scanning path may be a path along which a visible light reflected by the scanner mirror is output.

For example, the MEMS scanner module 1800 may receive a visible light, and perform a first-direction scanning and a second-direction scanning sequentially and repeatedly.

As shown in the drawing, the MEMS scanner module 1800 may scan an area in an external region 841 from left to right and then from right to left in a diagonal or horizontal direction. In addition, the MEMS scanner module 1800 may repeatedly perform such a scanning operation on the entire area of the external region 841. As a result, a projection image corresponding to a visible light may be displayed in the outside.

By controlling rotation of the scanner mirror, the controller 860 is able to control a scanning path and therefore realize a visible light of various patterns. By controlling rotation of the scanner mirror, the controller 860 may display a road surface projection image corresponding to first information in an area outside the vehicle 100. By controlling rotation of the scanner mirror, the controller 860 may change a displayed road surface projection image to correspond to second information.

In some examples, the MEMS scanner module 1800 in FIG. 10 may output both visible light for displaying a road-surface-projected light and visible light for securing visibility.

Using the MEMS scanner module 1800, the controller 860 may output, at an interval, the two types of visible light. As the controller 860 alternatively outputs the two types of visible light at an interval which cannot be recognized by a human's eyes, the MEMS scanner module 1800 may output both the two types of visible light.

Figure 11:
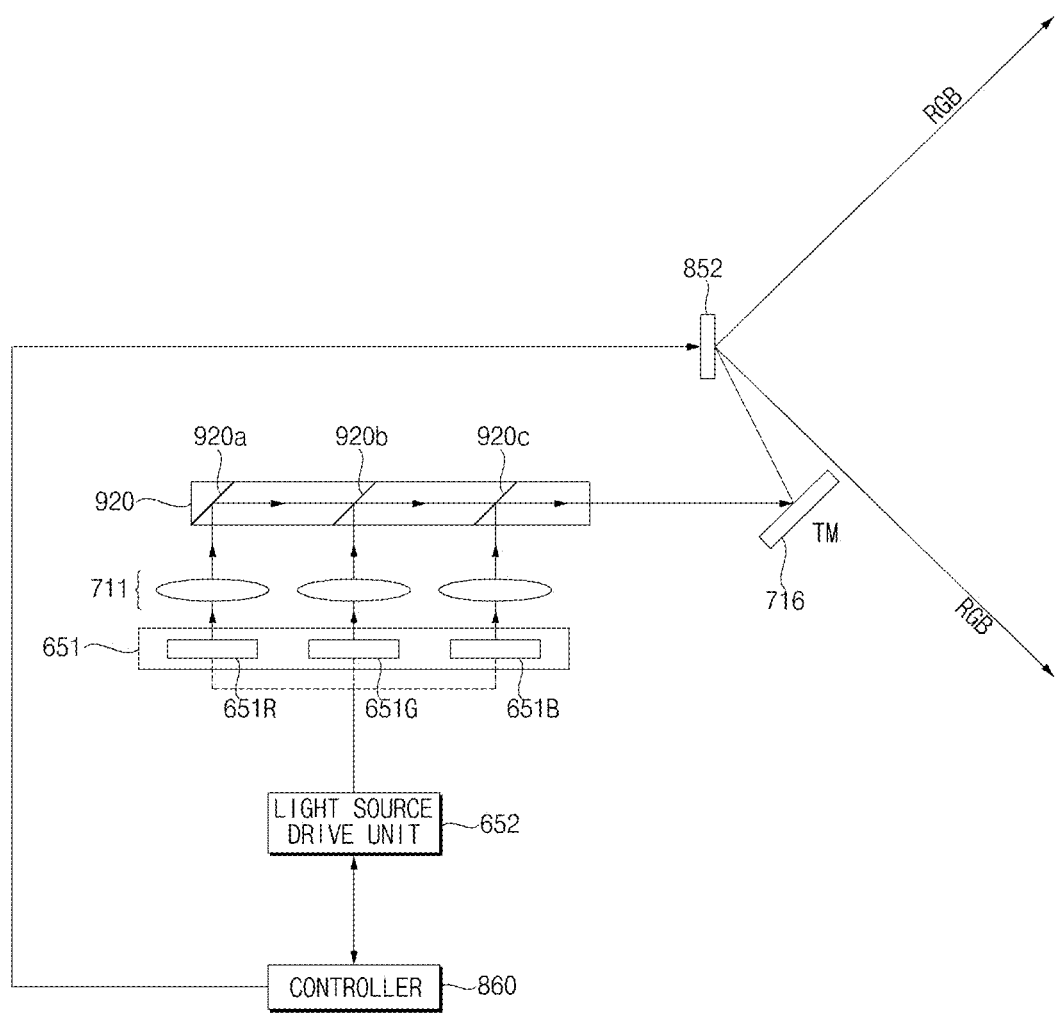
FIG. 11 is a diagram showing an example lamp for a vehicle which includes a plurality of light sources in a light emitting unit.

FIG. 11 is a diagram for explanation of a lamp for a vehicle in the case where a plurality of light sources is included in a light emitting unit.

Referring to FIG. 11, the light emitting unit 851 may include a light source unit 651, a light source drive unit 652, an optical unit 711, a light combining unit 920, and a reflector 716.

The light source unit 651 may include a plurality of light emitting elements 651R, 651G, and 651B. For example, the light source unit 651 may include a red laser diode 651R, a green laser diode 651G, and a blue laser diode 651B.

The light source drive unit 652 may provide the light source unit 651 with an electrical signal for driving the light source unit 651. The electrical signal provided by the light source drive unit 652 may be generated under the control of the controller 860.

A red light, a green light, and a blue light output from the light source units 651R, 651G, and 651B may be collimated via each collimator lens in the optical unit 711.

The light combining unit 920 may combine lights output from the light source unit 651R, 651G, and 651B, and output a combined light in one direction. To this end, the light combining unit 920 may include three 2D MEMS mirrors 920a, 920b, and 920c.

In some examples, a first light combining unit 920a, a second light combining unit 920b, and a third light combining unit 920c may, respectively, output a red light from a red light source unit 651R, a green light from a green light source unit 651G, and a blue light from a blue light source unit 651B in a direction toward the beam pattern unit 852.

The reflector 716 reflects the red light, the green light, and the blue light, which pass through the light combining unit 920, in the direction toward the beam pattern unit 852. The reflector 716 may reflect lights of various wavelengths, and, to this end, the Reflector™ may be implemented as a Total Mirror™.

The beam pattern unit 852 may selectively include a Digital Micro-Mirror Device (DMD) module 1700, and a Micro Electro Mechanical System (MEMS) scanner module 1800.

In the case where the beam pattern unit 852 includes the DMD module 1700, as described above with reference to FIG. 9, the controller 860 may display a road surface projection image corresponding to first information, and change the displayed road surface projection image to correspond to second image.

In the case where the beam pattern unit 852 includes the MEMS scanner module 1800, as described above with reference to FIG. 10, the controller 860—may display a road surface projection image corresponding to first information, and change the displayed road surface projection image to correspond to second information.

Figure 12:
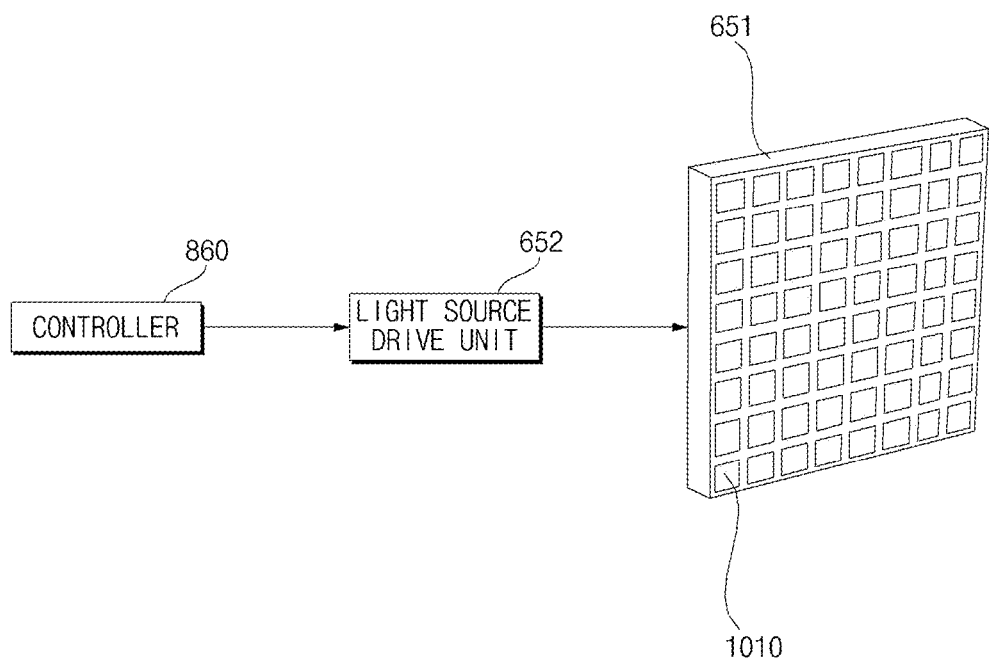
FIG. 12 is a diagram showing an example light source unit.

FIG. 12 is a diagram for explanation of a light source unit.

Referring to FIG. 12, the light source unit 651 may include a plurality of light emitting elements arranged in a predetermined form.

For example, the light source unit 651 may include a plurality of micro LEDs 1010 as light emitting elements. Each of the micro LEDs 1010 may be turned on/off individually under the control of the controller 860. Color and brightness of light from each micro LED 1010 may be adjusted individually under the control of the controller 860.

By driving each of the micro LEDs 1010 individually, the controller 860 may output both a visible light for displaying a road surface projection image and a visible light for securing visibility.

The controller 860 may control the micro LEDs 1010 on a group unit basis. For example, the controller 860 may control a first group of micro LEDs to output a visible light for displaying an image, and control a second group of micro LEDs to output a visible light for securing visibility.

Figure 13:
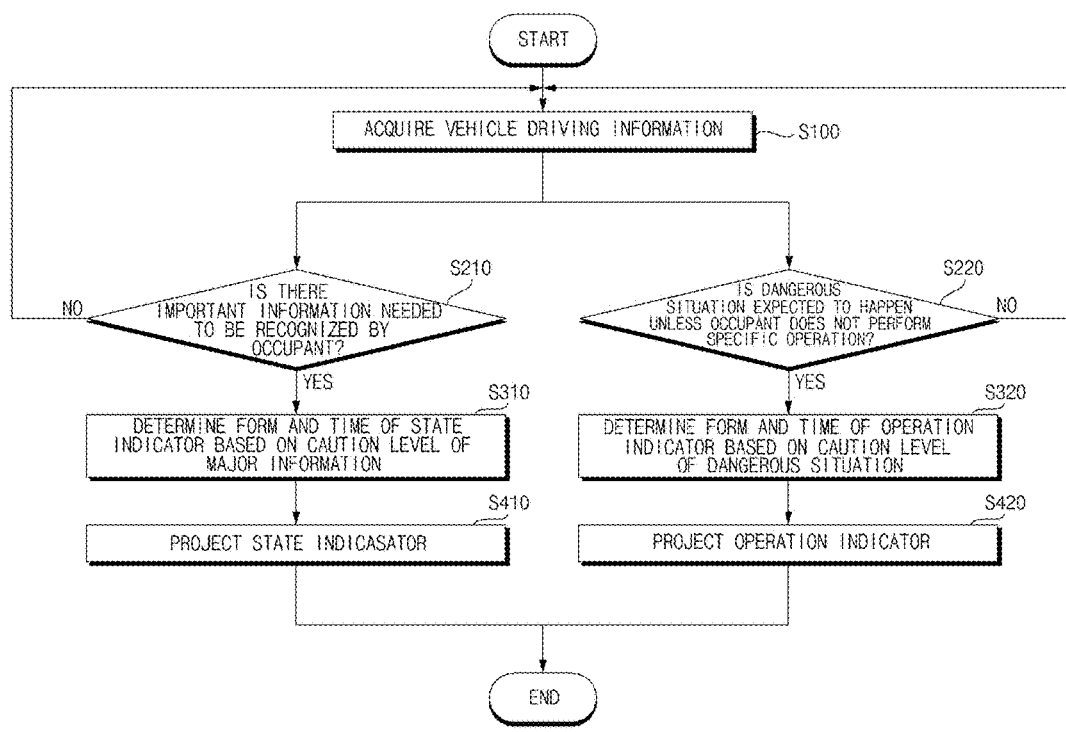
FIG. 13 is a flowchart an example process of an example lamp for a vehicle outputting a state indicator or an operation indicator.

FIG. 13 is a flowchart for explanation of how the lamp outputs a state indicator or an operation indicator.

The controller 860 of the lamp 800 may acquire vehicle driving information during driving of the vehicle 100 in S100.

The vehicle driving information may be information that is provided, during driving of the vehicle 100, from at least one of the following examples: the user interface apparatus 200, the object detection apparatus 300, the communication apparatus 400, the driving manipulation apparatus 500, the vehicle drive apparatus 600, the operation system 700, the navigation system 770, the sensing unit 120, the interface unit 130, or the memory 140. The controller 170 of the vehicle 100 acquire vehicle driving information and transfers the vehicle driving information to the controller 860 of the lamp 800.

The controller 860 may determine whether to display each of a state indicator and an operation indicator individually.

Based on vehicle driving information, the controller 860 may determine whether there is important information needed to be recognized by an occupant in the vehicle 100 in S210.

The important information is information needed to be recognized by an occupant among driving situation information, vehicle state information, and occupant-related information.

If it is determined that there is important information needed to be recognized by an occupant, the controller 860 may determine a form and projection time of a state indicator based on a caution level of the important information in S310.

Based on vehicle driving information, the controller 860 may determine a caution level of determined important information. A caution level may indicate a degree of necessity of recognizing important information by an occupant. The higher degree of necessity of recognizing important information by an occupant, the higher caution level of the important information. For example, the greater the probability of collision, the higher the caution level of important information related to collision between the vehicle 100 and an object. In addition, the greater the probability of violation of a traffic law by the vehicle 100, the higher the caution level related to important information related to violation of the traffic law by the vehicle 100.

The form of a state indicator may include a size, a location, a color, a shape, and content of the state indicator.

For example, the controller 860 may determine the form of a state indicator, so that the size of the state indicator becomes proportional to a caution level of important information. For example, in the case where caution levels range from level 1 to level 5, the size of a state indicator may be set in advance from level 1 to level 5. In this case, the higher the caution level of important information, the greater the size of the state indicator.

For example, the controller 860 may determine the form of a state indicator so that the higher the caution level of important information, the simpler the content the state indicator becomes. Some examples where the content of a state indicator becomes simple may include any one of the following: a state indicator including a text and a mark has changed to include either the text or the mark; a text or mark of a state indicator becomes simple; a state indicator including a mark has changed to include a text; or a state indicator including a text has changed to include a mark.

For example, the controller 860 may advance the projection time of a state indicator if a caution level of important information increases. Accordingly, if a state indicator indicates important information with a relatively higher warning level, the state indicator may be displayed earlier than a state indicator indicating important information with a relatively lower level.

The controller 860 may project the state indicator based on the determined state indicator and projection time in S410.

The controller 860 may control the lamp module 850, so that the state indicator is output in the determined form at the projection time.

Based on vehicle driving information, the controller 860 may determine whether a dangerous situation occurs if an occupant does not perform a specific operation in S220.

The specific operation may be an operation that the occupant manipulates at least one device provided in a vehicle 100. For example, the specific operation may be an operation that an occupant manipulates at least one of a steering wheel, an accelerator pedal, or a brake pedal.

The dangerous situation may include situations where the vehicle 100 collides with an object, where the vehicle 100 violates a traffic law or a traffic signal, where the vehicle 100 violates driving of a nearby vehicle, where the vehicle 100 enters a restricted area, or where the vehicle 100 deviates from a lane or an expected route. For example, the dangerous situation may be a situation where a headlight of the vehicle 100 is turned on when an opposing vehicle is approaching. For example, the dangerous situation may be a situation where the vehicle 100 violates a speed limit.

Based on vehicle driving information, the controller 860 may determine whether a dangerous situation occurs. In addition, to prevent a dangerous situation, the controller 860 may determine an operation needed to be performed by an occupant. For example, in a dangerous situation where the vehicle 100 is travelling at or above a speed limit, the controller 860 may determine that an operation needed to be performed by an occupant is decelerating the vehicle 100 using a brake pedal. In this case, an operation indicator may include a text or mark indicating manipulation of a brake pedal.

If it is determined that a dangerous situation is expected to happen, the controller 860 may determine the form and projection time of the operation indicator based on a caution level of the dangerous situation in S320.

Based on vehicle driving information, the controller 860 may determine a caution level of the determined dangerous situation. A caution level may indicate a degree of danger in a dangerous situation. Accordingly, the higher the degree of danger in a situation, the higher the caution level of the dangerous situation. For example, the greater the probability of collision between the vehicle 100 and an object, the higher the caution level of a dangerous situation related to the collision. In addition, the greater the probability of violation of a traffic law by the vehicle 100, the higher the caution level of a dangerous situation related to the violation of the traffic law by the vehicle 100.

The form of an operation indicator may include a size, a location, a color, a shape, and content of the operation indicator.

For example, the controller 860 may determine the form of an operation indicator, so that the size of the operation indicator becomes proportional to a caution level of a dangerous situation. For example, if caution levels of a dangerous situation range from level 1 to level 5, the size of an operation indicator may be set in advance from level 1 to level 5. In this case, the size of the operation indicator may increase if a caution level of the dangerous situation increases.

For example, the controller 860 may determine the form of an operation indicator, so that the higher the caution level of a dangerous situation, the simpler the content the operation indicator becomes. Some examples where the content of an operation indicator becomes simple may include any one of the following: an operation indicator including a text and a mark has changed to include either the text or the mark; a text or mark of an operation indicator becomes simple; an operation indicator including a mark has changed to include a text; or an operation indicator including a text has changed to include a mark.

For example, the controller 860 may advance the projection time of an operation indicator if a caution level of a dangerous situation increases. Accordingly, an operation indicator corresponding to a dangerous situation with a relatively higher caution level may be displayed earlier than an operation indicator corresponding to a dangerous situation with a relatively lower caution level.

The controller 860 may project the operation indicator based on a determined form and a determined projection time in S410.

The controller 860 may control the lamp module 850, so that the operation indicator is displayed in the determined form at the determined projection time. In some examples, the controller 860 may determine a duration of projection of a state indicator or an operation indicator.

Figure 14:
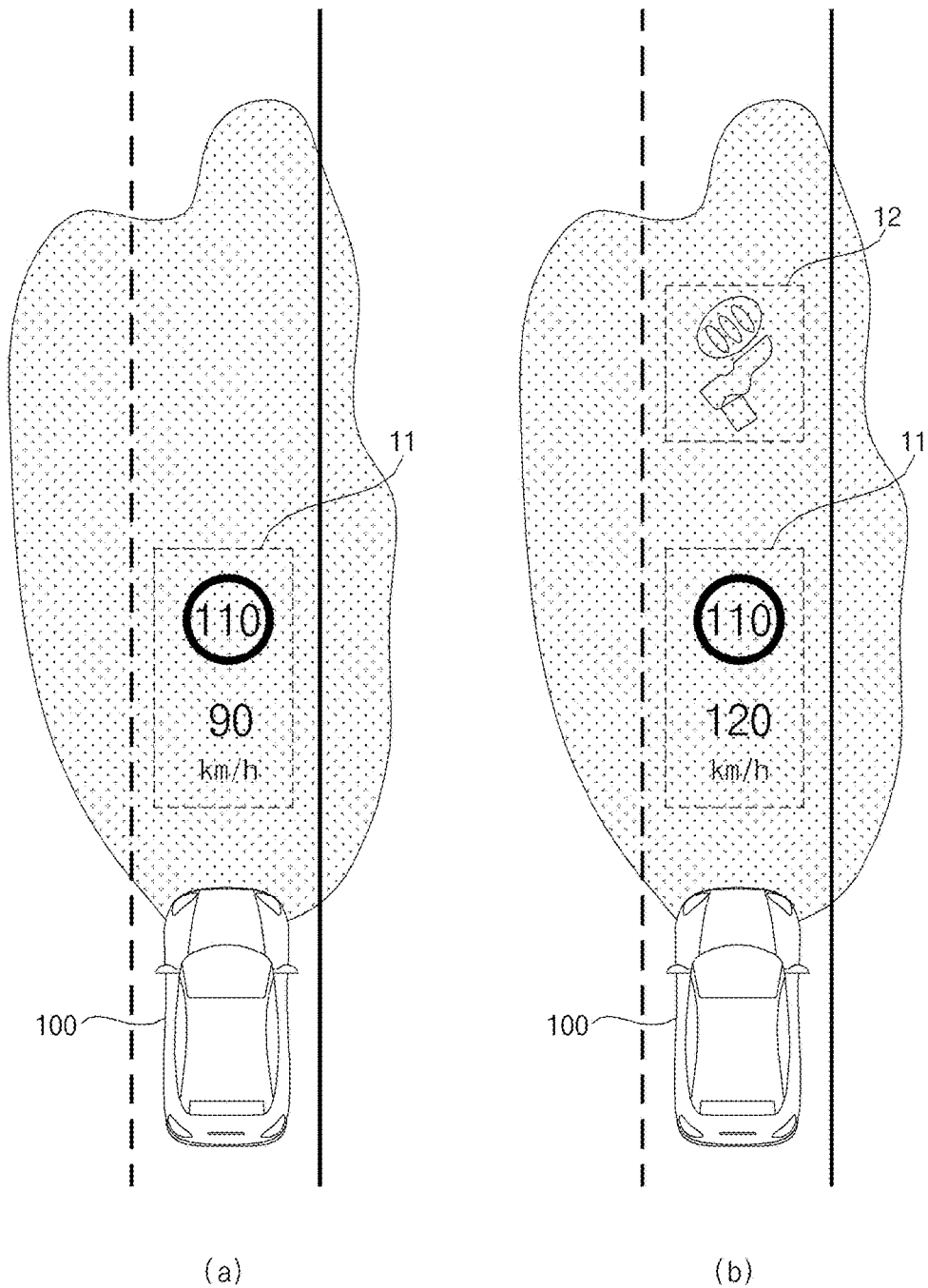
FIGS. 14 to 16 illustrate implementations in which an example lamp for a vehicle outputs at least one of an example state indicator and an example operation indicator.
Figure 15:
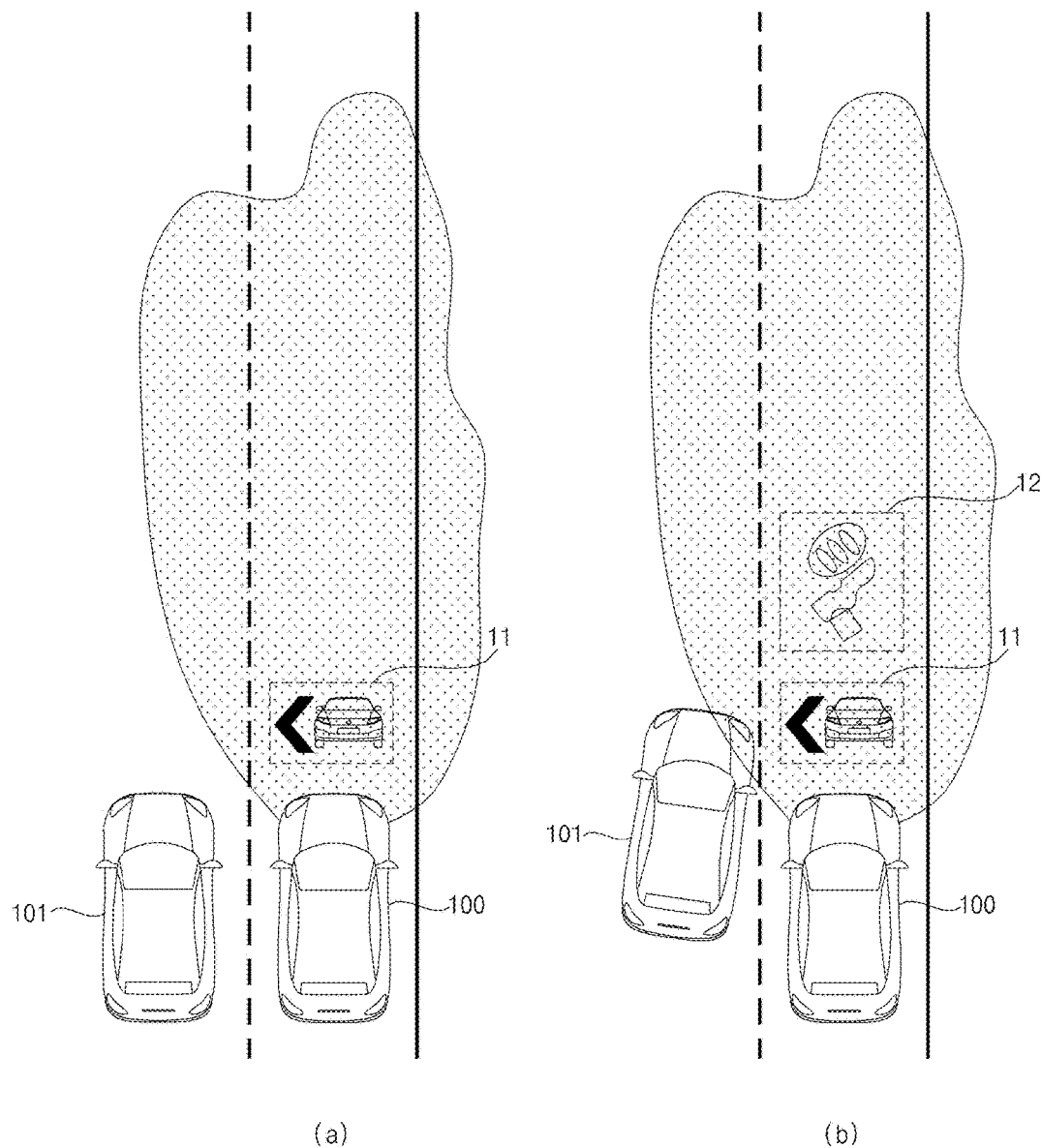
Figure 16:
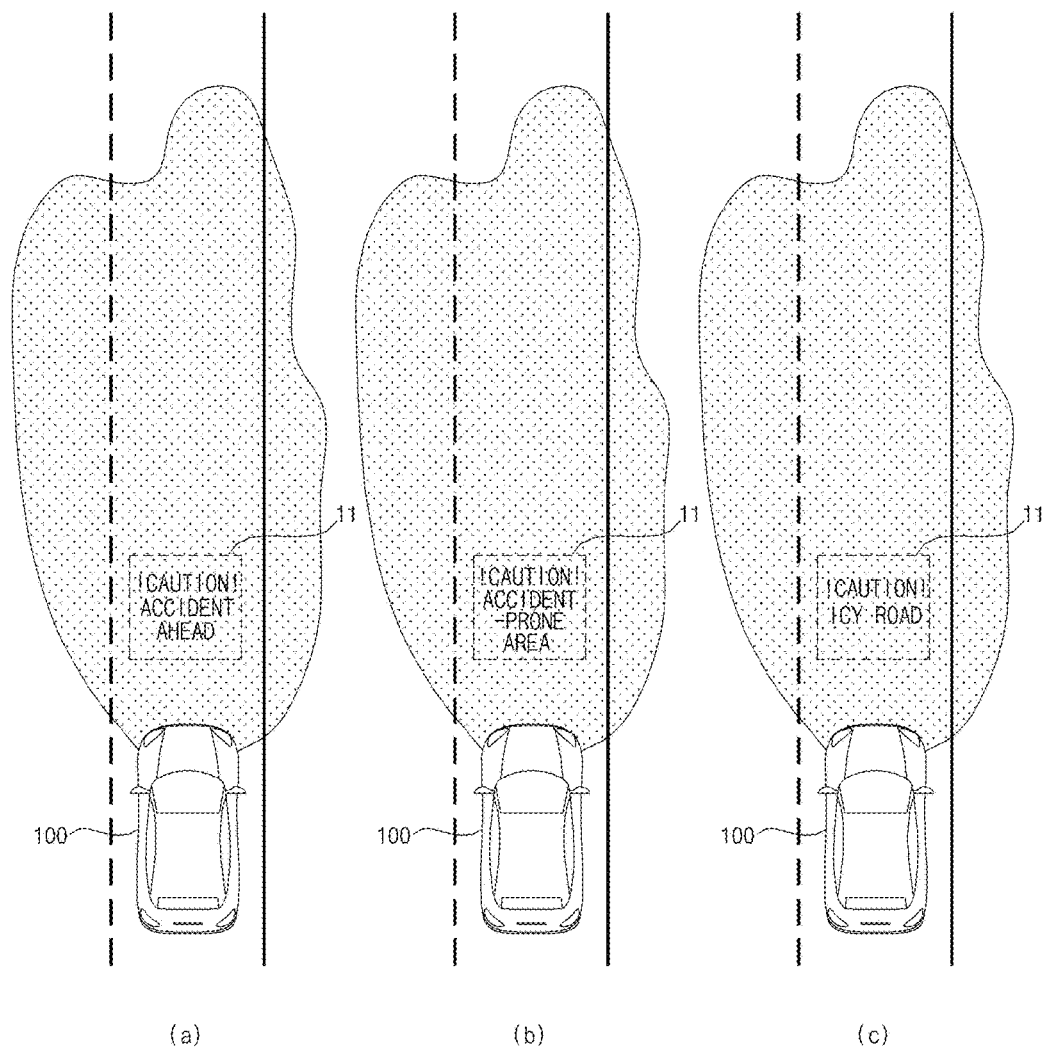

FIGS. 14 to 16 are diagrams for explanation of an example in which a lamp for a vehicle outputs at least one of a state indicator or an operation indicator.

Referring to (a) in FIG. 14, the controller 860 may determine, based on vehicle driving information, whether there is a speed limit for an area in which the vehicle 100 is travelling. The vehicle driving information may include: navigation information indicating a speed limit for each area; and object information indicating a detected speed limit plate. Based on the navigation information, the controller 860 may determine a speed limit for an area where the vehicle 100 is travelling. Based on object information, the controller 860 may sense a speed limit shown in a traffic plate.

Information about a speed limit of an area where the vehicle 100 is travelling and about the current speed of the vehicle 100 is related to a determination of a violation of a traffic law by the vehicle 100. Therefore, that information may be an example of important information needed to be recognized by an occupant. If it is determined that a speed limit is set in an area where the vehicle 100 is travelling, the controller 860 may determine that important information exists.

The controller 860 may control the lamp module 850 to output a state indicator 11 indicating a speed limit and the current speed of the vehicle 100. For example, if a speed limit is 110 km/h, the controller 860 may project, as the state indicator 11, a mark indicating the speed limit of 110 km/h and a text indicating the current speed of the vehicle 100. As a result, the mark indicating the speed limit of 110 km/h and the text indicating the current speed of the vehicle 100 may be displayed within a light pattern formed in front of the vehicle 100.

Referring to (b) in FIG. 14, the controller 860 may determine, based on vehicle driving information, whether the vehicle 100 exceeds a speed limit. The vehicle driving information may include speed information of the vehicle 100 and information on a speed limit for an area where the vehicle 100 is travelling.

If the vehicle 100 exceeds the speed limit, the vehicle 100 violates a traffic law and thus it is a dangerous situation. By determining whether the vehicle 100 exceeds a speed limit, the controller 860 may determine whether a dangerous situation is expected to happen. If it is determined that the vehicle 100 exceeds the speed limit, the controller 860 may determine that a dangerous situation is expected to happen and the project the operation indicator 12 indicating decelerating the vehicle 100. For example, the operation indicator 12 indicating decelerating the vehicle 100 may be a mark indicating a brake pedal and a foot.

Referring to (a) in FIG. 15, the controller 860 may determine, based on vehicle driving information, whether a nearby vehicle 101 exists in a lane next to a lane in which the vehicle 100 is travelling. The vehicle driving information may include: object information indicating an object in the vicinity of the vehicle 100; and nearby vehicle information transmitted by the nearby vehicle 101.

For example, information, which indicates that the nearby vehicle 101 exists in a lane next to a lane in which the vehicle 100 is travelling may be about a situation where there is an object which possibly collides with the vehicle 100. Therefore, this information is important information. If it is determined that the nearby vehicle 101 exists in a lane next to a lane in which the vehicle 100 is travelling, the controller 860 may determine that important information exists.

If it is determined that the nearby vehicle 101 exists in a lane next to a lane in which the vehicle 100 is travelling, the controller 860 may project the state indicator 11 to notify that the nearby vehicle 101 exists in a lane next to a lane in which the vehicle 100 is travelling. In this case, the state indicator 11 may be a mark that indicates a vehicle and a direction in which the nearby vehicle 101 exists.

Referring to (b) in FIG. 15, the controller 860 may determine, based on vehicle driving information, whether the nearby vehicle 101 cuts into a lane in which the vehicle 100 is travelling.

If the nearby vehicle 101 enters the lane in which the vehicle 100 is travelling, there is a probability of collision with the nearby vehicle 101, and thus, the controller 860 may determine that the entrance of the nearby vehicle 101 into the lane in which the vehicle 100 is travelling is a dangerous situation.

If the nearby vehicle 101 cuts into a lane ahead of the vehicle 100, the vehicle 100 needs to decelerate in order to avoid collision with the nearby vehicle 101. In this case, the entrance of the nearby vehicle 101 into a lane is a collision-related dangerous situation, and an operation need to be performed by an occupant to avoid such a dangerous situation is braking or decelerating the vehicle 100.

Accordingly, in response to determination of a dangerous situation where the nearby vehicle 101 enters in a lane in which the vehicle 100 is travelling, the controller 860 may project the operation indicator 12 that indicates an operation of braking or decelerating the vehicle 100. For example, the operation indicator 12 indicating braking or decelerating the vehicle 100 may be a mark indicating a brake pedal and a foot.

Referring to (a) in FIG. 16, the controller 860 may determine, based on vehicle driving information, whether an accident occurs in vicinity of the vehicle 100. The vehicle driving information may include object information, which is sensed using the object detection apparatus 300, and information received via the communication apparatus 400.

If it is determined, based on vehicle driving information, that an accident has occurred in front of the vehicle 100, the controller 860 may determine that important information exists. If an accident has occurred in front of the vehicle 100, an occupant may need to make a detour in order to avoid traffics or may need to avoid various obstacles from the accident. Thus, information indicating that the accident has occurred in front of the vehicle 100 is important information needed to be recognized by the occupant.

If it is determined that an accident has occurred in front of the vehicle 100, the controller 860 may project the state indicator 11 indicating the occurrence of the accident in front of the vehicle 100. In this case, the state indicator 11 may be a text indicating the occurrence of the accident in front of the vehicle 100.

Referring to (b) in FIG. 6, the controller 860 may determine, based on vehicle driving information, whether the vehicle 100 enters an accident-prone area. The accident-prone area is shown in navigation information or information received by the communication apparatus 400. The accident-prone area is an area where accidents frequently occurs. The vehicle driving information may include navigation information, and information received via the communication apparatus 400.

If it is determined, based on vehicle driving information, that the vehicle 100 enters an accident-prone area, the controller 860 may determine that important information exists. If the vehicle enters the area-prone area, an occupant may need to drive safely, and thus, information indicating that the vehicle 100 enters the area-prone area is important information needed to be recognized by the occupant.

If it is determined that the vehicle 100 has entered the area-prone area, the controller 860 may project the state indicator 11 indicating the entrance of the vehicle 100 in the area-prone area. In this case, the state indicator 11 may be a text indicating the entrance of the vehicle 100 in the accident-prone area.

Referring to (c) in FIG. 16, the controller 860 may determine, based on vehicle driving information, whether an icy road exists in front of the vehicle 100. The vehicle driving information may include object information, which is sensed using the object detection apparatus 300, and information received via the communication apparatus 400.

If it is determined, based on vehicle driving information, that an icy road exists in front of the vehicle 100, the controller 860 may determine that important information exists. If an icy road exists in front of the vehicle 100, an occupant may need to drive safely, and thus, information indicating the presence of an icy road in front of the vehicle 100 may be important information needed to be recognized by the occupant.

If it is determined that an icy road exists in front of the vehicle 100, the controller 860 may project the state indicator 11 indicating the presence of an icy road in front of the vehicle 100. In this case the state indicator 11 may be a text indicating the presence of an icy road in front of the vehicle 100.

Figure 17:
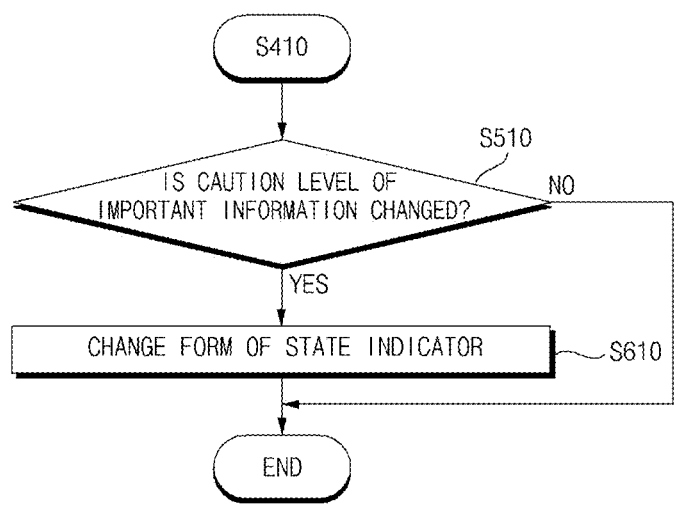
FIG. 17 is a flowchart showing an example lamp for a vehicle changing an example state indicator.

FIG. 17 is a flowchart of how a lamp for a vehicle changes a state indicator.

After outputting a state indicator in S410, the controller 860 may determine whether a caution level of important information corresponding to the output state indicator is changed in S510.

Based on vehicle driving information, the controller 860 may determine a caution level of important information corresponding to the output state indicator. Based on the determination of the caution level, the controller 860 may determine whether the caution level is changed.

If the caution level of the important information is determined changed, the controller 860 may change the form of the state indicator in S610.

Based on the determined caution level of the important information, the controller 860 may change the form of the state indicator corresponding to the important information. The form of the state indicator may include, for example, a location, a shape, a color, a size, content, or brightness of the state indicator displayed on a road surface.

For example, if a caution level of important information is changed, the controller 860 may change the size of a state indicator. The controller 860 may change the form of the state indicator, so that the size of the state indicator becomes proportional to the caution level of the important information. In this case, the higher the caution level, the greater the size of the state indicator displayed on a road surface.

For example, if a caution level of important information is changed, the controller 860 may change the color of a state indicator. For example, if a caution level increases, the controller 860 may control the lamp module 850 so as to change the state indicator from yellow to red.

For example, if a caution level of important information increases, the controller 860 may change the form of a state indicator so that the content or form of the state indicator becomes simple. In this case, some examples where the content of a state indicator becomes simple may include any one of the following: a state indicator including a text and a mark has changed to include either the text or the mark; a text or mark of a state indicator becomes simple; a state indicator including a mark has changed to include a text; or a state indicator including a text has changed to include a mark.

Figure 18:
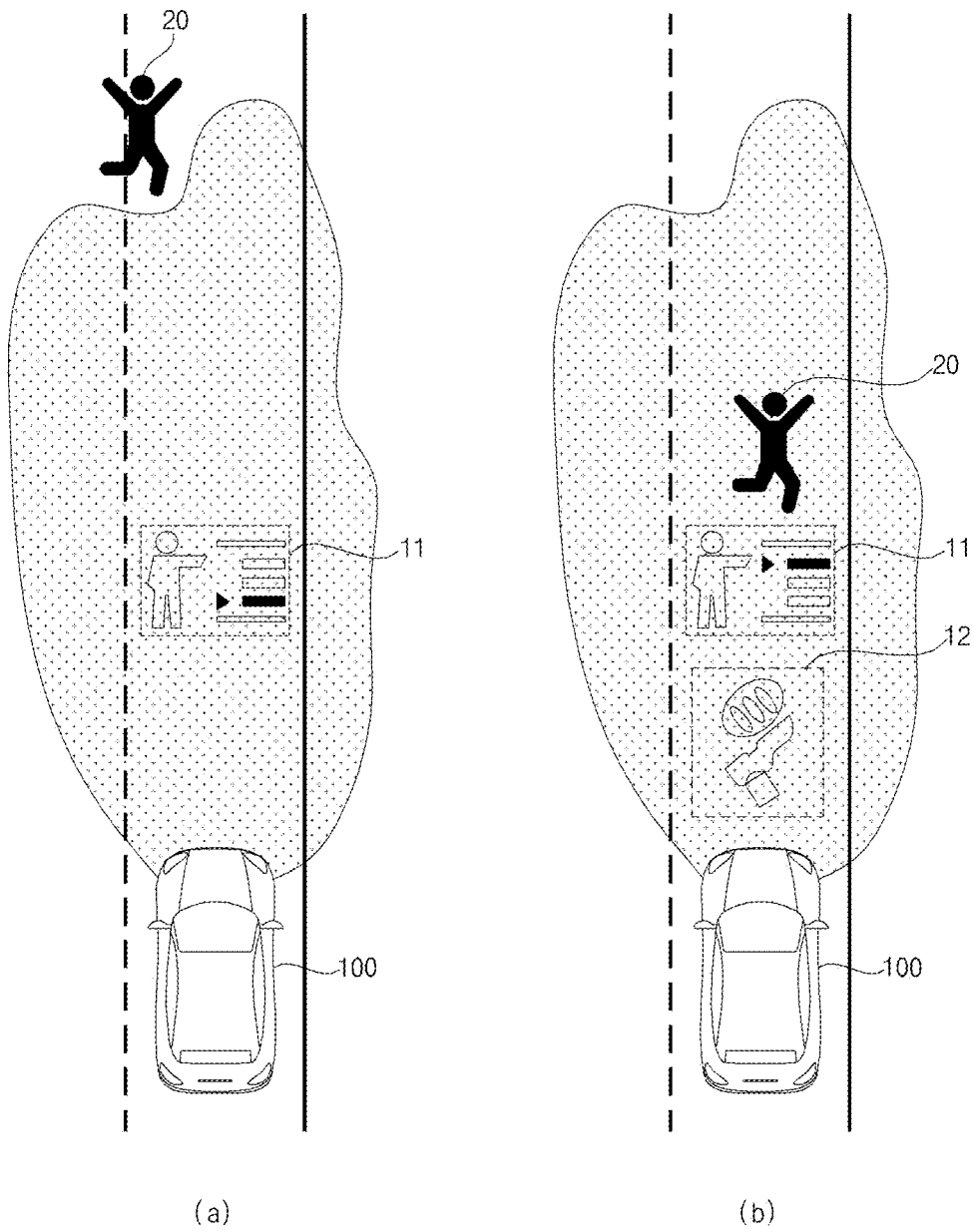
FIGS. 18 and 19 illustrate examples in which an example lamp for a vehicle changes a state indicator or an operation indicator based on a change of an example caution level.
Figure 19:
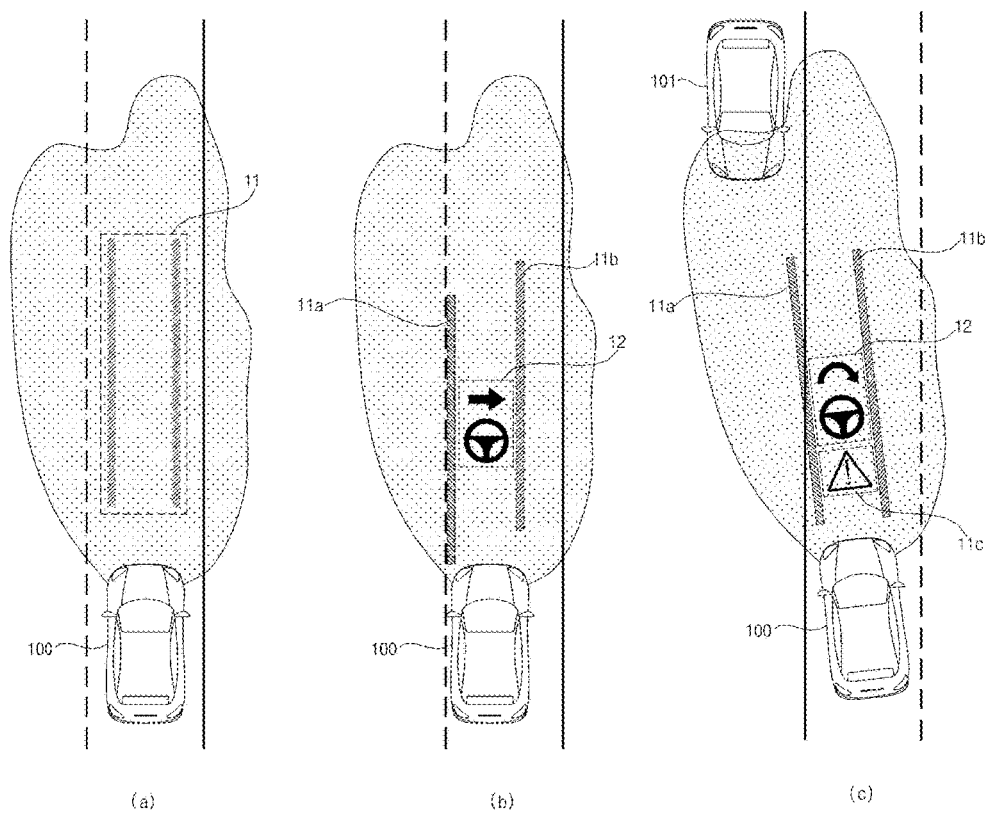

FIGS. 18 and 19 are diagrams of an example in which a lamp for a vehicle changes a state indicator or an operation indicator depending on a change of a caution level.

Referring to (a) in FIG. 18, the controller 860 may determine, based on vehicle driving information, whether a pedestrian exists in front of the vehicle 100.

Based on vehicle driving information, the controller 860 determine a probability of collision between the vehicle 100 and a pedestrian. The vehicle driving information includes a speed and a direction of travel of the vehicle 100, and a speed and a direction of travel of a pedestrian, and the controller 860 may determine a probability of collision between the vehicle 100 and the pedestrian based on the speed and the direction of travel of the vehicle 100, and the speed and the direction of travel of the pedestrian.

Information related to collision between the vehicle 100 and the pedestrian is important information needed to be recognized by an occupant. If it is determined there is a probability of collision between the vehicle 100 and the pedestrian, the controller 860 may determine that important information exists.

If there is a probability of collision between the vehicle 100 and the pedestrian, the controller 860 may project the state indicator 11 indicating the presence of the pedestrian and the probability of collision. In this case, the state indicator 11 may include a mark indicating the pedestrian, and a plurality of sticks each indicating a probability of collision. Using the plurality of sticks, the controller 860 may show the probability of collision between the vehicle 100 and the pedestrian.

For example, the controller 860 may display the sticks, such that the higher probability of collision, the higher stick highlighted. If a probability of collision between the vehicle 100 and a pedestrian is equal to or less than a set value, the controller 860 may highlight the lowest stick. For example, the controller 860 may control the state indicator 11 to include three vertically arranged sticks. In this example, a middle stick may be highlighted if a probability of collision is 34~66%, and the highest stick may be highlighted if the probability of collision is 67%~100%.

Referring to (b) in FIG. 18, the controller 860 may change the state indicator 11 if a probability of collision between the vehicle 100 and a pedestrian is changed. In this case, the probability of collision between the vehicle 100 and the pedestrian may correspond to a caution level of important information. A caution level of important information related to collision between the vehicle 100 and the pedestrian may be in proportion to the probability of collision between the vehicle 100 and the pedestrian. Based on vehicle driving information, the controller 860 may determine whether the probability of collision between the vehicle 100 and the pedestrian is changed. For example, if a distance between the vehicle 100 and the pedestrian is reduced, the controller 860 may determine that a probability between the vehicle 100 and the pedestrian increases.

If the probability of collision between the vehicle 100 and the pedestrian is changed, the controller 860 may determine that a caution level of important information is changed, and may change the state indicator 11. If a probability of collision between the vehicle 100 and a pedestrian increases, the controller 860 may determine that a caution level of important information increases, and thus, may control the state indicator 11 indicating the probability of collision. For example, if the probability of collision between the vehicle 100 and the pedestrian is equal to or greater than a preset value, the controller 860 may display the state indicator 11 such that the highest stick is highlighted among a plurality of sticks each indicating a probability of collision.

If the probability of collision between the vehicle 100 and the pedestrian is equal to or greater than a preset value, the controller 860 may determine that a dangerous situation occurs. If the probability of collision between the vehicle 100 and the pedestrian is equal to or greater than the set value, the controller 860 may determine, based on vehicle driving information, movement of the vehicle 100 required to prevent the collision with the pedestrian. The controller 860 may display an operation indicator indicating a driver's action so as to control the vehicle 100 to perform the determined movement. In this case, the operation indicator 12 may indicate the driver's action required to avoid collision between the vehicle 100 and the pedestrian.

For example, if it is determined that a collision with a pedestrian is not expected to occur when the vehicle 100 is braked, the controller 860 may output an operation indicator 12 corresponding to braking the vehicle 100. In this case, the operation indicator 12 may be a mark indicating stepping on a brake pedal.

On contrary, if it is determined that the vehicle 100 needs to change a steering direction to avoid a pedestrian, the controller 860 may output an operation indicator 12 corresponding to controlling steering of the vehicle 100. In this case, the operation indicator 12 may be a mark indicating a steering wheel or a control direction, or a text indicating a steering direction.

Referring to (a) in FIG. 19, during travelling of the vehicle 100, the controller 860 may project the state indicator 11 indicating a direction of travel of the vehicle 100 as important information. In this case, the state indicator 11 may be a two parallel lines indicating the direction of travel of the vehicle 100.

Based on the direction of travel of the vehicle 100, an occupant in the vehicle 100 may recognize the direction of travel of the vehicle 100 and whether the vehicle 100 has deviated from a lane. Thus, the direction of travel of the vehicle 100 may be important information.

Referring to (b) in FIG. 19, the controller 860 may determine, based on vehicle driving information, whether the center of the vehicle 100 is a preset distance or more off the center of a lane. The preset distance may be calculated through experiments or based on the vehicle driving information. For example, the present distance may be a distance between the center of the vehicle 100 and the center of a lane when one tire of the vehicle 100 is crossing a traffic line.

If the center of the vehicle 100 is the preset distance or more off the center of a lane, there is a probability of lane departure of the vehicle 100. Thus, the controller 860 determines the position of the vehicle 100 in the lane and a direction of travel of the vehicle 100 as important information, and determine that a dangerous situation has happened.

If it is determined, based on vehicle driving information, that a tire of the vehicle 100 comes close to a traffic line after the state indicator 11 is displayed, a probability of lane departure of the vehicle 100 increases. Thus, in this case, the controller 860 may determine that a caution level increases. If a caution level increases because a tire of the vehicle 100 comes close to a traffic line, the controller 860 may change a first line 11a, which is closest to the traffic light between the two parallel lines 11a and 11b indicating a direction of travel of the vehicle 100 from yellow to red, and may change the position of the first line 11a so as to be closer to the vehicle 100.

If it is determined, based on vehicle driving information, that a tire of the vehicle 100 comes close to a traffic line, the controller 860 may determine that a probability of lane departure of the vehicle 100 increases, and determine that a dangerous situation is expected to happen. If it is determined a tire of the vehicle 100 comes close to the traffic line, the controller 860 may project an operation indicator indicating a steering control needed to be performed by a driver, so that the vehicle 100 moves to the center of a lane. In this case, the operation indicator 12 may include a mark indicating a steering wheel, and an arrow indicating a direction in which the vehicle 100 needs to move.

Referring to (c) in FIG. 19, the controller 860 may determine, based on vehicle driving information, a probability of lane departure of the vehicle 100 and a probability of collision with a nearby vehicle.

If it is determined, based on a direction of travel of the vehicle 100 and a direction of a lane, that the probability of lane departure of the vehicle 100 is equal to or greater than a preset value, the controller 860 may determine that important information exists and that a dangerous situation has occurred. The preset value may be determined through experiments or may be set by a user. In this case, an occupant needs to recognize the direction of travel of the vehicle 100, and thus, the direction of travel of the vehicle 100 is important information. The dangerous situation may include a situation where there is a probability of lane departure of the vehicle 100.

As the state indicator 11, the controller 860 may output two parallel lines 11a and 11b indicating the direction of travel of the vehicle 100, which is important information. In this case, the controller 860 may display a first line 11a out of the two parallel lines 11a and 11b, which exists in a direction in which the vehicle 100 deviates from a lane, with red.

In addition, the controller 860 may determine a probability of collision between the vehicle 100 and a nearby vehicle. Based on vehicle driving information, the controller 860 may determine a direction of travel, speed, and location of the vehicle 100. Based on the vehicle driving information, the controller 860 may determine a direction of travel, speed, and location of the nearby vehicle. Based on the direction of travel, speed, and location of the vehicle and the direction of travel, speed, and location of the nearby vehicle, the controller 860 may determine the probability between collision between the vehicle 100 and the nearby vehicle. If it is determined that the probability of collision between the vehicle 100 and the nearby vehicle is equal to or greater than a preset value, the controller 860 may determine that important information exists and that a dangerous situation is expected to occur.

If two or more types of important information exists at the same time, the controller 860 may determine a caution level of important information is greater than a caution level in the case where only one type of important information exists. For example, if there are at the same time a probability of lane departure of the vehicle 100 and a probability of collision with a nearby vehicle, the controller 860 may determine that a caution level of important information increases. In this case, based on determination of an increase in the caution level, the controller 860 may add a danger mark 11c to the state indicator 11.

Based on vehicle driving information, the controller 860 may determine an operation needed to be performed by an operation to avoid collision with the nearby vehicle without departing from a lane. If such an operation is changing a steering angle, the controller 860 may project the operation indicator 12 indicating a steering wheel and a direction of turning the steering wheel.

Figure 20:
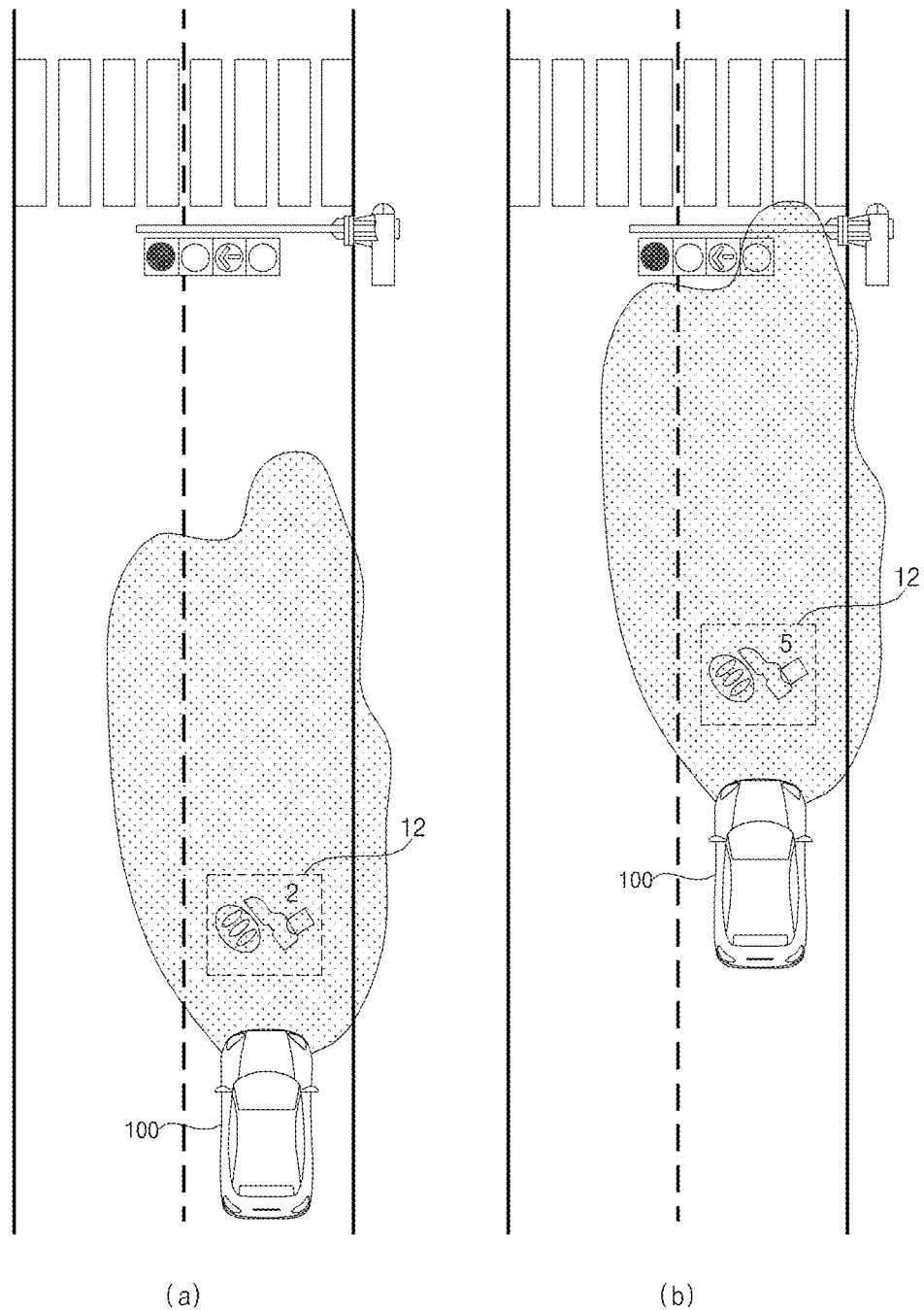
FIG. 20 illustrates example forms of an operation indicator that are determined based on a caution level of a dangerous situation.

FIG. 20 is a diagram for explanation of how a lamp for a vehicle determines the form of an operation indicator based on a caution level of a dangerous situation.

Referring to FIG. 20, the controller 860 may determine, based on vehicle driving information, a signal indicated by a traffic light on a road on which the vehicle 100 is travelling.

When the traffic light is turned red during travelling of the vehicle 100, the vehicle 100 could possibly violate the signal of the traffic light, and thus, the controller 860 may determine that a dangerous situation is expected to occur.

The controller 860 may determine that an operation needed to be performed by an occupant to avoid violation of the traffic light by the vehicle 100 is braking the vehicle 100. Accordingly, the controller 860 may project an operation indicator 12 indicating braking the vehicle 100.

Based on a distance between the vehicle 100 and the traffic light, the controller 860 may determine a braking distance of the vehicle 100. The controller 860 may determine the form of the operation indicator 12, so that the operation indicator 12 includes a numerical value corresponding to the determined degree of braking.

In the example (a) of FIG. 20, the controller 860 may determine, based on a distance between the vehicle 100 and a traffic light, that a level of braking the vehicle 100 may be a level of 2. The level of braking may correspond to force applied to a brake pedal, displacement of the brake petal, or an angle of the brake pedal, or any combination thereof. In this case, the controller 860 may display the operation indicator 12 such that the operation indicator 12 includes the level of 2 which indicates the level of braking.

In the example (b) of FIG. 20, the controller 860 may determine, based on a distance between the vehicle 100 and a traffic light, that a level of braking the vehicle 100 may be a level of 5. In this case, the controller 860 may display the operation indicator such that the operation indicator 12 includes the level of 5 which indicates the level of braking. In the example (b), the distance between the vehicle 100 and the traffic light is shorter than in the example (a), and thus, a greater braking force is required in the example (a) than in the example (b).

Figure 21:
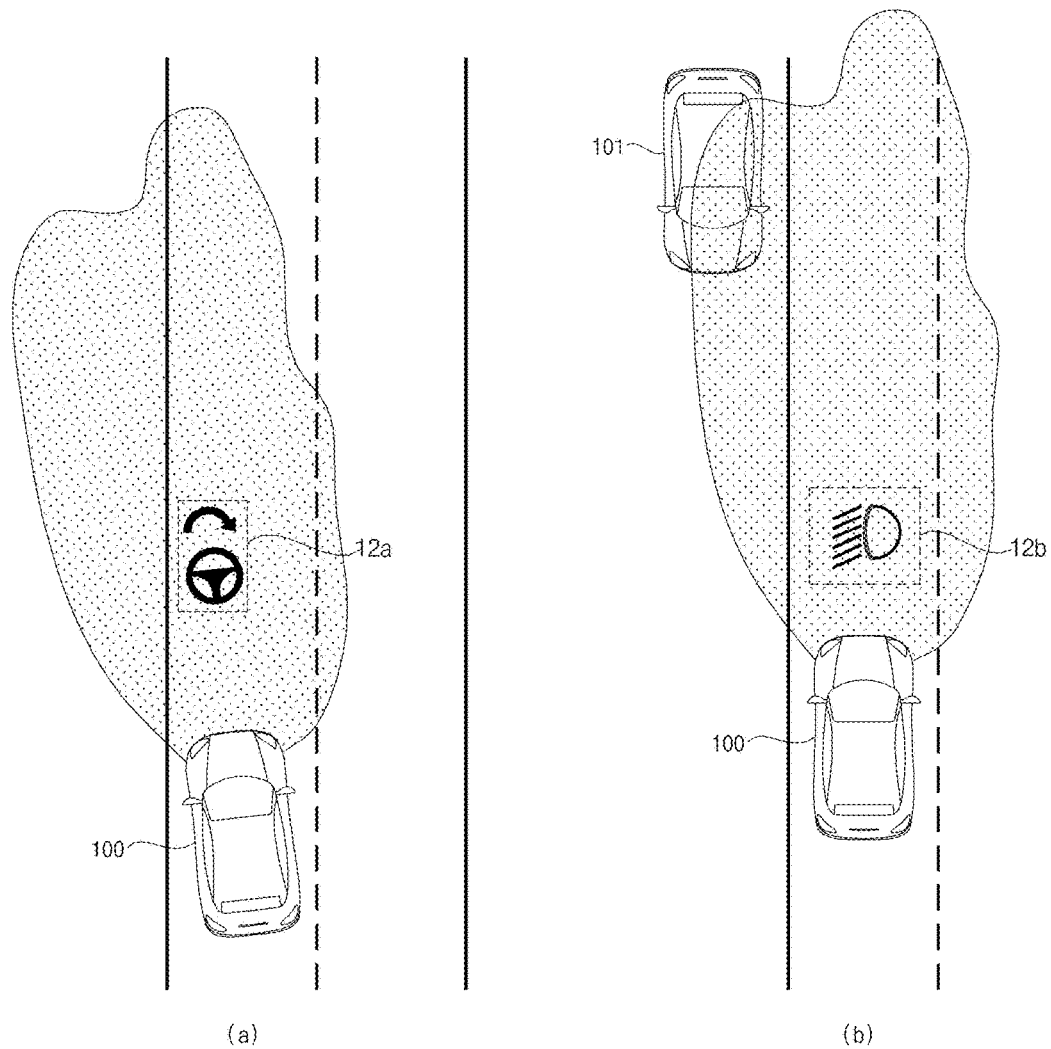
FIG. 21 illustrates an example first operation indicator and an example second operation indicator.

FIG. 21 is a diagram for explanation of a first operation indicator and a second operation indicator.

An operation indicator 12 may include a first operation indicator 12a indicating an operation related to the driving manipulation apparatus 500 (see FIG. 7), and a second operation indicator 12b indicating an operation unrelated to the driving manipulation apparatus 500 (see FIG. 7).

The operation related to the driving manipulation apparatus 500 (see FIG. 7) may be one of the following: changing a steering angle by manipulating the steering input device 510 (see FIG. 7); changing a speed of the vehicle 100 by manipulating the acceleration input device 530 (see FIG. 7); and braking the vehicle 100 by manipulating the brake input device 570 (see FIG. 7).

Referring to (a) in FIG. 21, if it is determined, based on vehicle driving information, that there is a probability of lane departure of the vehicle 100, the controller 860 may project the first operation indicator 12a corresponding to controlling the steering input device. In this case, the first operation indicator 12a may include a mark indicating a steering wheel and a direction of control.

The operation unrelated to the driving manipulation apparatus 500 (see FIG. 7) may be an operation of manipulating a device other than the driving manipulation apparatus 500 (see FIG. 7) among devices provided in the vehicle 100.

Referring to (b) in FIG. 21, the controller 860 may determine, based on vehicle driving information, whether an opposing vehicle 101 is coming when a high-beam of the vehicle 100 is turned on. If the high-beam of the vehicle 100 is turned on, it may dazzle the eyes of a driver of the opposing vehicle 101 and thus it may cause a dangerous situation. Accordingly, if the opposing vehicle 101 is coming when the high-beam of the vehicle 100 is turned on, the controller 860 may determine that a dangerous situation is expected to occur.

If the opposing vehicle 101 is approaching when the high-beam of the vehicle 100 is turned on, the controller 860 may project a second operation indicator 12b indicating turning on a low beam. In this case, the second operation indicator 12b may induce a driver to turn off the high-beam and turn on the low beam.

Figure 22:
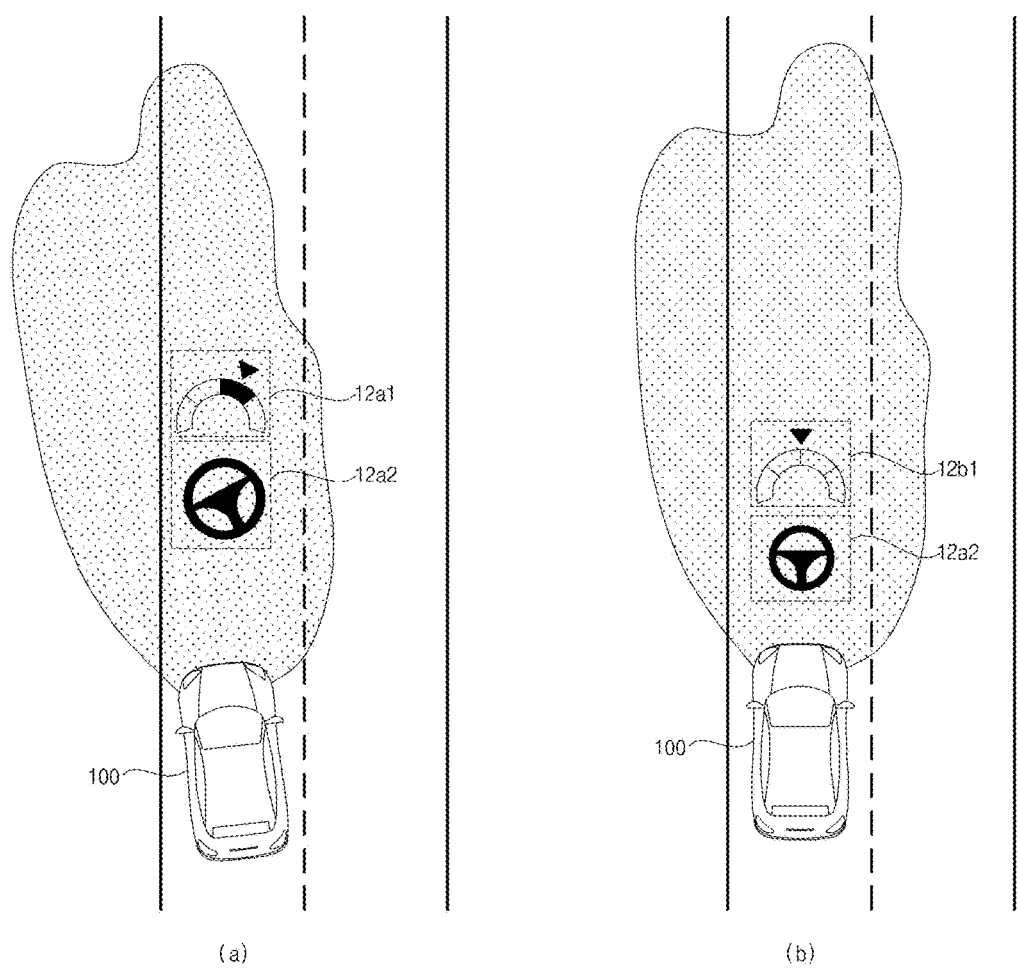
FIG. 22 illustrates an example target operation indicator and an example ongoing operation indicator.

FIG. 22 is a diagram for explanation of a target operation indicator and an ongoing operation indicator.

The first operation indicator may include a target operation indicator 12a1 needed to be performed by an occupant, and an ongoing or current operation indicator 12a2 being performed by the occupant.

The controller 860 may display the ongoing operation indicator 12a2 in the form of a dynamic image that moves in accordance with a manipulation state of the driving manipulation apparatus 500 (see FIG. 7). Based on vehicle driving information, the controller 860 may display a moving dynamic image as the target operation indicator 12a1. In this case, the ongoing operation indicator 12a2 may be a dynamic image that may move or be updated in accordance with a manipulation state of the driving manipulation apparatus 500 (see FIG. 7). The target operation indicator 12a1 may be a dynamic image that changes in accordance with a state of the vehicle 100 and a surrounding environment thereof.

Referring to (a) in FIG. 22, if it is determined that a dangerous where the vehicle 100 deviates from a lane has occurred, the controller 860 may display the target operation indicator 12a1 corresponding to controlling a steering wheel, and the ongoing operation indicator 12a2.

As the target operation indicator 12a1, the controller 860 may display a mark 12a1 indicating a target angle of the steering wheel to control the vehicle 100 to return to the center of a lane without deviating from a line. In this case, the mark 12a1 indicating a target angle of the steering wheel may be a dynamic image that moves in accordance with a location of the vehicle 100. The controller 860 may change the mark 12a1 according to a location of the vehicle 100.

As the ongoing operation indicator 12a2, the controller 860 may project a mark 12a2 indicating the current state of the steering wheel. In this case, the mark 12a2 may be a dynamic image that moves in accordance with a state of the steering wheel. The controller 860 may change the mark 12a2 according to a state of the steering wheel of the vehicle 100.

Referring to (b) in FIG. 22, if the vehicle 100 returns back to the center of a lane, it is not necessary to control the steering wheel. In this case, the target angle of the steering wheel is a zero-degree angle. Thus, a triangle included in the target operation indicator 12a1 to indicate a target angle of the steering wheel is located at the center.

Figure 23:
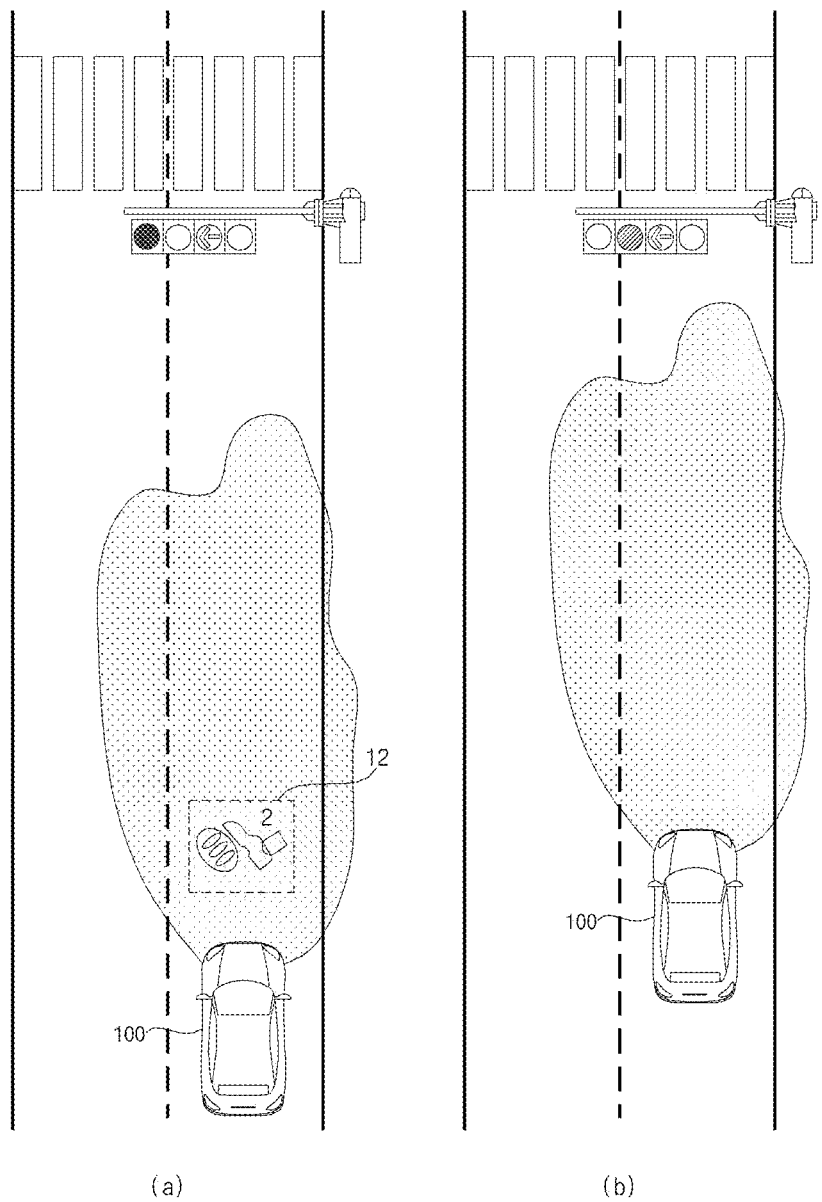
FIGS. 23 and 24 illustrate a lamp for a vehicle that stops projecting an operation indicator when a dangerous situation is addressed.
Figure 24:
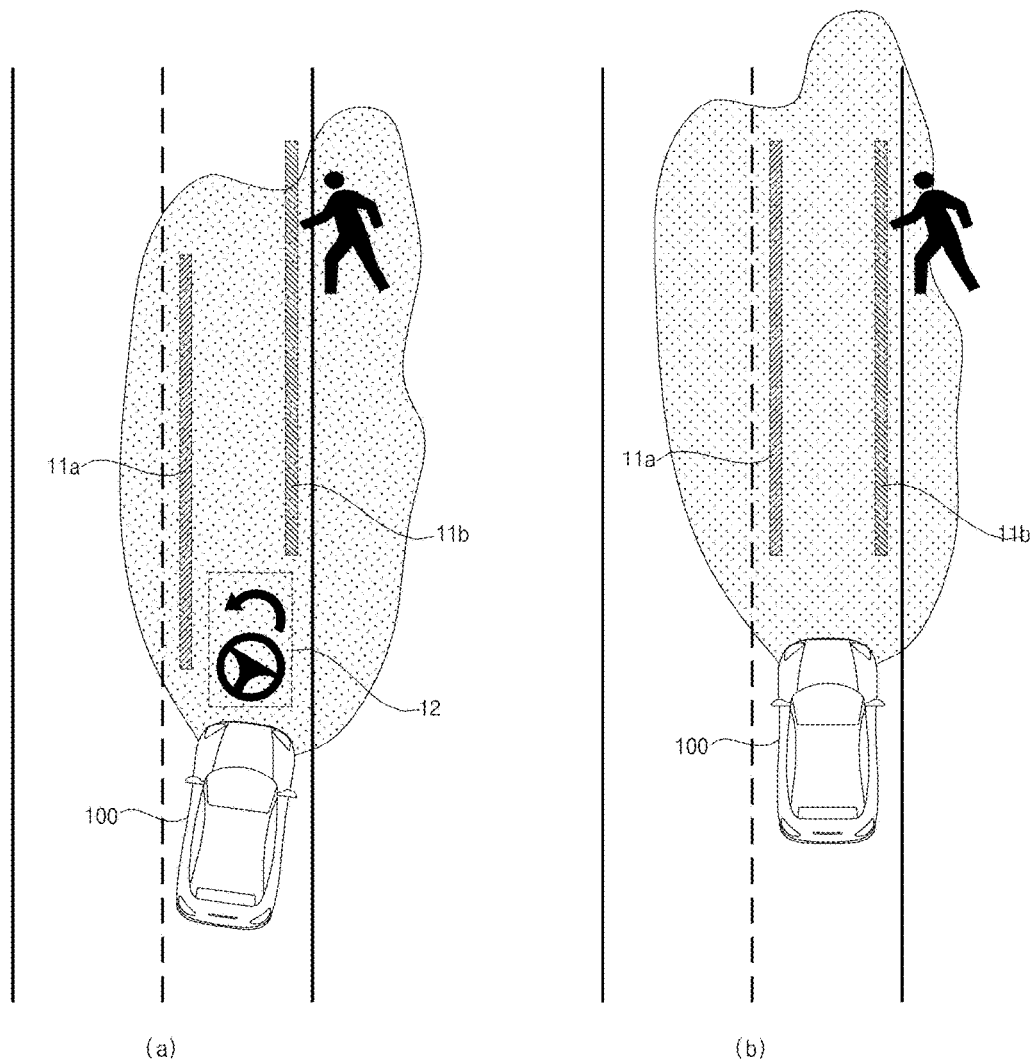

FIGS. 23 and 24 are diagrams for explanation of how a lamp for a vehicle stops projecting an operation indicator when a dangerous situation is addressed.

When an operation indicator 12 is projected and a dangerous situation has been addressed, the controller 860 may stop projecting the operation indicator 12. Based on vehicle driving information, the controller 860 may determine whether a dangerous situation corresponding to the projected operation indicator 12 has been addressed.

If it is determined that the dangerous situation corresponding to the operation indicator 12 has been addressed, the controller 860 may control the lamp module 850 to stop outputting the operation indicator 12.

Referring to (a) in FIG. 23, when a signal of a traffic light in an area in which the vehicle 100 is travelling is red, the controller 860 may determine that a dangerous situation corresponding to violation of a traffic signal is expected to happen. Based on vehicle driving information, the controller 860 may determine that an operation needed to be performed by a driver to avoid violation of the traffic light is a brake control. The controller 860 may project the operation indicator 12 corresponding to a brake control.

Referring to (b) in FIG. 23, if it is determined, based on vehicle driving information, that the signal of the traffic light is turned green, the controller 860 may determine that a dangerous situation has been addressed.

If the signal of the traffic light is turned from red to green, the controller 860 may stop projecting the operation indicator 12, so that the operation indicator 12 corresponding to a brake control disappears.

Referring to (a) in FIG. 24, if it is determined that there is a probability of lane departure of the vehicle 100 and a probability of collision with a pedestrian, the controller 860 may project a state indicator 11 and an operation indicator 12.

If it is determined that there is a probability of lane departure of the vehicle 100, the controller 860 may output two parallel lines, which indicates a route in which the vehicle 100 needs to travel, as the state indicator 11.

If it is determined that there is a probability of collision, the controller 860 may move a second line 11b to be located in front of the pedestrian. The second line 11b is a line closest to the pedestrian which possibly collides with the vehicle 100 among the parallel lines 11a and 11b which are displayed as the state indicator 11. As a result, the pedestrian may be able to see the second line 11b and watch out for the vehicle 100.

If it is determined that there is a probability of lane departure of the vehicle 100 and a probability of collision, the controller 860 may output an operation indicator 12 indicating steering control. The controller 860 may calculate an amount of steering control required to prevent the vehicle 100 from deviating from a lane and colliding with a pedestrian, and may display the calculated amount of steering control as the operation indicator 12.

Referring to (b) in FIG. 24, if the probability of lane departure of the vehicle 10 and the probability of collision with a pedestrian is equal to or less than a preset value, the controller 860 may determine that a dangerous situation has been addressed.

If the probability of lane departure of the vehicle 100 and the probability of collision with a pedestrian is equal to or less than a preset value, the controller 860 may stop projecting the operation indicator 12 indicating steering control, so that the operation indicator 12 disappears.

If a pedestrian exists in front of the vehicle 100 even after the dangerous situation has been addressed, the controller 860 may determine that important information exists, because a driver of the vehicle 100 still needs to recognize the pedestrian. Based on the important information, the controller 860 may keep projecting the parallel lines 11a and 11b as the state indicator 11.

In some implementations, if the operation indicator 12 is projected and an operation corresponding to the operation indicator 12 is performed, the controller 860 may stop projecting the operation indicator 12.

For example, if it is determined that a seat belt is not fastened during travelling of the vehicle 100, the controller 860 may determine that a dangerous situation is expected to happen. Based on a determination of an unfastened status of the seat belt, the controller 860 may display an operation indicator 12 indicating fastening a seat belt. If the seat belt is fastened after the operation indicator 12 is displayed, the controller 860 may control the lamp module 850 so that the operation indicator 12 disappears.

Figure 25:
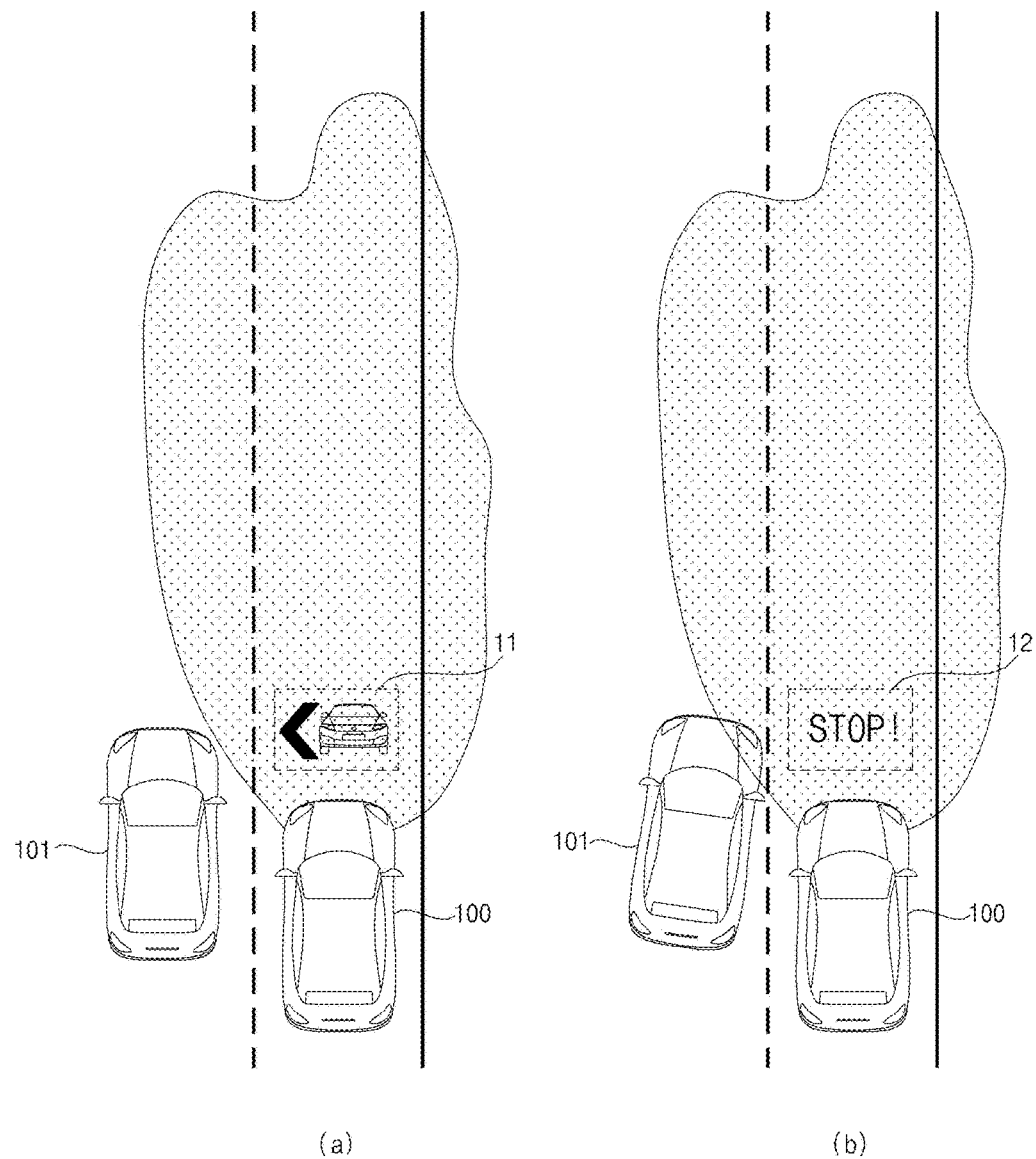
FIG. 25 illustrates an example in which an example lamp for a vehicle stops projecting a state indicator and projects an operation indicator.

FIG. 25 is a diagram illustrating an example in which a lamp for a vehicle stops projecting a state indicator and projects an operation indicator.

Referring to (a) in FIG. 25, if it is determined, based on vehicle driving information, that a nearby vehicle 101 is travelling in a lane next to a lane in which the vehicle 100 is travelling, the controller 860 may determine that there is important information needed to be recognized by an occupant. In this case, the important information is related to the presence and location of the nearby vehicle 101.

If it is determined that the nearby vehicle 101 is travelling in a lane next to a lane in which the vehicle 100 is travelling, the controller 860 may project a state indicator 11 which indicates the presence and location of the nearby vehicle 101.

Referring to (b) in FIG. 25, if it is determined that the nearby vehicle 101 cuts into a lane when the state indicator 11 indicating the presence and location of the nearby vehicle 101 is being projected, the controller 860 may determine that a dangerous situation has occurred.

In a dangerous situation where the nearby vehicle 101 cuts into a lane, the controller 860 may stop projecting the state indicator 11 and project an operation indicator 12 to prevent collision between the vehicle 100 and the nearby vehicle 101. In this case, an operation for preventing the collision between the vehicle 100 and the nearby vehicle 101 is a brake control by a driver. Thus, the operation indicator 12 may include a text "STOP." If both the state indicator 11 and the operation indicator 12 are displayed at the same time in an emergency situation, the driver is not able to recognize the operation indicator 12 quickly. Thus, the lamp 800 displays only the operation indicator 12 in a dangerous situation, so that the driver is able to quickly recognize an operation needed to be performed to address the dangerous situation.

Figure 26:
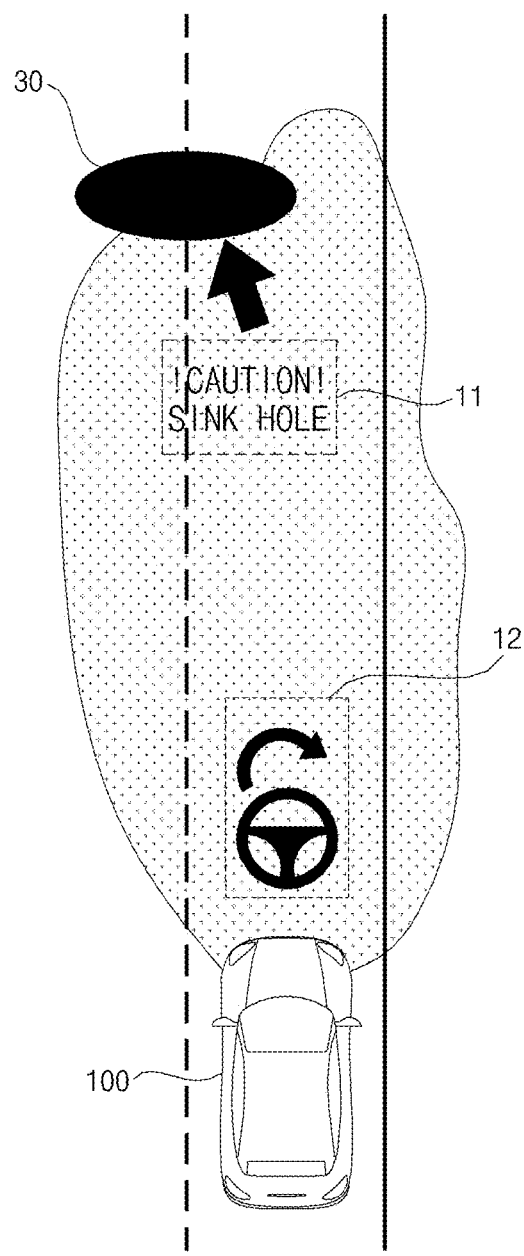
FIG. 26 illustrates an example in which an example lamp for a vehicle determines respective locations of an operation indicator and a state indicator.

FIG. 26 is a diagram illustrating an example in which a lamp for a vehicle determines respective locations of an operation indicator and a state indicator.

The controller 860 may determine a projection location of a state indicator 11 to be a region on a road surface corresponding to an object related to important information. Based on vehicle driving information, the controller 860 may determine a region on a road surface corresponding to an object related to important information. For example, if important information is information on an object which possibly collides with the vehicle 100, a region on a road surface corresponding to an object related to the important information may be an area within a predetermined distance from the object which possibly collides with the vehicle 100. For example, if important information is information on a driving lane from which the vehicle 100 possibly deviates may be area region within a predetermined distance from the driving lane. When outputting the state indicator 11, the controller 860 may determine a location of the state indicator 11, so that the state indicator 11 is displayed in a region on a road surface corresponding to an object related to important information.

The controller 860 may determine a projection location of the operation indicator to be a region on a road surface being stared at by an occupant. Based on occupant information provided by the occupant sensing unit, the controller 860 may determine a region outside the vehicle 100, the region which is being stared at by the occupant. When outputting the operation indicator 12, the controller 860 may determine a location of the operation indicator 12, so that the operation indicator 12 is displayed in a region on a road surface, which is being stared at by the occupant. As a result, a driver of the vehicle 100 is able to quickly recognize the operation indicator 12 and perform an operation to avoid a dangerous situation.

Based on vehicle driving information, the controller 860 may determine that a sink hole exists in front of the vehicle 100. The presence of the sink hole 30 in front of the vehicle 100 is related to safety of the vehicle, and thus, it is important information needed to be recognized by an occupant. The controller 860 may output a state indicator 11 indicating the presence and location of the sink hole 30. The state indicator 20 may include an arrow mark the location of the sink hole 30, and a text "CAUTION! SINK HOLE." In this case, the controller 860 may determine the projection location of the state indicator 11 to be a region in the vicinity of the sink hole 30. As a result, the state indicator 11 may be displayed in the vicinity of the sink hole 30, and a driver may be able to quickly and accurately recognize the location of the sink hole 30.

If it is determined, based on vehicle driving information, that the sink hole 30 exists in front of the vehicle 100, the controller 860 may determine that a dangerous situation is expected to happen. If the sink hole 30 exists in front of the vehicle 100, the vehicle 100 could fall into the sink hole 30 and thus it is a dangerous situation. The controller 860 may display an operation indicator 12 which indicates steering control to avoid the sink hole 30. In this case, the operation indicator 12 may include a steering wheel for steering control, and an arrow indicating a direction of control. The controller 860 may determine a projection location of the operation indicator 12 to be a region being stared at by an occupant.

Figure 27:
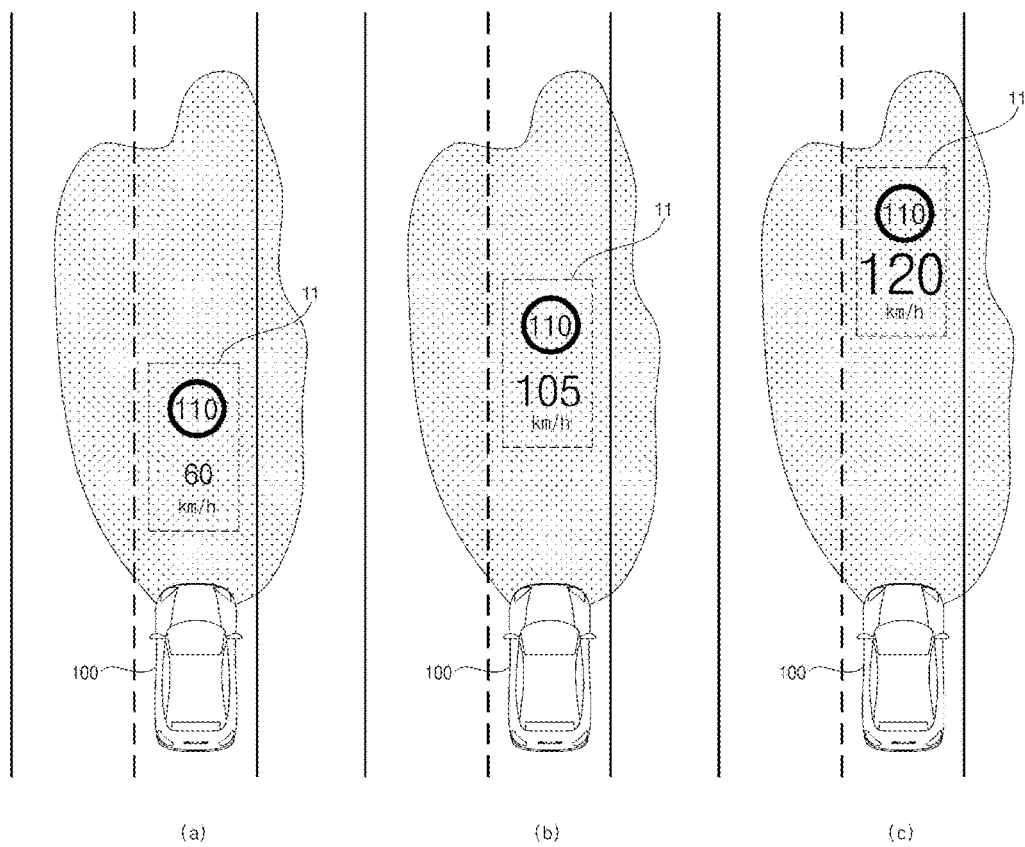
FIG. 27 illustrates an example in which an example lamp for a vehicle changes the form and location of a state indicator based on a speed of the vehicle.

FIG. 27 is a diagram for explanation of an example in which a lamp for a vehicle changes the form and location of a state indicator based on a speed of the vehicle.

The controller 860 may determine a projection location of a state indicator 11 or an operation indicator 12, so that a distance between the vehicle 100 and the state indicator 11 or a distance between the vehicle 100 and the operation indicator 12 becomes proportional to a speed of the vehicle.

The controller 860 may control the lamp module 850 such that the higher the speed of the vehicle 100, the farther the operation indicator 12 displayed from the vehicle 100. In addition, the higher the speed of a vehicle, the farther the driver staring. The lamp 800 determines a location of the state indicator 11 or the operation indicator 12 to be proportional to a speed of the vehicle 100, so that a driver is able to easily recognize the state indicator 11 or the operation indicator 12.

If a speed limit is set in an area in which the vehicle 100 is travelling, the controller 860 may determine that important information exists. If a speed limit is set in an area in which the vehicle 100 is travelling, the controller 860 may project a state indicator 11 which indicates the speed limit and the current speed of the vehicle 100.

The controller 860 may control the lamp module 850, so that the higher the speed of the vehicle 100, the greater the size of the state indicator 11. In addition, the controller 860 may control the lamp module 850, so that the higher the speed of the vehicle, the farther the location of the state indicator displayed from the vehicle 100. As a result, if a speed of the vehicle 100 increases, the state indicator 11 grows in size and becomes farther from the vehicle 100.

Figure 28:
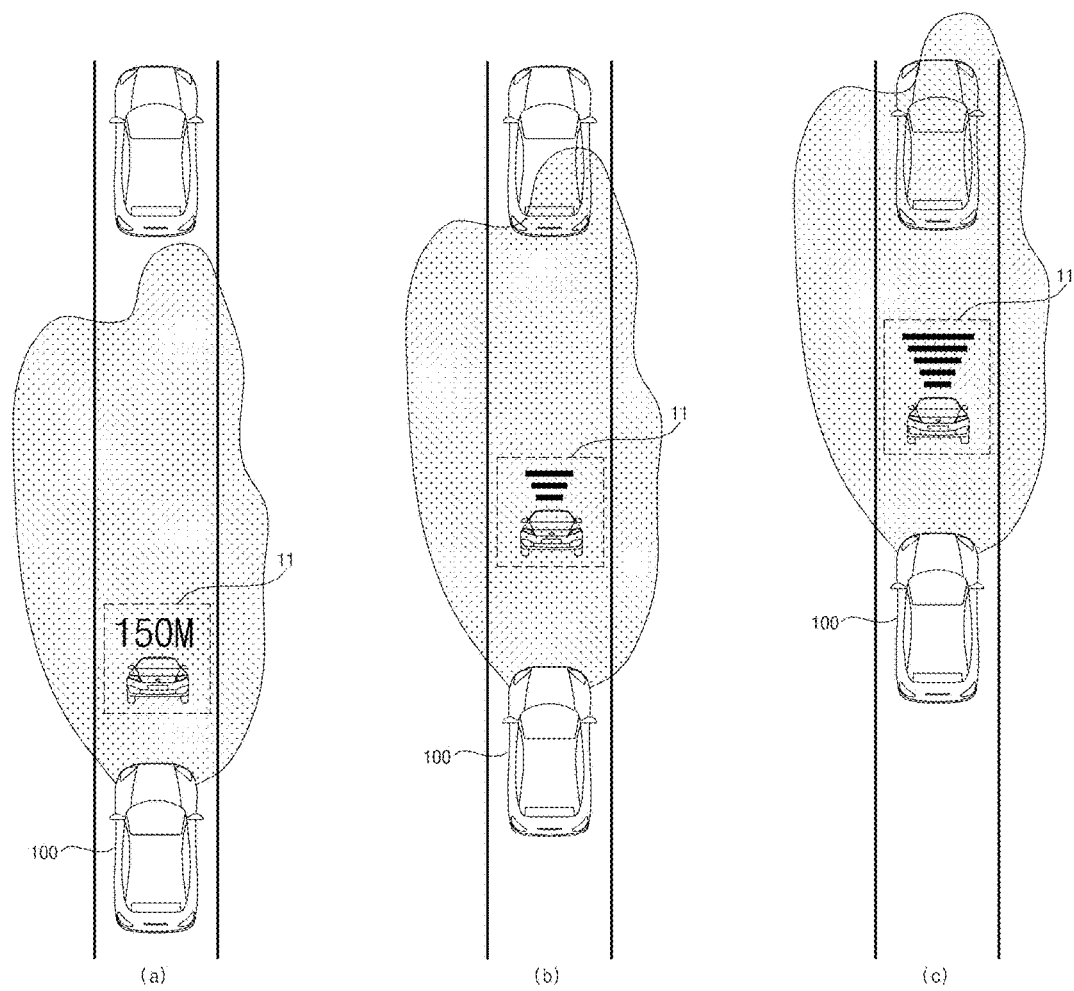
FIGS. 28 and 29 illustrate examples of an example lamp for a vehicle changing the form and location of a state indicator based on vehicle driving information.
Figure 29:
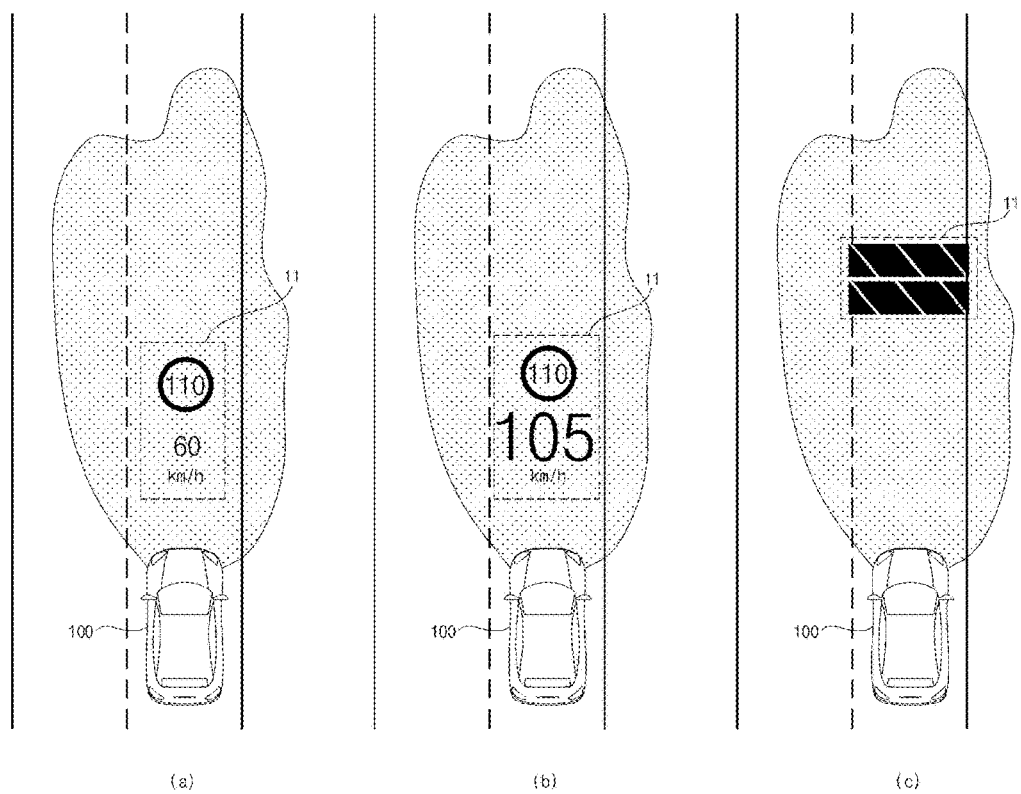

FIGS. 28 and 29 are diagrams for explanation of how a lamp for a vehicle changes the form and location of a state indicator based on vehicle driving information.

Referring to FIG. 28, if it is determined, based on vehicle driving information, that a nearby vehicle exists in front of the vehicle 100, the controller 860 may determine that important information exists, and then output a state indicator 11 which indicates the nearby vehicle.

Based on the vehicle driving information, the controller 860 may display the state indicator 11 at around the center area between the vehicle 100 and the nearby vehicle. Accordingly, if a distance between the vehicle 100 and the nearby vehicle changes, the location of the state indicator 11 may change.

Based on a distance between the vehicle 100 and the nearby vehicle, the controller 860 may determine a caution level of important information. If a distance between the vehicle 100 and the nearby vehicle decreases, a probability of collision between the vehicle 100 and the nearby vehicle increases, and thus, a caution level may increase as well. Thus, if a caution level of important information increases, the controller 860 may make the form of the state indicator 11 simple.

In the example (a) of FIG. 28, if it is determined that a distance between the vehicle 100 and a nearby vehicle is equal to or greater than a preset value, the controller 860 may output a text, which indicates the distance between the vehicle 100 and the nearby vehicle, as a state indicator 11.

In the example (b) of FIG. 28, if it is determined that a distance between the vehicle 100 and a nearby vehicle is less than a preset distance, the controller 860 may output a mark, which indicates the distance between the vehicle 100 and the nearby vehicle, as a state indicator 11. In response to an increased caution level, the controller 860 may change the form of the state indicator 11 from a text to a mark.

In the example (c) of FIG. 28, if a distance between the vehicle 100 and a nearby vehicle decreases, the controller 860 may increase the number of stick marks included in a state indicator 11. As a result, a driver is able to recognize an oncoming vehicle.

Referring to FIG. 29, the controller 860 may change the form of a state indicator 11 based on a caution level of important information.

Referring to (a) and (b) of FIG. 29, if important information corresponding to a speed limit exists and a speed of the vehicle 100 increases, the controller 860 may increase the size of a state indicator 11 which indicates the speed limit and the speed of the vehicle 100.

Referring to (c) of FIG. 29, if a speed of the vehicle 100 exceeds a speed limit, the controller 860 may output a state indicator 11 which indicates a bump. By projecting, on a road surface in front of the vehicle 100, a bump on a road surface in front of the vehicle, the lamp 800 may guide a driver to decelerate.

If a speed of the vehicle 100 is equal to or less than the speed limit, the controller 860 may control the lamp module 850 so that the size of the state indicator 11 becomes proportional to the speed of the vehicle 100. If the speed of the vehicle 100 exceeds the speed limit, the controller 860 may control the lamp module 850 to change the form of the state indicator 11 from a text to a mark.

Figure 30:
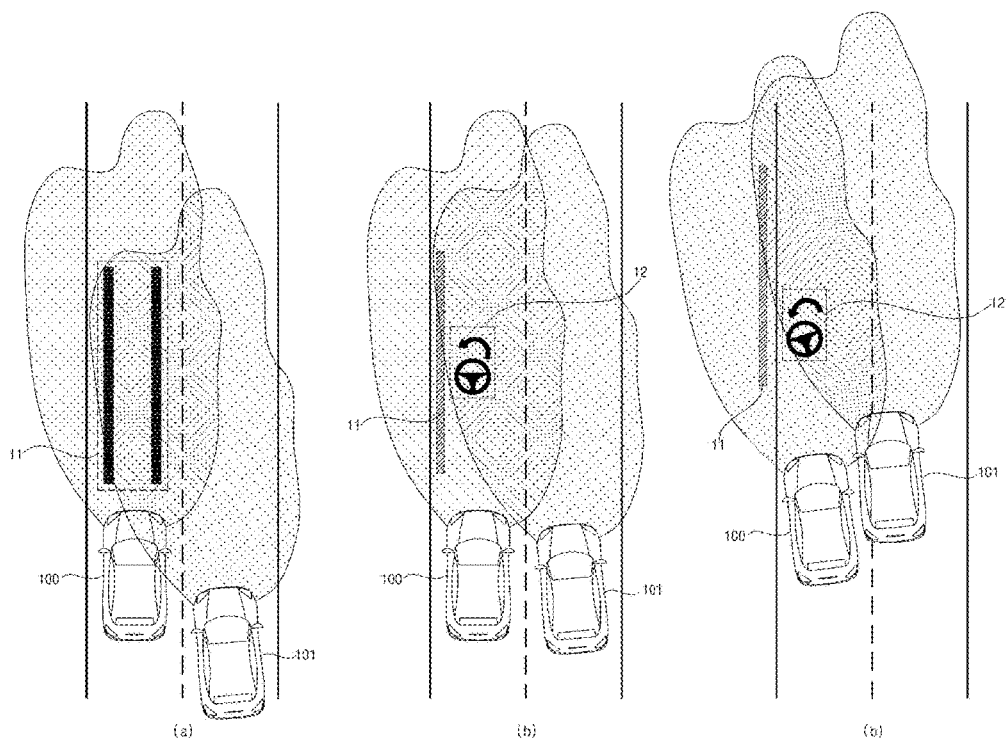
FIGS. 30 to 32 illustrate example implementations of a lamp for a vehicle.
Figure 31:
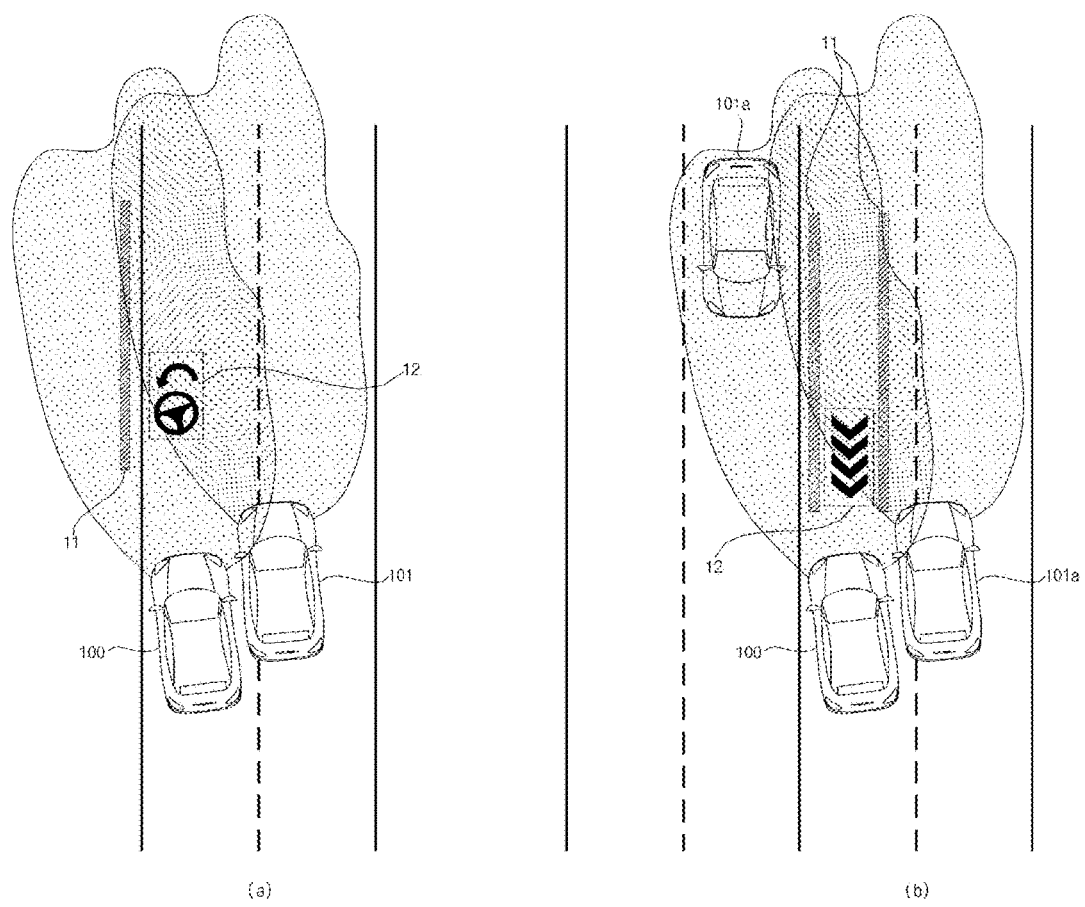
Figure 32:
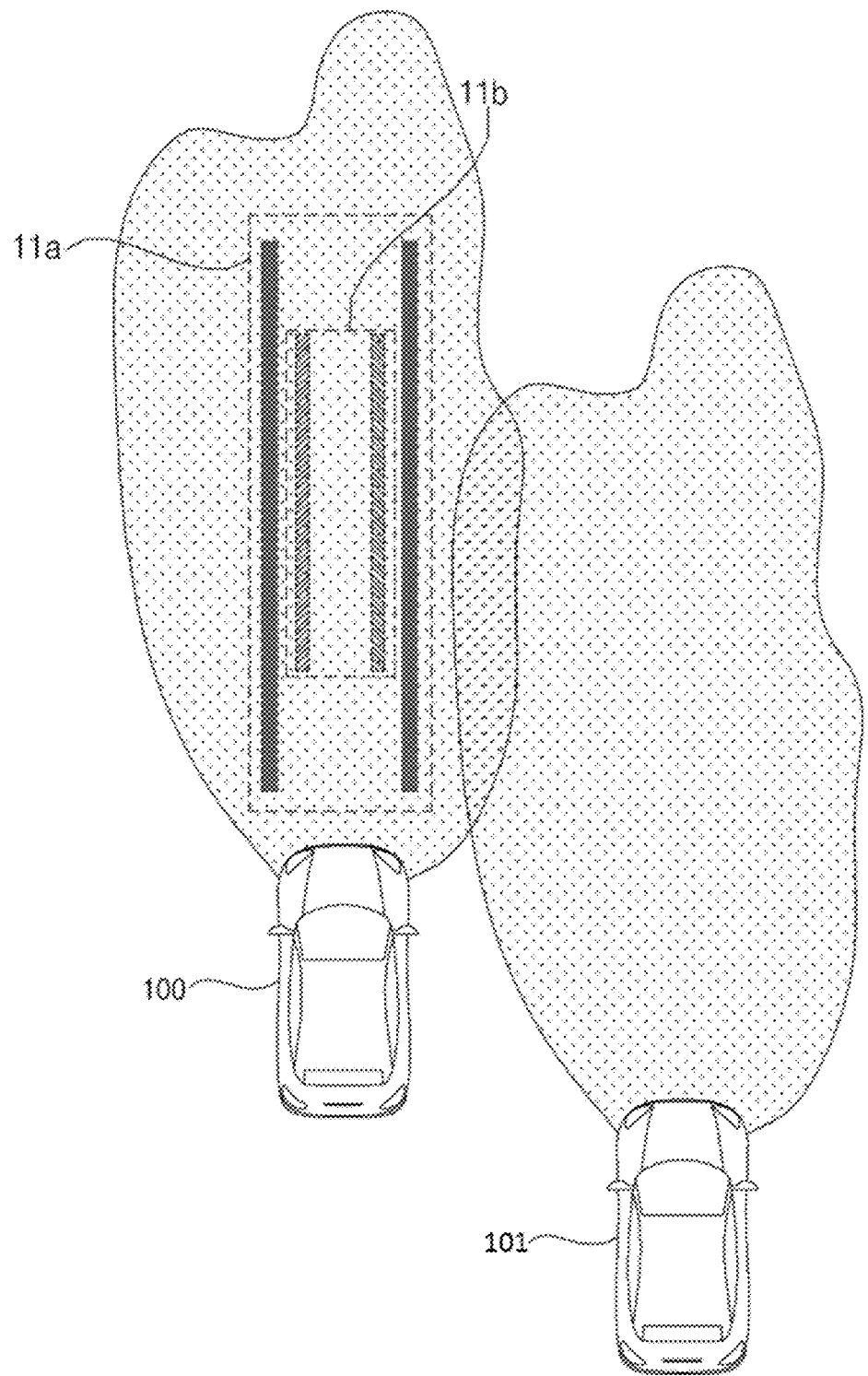

FIGS. 30 to 32 are diagrams illustrating various implementations of a lamp for a vehicle.

The drawings (a), (b) and (c) in FIG. 30 illustrate a change over time. Referring to FIG. 30, the controller 860 may adjust a state indicator 11 and an operation indicator 12 in response to movement of a nearby vehicle 101 which possibly collide with the vehicle 100.

Referring to (a), during travelling of the vehicle 100, the controller 860 may display two parallel lines, which indicates a direction of travel of the vehicle 100, as the state indicator 11.

If it is determined, based on movement of the vehicle 100 and the nearby vehicle 101, that there is a probability of collision between the vehicle 100 and the nearby vehicle 101, the controller 860 may determine that important information exists and that a dangerous situation is expected to happen.

Referring to (b), the controller 860 may project a detour route 11, along which the vehicle 100 needs to travel to avoid the nearby vehicle 101, as the state indicator 11. The detour route 11 may be in the form of a line directed in a direction of travel of the vehicle 100.

The controller 860 may display an operation indicator 12 which indicates a steering control needed to be performed by an occupant in order to avoid the nearby vehicle 101.

Referring to (c), if the nearby vehicle 101 keeps moving toward the vehicle 100, the controller 860 may adjust, based on movement of the nearby vehicle 101, a detour route 11 and an operation indicator 12 to avoid the nearby vehicle 101. If the nearby vehicle 101 keeps approaching the vehicle 100 from the right side, the controller 860 may move the detour route 11 further leftwards.

The example (a) in FIG. 31 is about the same situation as in the drawing (c) of FIG. 30. The example (b) in FIG. 31 is about a situation in which an opposing vehicle is coming in the situation as in (c) of FIG. 30. (a) and (b) in FIG. 31 is for comparison between the implementation of FIG. 30 and the implementation of FIG. 31.

In the example (b) of FIG. 31, if the vehicle 100 moves leftwards to avoid a nearby vehicle 101a, the vehicle 100 possibly collides with an opposing vehicle 101b. Thus, the controller 860 may display, within a driving lane, a state indicator in the form of parallel lines which indicate a direction of travel of the vehicle 100, and an operation indicator 12, which indicates deceleration of the vehicle 100. Accordingly, if a driver decelerates, the vehicle 100 may slow down and possibly avoid collision with the nearby vehicle 101a or the opposing vehicle 101b.

Referring to FIG. 32, if there is no traffic line in the vicinity of the vehicle 100, the controller 860 may determine that important information does not exist.

If there is no traffic line in the vicinity of the vehicle 100, the controller 860 may display, based on vehicle driving information, a virtual lane 11a as a state indicator 11. The controller 860 may determine a location of the virtual lane 11a based on the location of the vehicle 100, a direction of travel of the vehicle 100, and a location relationship between the vehicle 100 and a nearby vehicle. In this case, even if the vehicle 100 moves leftwards and rightwards, the virtual lane 11a does not move leftwards and right wards. Accordingly, a driver may consider the virtual lane 11a as an existing traffic line when driving.

The controller 860 may display parallel lines 11b, which indicates a direction of travel of the vehicle 100, as the state indicator 11. In this case, unlike the virtual lane 11a, the parallel lines 11b moves leftwards and rightwards in response to leftward and rightward movement of the vehicle 100. Accordingly, the driver may control the vehicle 100, so that the parallel lines 11b indicating a direction of travel of the vehicle 100 is located within the virtual lane 11a.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lamp for a vehicle, comprising:
   a lamp module configured to project an image to a road surface;
   at least one controller; and
   a computer-readable medium coupled to the at least one controller having stored thereon instructions which, when executed by the at least one controller, cause the at least one controller to perform operations comprising:
      receiving vehicle driving information, and
      based on the vehicle driving information, controlling the lamp module to project at least one of a state indicator or an operation indicator,
   wherein the state indicator comprises a projection image corresponding to first information that conveys a state related to the vehicle to an occupant of the vehicle,
   wherein the operation indicator comprises a projection image corresponding to a user action to be performed by the occupant of the vehicle,
   wherein the operation indicator comprises at least one of:
      a first operation indicator indicating a first user action of the occupant related to a driving manipulation apparatus of the vehicle, or
      a second operation indicator indicating a second user action of the occupant that is related to an apparatus of the vehicle other than the driving manipulation apparatus,
   wherein the first operation indicator comprises:
      a target operation indicator indicating a target user action that the occupant should perform to avoid the dangerous situation, and
      a current operation indicator indicating a current user action that the occupant currently performs,
   wherein the operations further comprise:
      controlling the lamp to project the target operation indicator and the current operation indicator as dynamic images that are configured to be updated according to a user manipulation of the driving manipulation apparatus, determining a form of the state indicator or a form of the operation indicator based on the vehicle driving information, determining a caution level based on the vehicle driving information, and based on the determined caution level, determining the form of the state indicator or the operation indicator, or a content of the state indicator or the operation indicator, and wherein a higher caution level corresponds to a simpler form or simpler content of the state indicator or the operation indicator.

2. The lamp according to claim 1, wherein the operations further comprise:

based on the vehicle driving information, determining the availability of the first information that conveys the state related to the vehicle, and based on a determination of the availability of the first information, controlling the lamp to project the state indicator corresponding to the first information.

3. The lamp according to claim 2, wherein the first information includes at least one of driving situation information, vehicle state information, or occupant-related information.

4. The lamp according to claim 2, wherein the operations further comprise:

determining a caution level of the first information; and based on the determined caution level of the first information, determining at least one of a form of the state indicator or a projection time of the state indicator.

5. The lamp according to claim 4, wherein the operations further comprise changing the form of the state indicator based on a change of the caution level in a state in which the state indicator is projected.

6. The lamp according to claim 1, wherein the operations further comprise:

determining that a dangerous situation is expected to occur unless the occupant performs a first operation, and based on a determination of the dangerous situation, controlling the lamp to project the operation indicator indicating the first operation to be performed by the occupant.

7. The lamp according to claim 6, wherein the operations further comprise:

determining a caution level of the dangerous situation; and based on the determined caution level of the dangerous situation, determining at least one of a form of the operation indicator or a projection time of the operation indicator.

8. The lamp according to claim 6, wherein the operations further comprise:

determining that the dangerous situation has been resolved in a state in which the operation indicator is projected; and based on a determination that the dangerous situation has been resolved, controlling the lamp to stop projecting the operation indicator.

9. The lamp according to claim 6, wherein the operations further comprise:

determining that the specific operation has been performed according to the operation indicator; and based on a determination that the specific operation has been performed, controlling the lamp to stop projecting the operation indicator.

10. The lamp according to claim 6, wherein the operations further comprise:

based on the vehicle driving information, determining whether the first information is available;

based on a determination of the availability of the first information, controlling the lamp to project the state indicator; and based on a determination that the dangerous situation is expected to occur, controlling the lamp to stop projecting the state indicator and to project the operation indicator.

11. The lamp according to claim 1, wherein the operations further comprise, based on the vehicle driving information, determining a projection location of the state indicator or a projection location of the operation indicator.

12. The lamp according to claim 11:

wherein determining the projection location of the operation indicator comprises determining the projection location of the operation indicator at a region on the road surface toward which the occupant is looking, or wherein determining the projection location of the state indicator comprises determining the projection location of the state indicator at a region on the road surface corresponding to a location of an object related to the first information.

13. The lamp according to claim 11, wherein determining the projection location of the state indicator or the projection location of the operation indicator comprises determining, based on a speed of the vehicle, the projection location of the state indicator or the projection location of the operation indicator, and wherein a distance between the vehicle and the projection location of the state indicator or a distance between the vehicle and the projection location of the operation indicator is proportional to the speed of the vehicle.

14. The lamp according to claim 1, wherein the operations further comprise determining a projection time of the state indicator or a projection time of the operation indicator based on the vehicle driving information.

15. The lamp according to claim 14, wherein the operations further comprise:

determining a caution level based on the vehicle driving information; and based on the determined caution level, changing the projection time.

16. The lamp according to claim 1, wherein the operations further comprise:

controlling the lamp to flash the state indicator or the operation indicator at a flashing frequency;

determining a caution level based on the vehicle driving information; and based on the determined caution level, increasing or decreasing the flashing frequency.

17. The lamp according to claim 1, wherein the simpler form of the state indicator includes one of text or a mark at the higher caution level based on the state indicator including both of text and a mark at a lower caution level.

18. The lamp according to claim 1, wherein the simpler content of the state indicator includes a mark at the higher caution level based on the state indicator including text at a lower caution level.

19. The lamp according to claim 1, wherein the first operation indicator comprises a projection image indicating a manipulation of at least one of a steering input device of the vehicle, an acceleration input device of the vehicle, or a brake input device of the vehicle.

20. The lamp according to claim 1, wherein the second operation indicator comprises a projection image indicating a manipulation of a lighting device of the vehicle.

* * * * *